US011222477B2

(12) United States Patent
Moon et al.

(10) Patent No.: US 11,222,477 B2
(45) Date of Patent: Jan. 11, 2022

(54) ELECTRONIC DEVICE FOR PROVIDING AUGMENTED REALITY SERVICE AND OPERATING METHOD THEREOF

(71) Applicant: Samsung Electronics Co., Ltd., Suwon-si (KR)

(72) Inventors: Choonkyoung Moon, Suwon-si (KR); Shinjae Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/092,853

(22) Filed: Nov. 9, 2020

(65) Prior Publication Data

US 2021/0158624 A1 May 27, 2021

(30) Foreign Application Priority Data

Nov. 25, 2019 (KR) .................. 10-2019-0152617

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/012* (2013.01); *G06F 3/013* (2013.01); *G06F 3/017* (2013.01);
(Continued)

(58) Field of Classification Search
CPC .......... G06F 3/012; G06F 3/013; G06F 3/017; G06F 3/041; G06T 19/006; G06T 2200/24; G06T 7/70
See application file for complete search history.

(56) References Cited

U.S. PATENT DOCUMENTS 9,442,689 B2 * 9/2016 Chi ................... G06F 3/1454
9,767,613 B1 9/2017 Bedikian et al.
(Continued)

FOREIGN PATENT DOCUMENTS

CN 105573500 A 5/2016
CN 107506037 A 12/2017
(Continued)

OTHER PUBLICATIONS

International Search Report dated Feb. 26, 2021, issued in International Patent Application No. PCT/KR2020/016392.

*Primary Examiner* — Afroza Chowdhury
(74) *Attorney, Agent, or Firm* — Jefferson IP Law, LLP

(57) ABSTRACT

A device and a method of providing an augmented reality service in an electronic device by interworking with another electronic device is provided. A first electronic device includes a communication circuit, a camera, a sensor, a display device, and a processor, the display device, the sensor, and the camera, the processor configured to establish communication with a second electronic device, obtain information on at least one object included in a field of view of a user wearing the first electronic device through the camera or the sensor, obtain information on a user's gaze, determine whether to interwork with the second electronic device for an augmented reality service, based on the information on the user's gaze and the information on the at least one object, and when it is determined to interwork with the second electronic device, transmit interworking information on the augmented reality service to the second electronic device.

20 Claims, 47 Drawing Sheets

(51) Int. Cl.
*G06T 7/70* (2017.01)
*G06F 3/041* (2006.01)

(52) U.S. Cl.
CPC .............. *G06F 3/041* (2013.01); *G06T 7/70* (2017.01); *G06T 2200/24* (2013.01)

(56) References Cited

U.S. PATENT DOCUMENTS

| | | | |
|---|---|---|---|
| 10,101,803 | B2 | 10/2018 | Faaborg et al. |
| 10,275,023 | B2 | 4/2019 | McKenzie et al. |
| 2013/0187835 | A1* | 7/2013 | Vaught .................. G06F 3/013 345/8 |
| 2014/0267403 | A1 | 9/2014 | Maciocci et al. |
| 2017/0109936 | A1 | 4/2017 | Powderly et al. |
| 2017/0123744 | A1 | 5/2017 | Park et al. |

FOREIGN PATENT DOCUMENTS

| | | |
|---|---|---|
| CN | 107957774 A | 4/2018 |
| JP | 2016-517583 A | 6/2016 |

\* cited by examiner

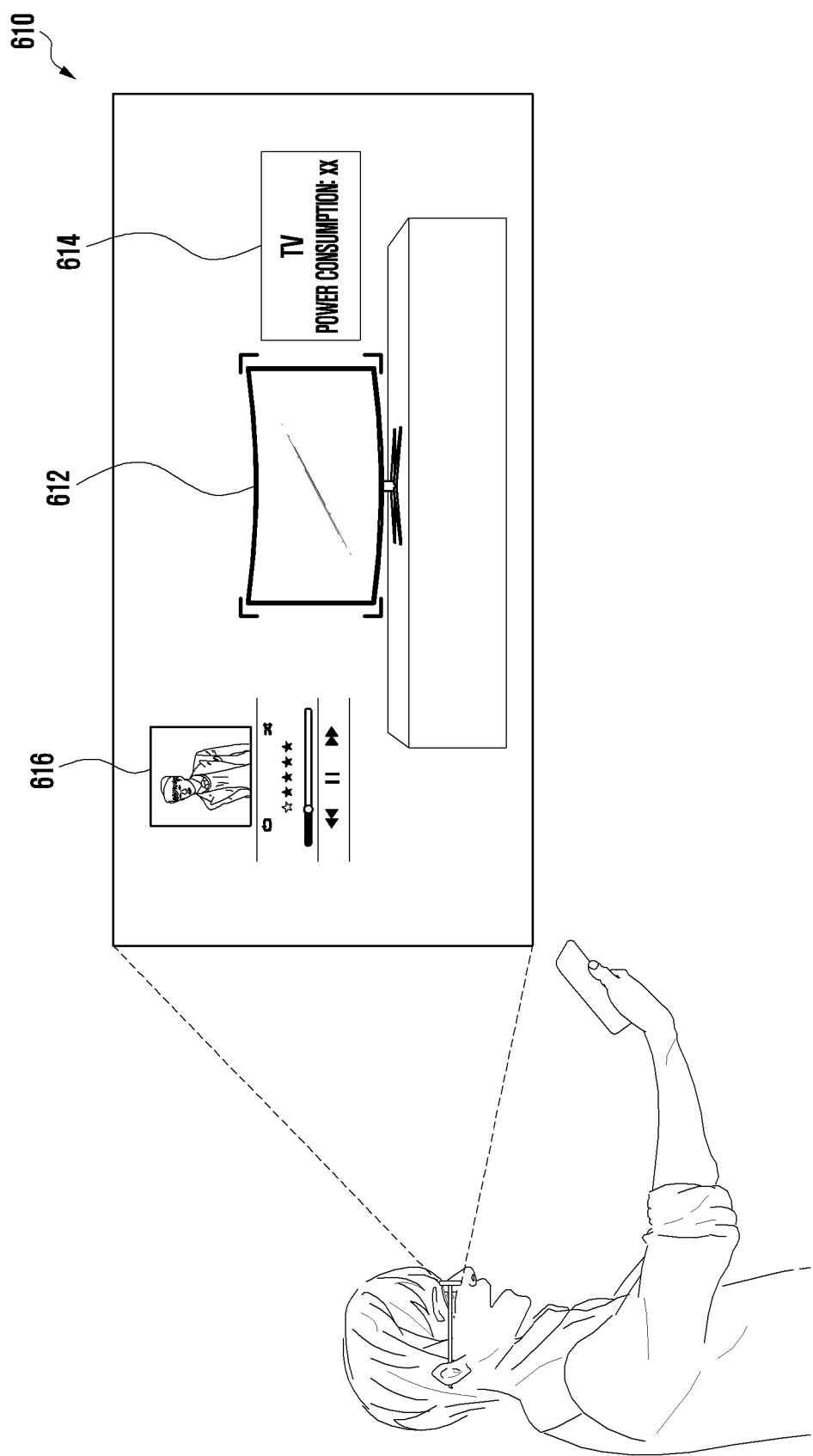

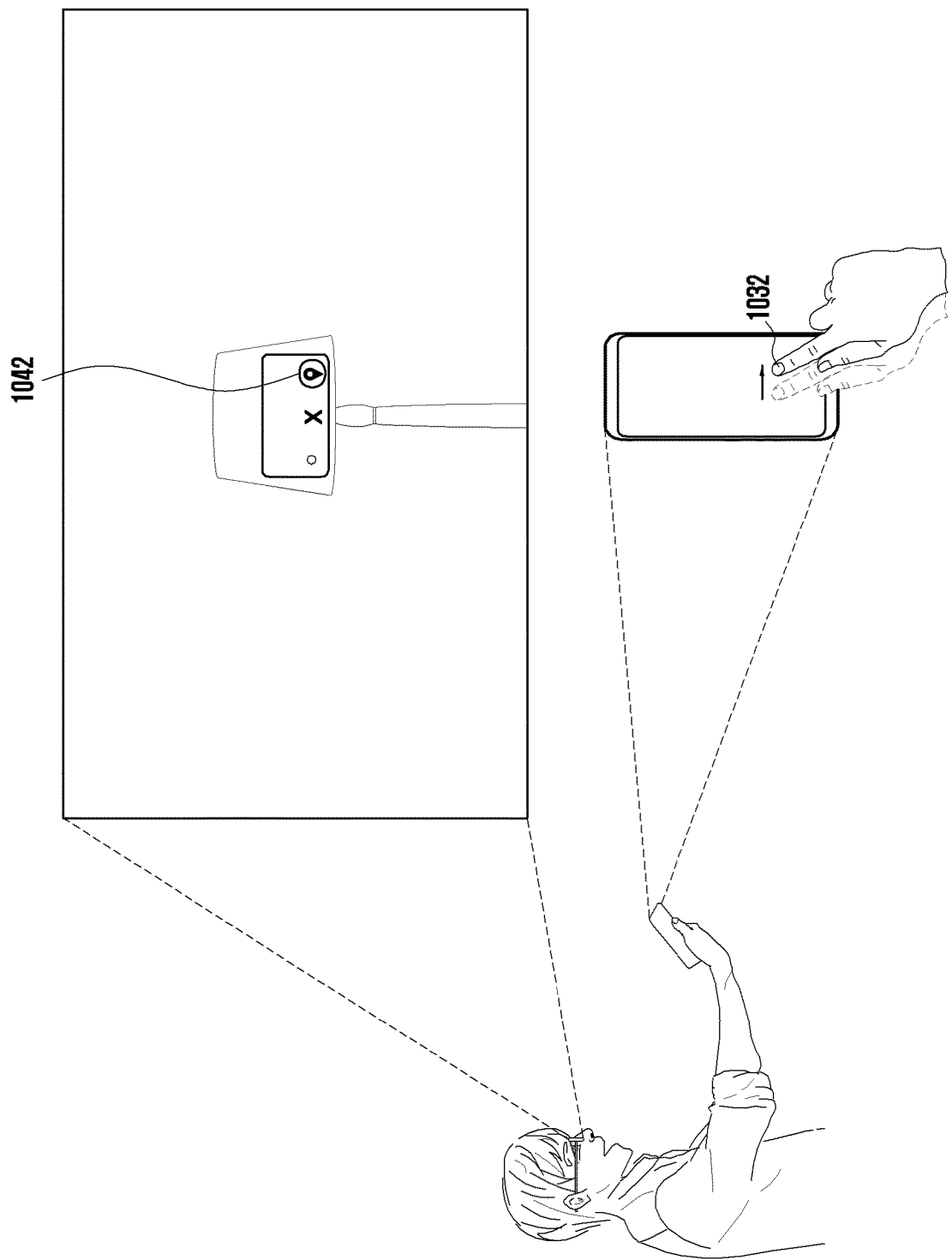

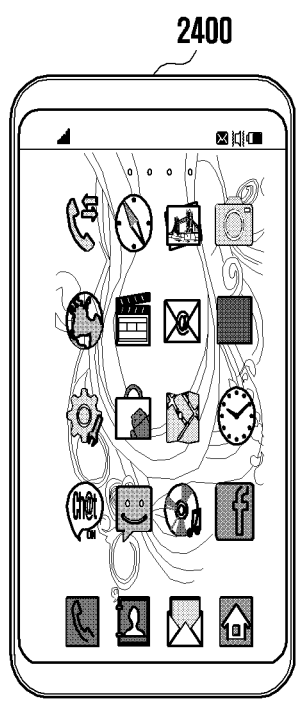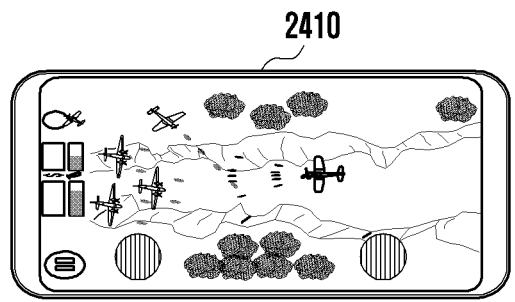
FIG. 24A       FIG. 24B

ELECTRONIC DEVICE FOR PROVIDING AUGMENTED REALITY SERVICE AND OPERATING METHOD THEREOF

CROSS-REFERENCE TO RELATED APPLICATION(S)

This application is based on and claims priority under 35 U.S.C. § 119(a) of a Korean patent application number 10-2019-0152617, filed on Nov. 25, 2019, in the Korean Intellectual Property Office, the disclosure of which is incorporated by reference herein in its entirety.

BACKGROUND

1. Field

The disclosure relates to a device and a method for providing an augmented reality service in an electronic device.

2. Description of Related Art

The development of information and communication technology and semiconductor technology promotes advances of various electronic devices to multimedia devices that provide a variety of multimedia services. The multimedia services may include at least one of a voice call service, a message service, a broadcast service, a wireless Internet service, a camera service, an electronic payment service, or a music playback service.

Electronic devices may provide various experiences to users thereof. For example, the electronic devices may provide an augmented reality (AR) service that adds virtual information (e.g., virtual objects) to a real space.

The above information is presented as background information only to assist with an understanding of the disclosure. No determination has been made, and no assertion is made, as to whether any of the above might be applicable as prior art with regard to the disclosure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and a method for an augmented reality service in an electronic device (e.g., a mobile device) by interworking with another electronic device (e.g., an electronic device providing an augmented reality service).

Additional aspects will be set forth in part in the description which follows and, in part, will be apparent from the description, or may be learned by practice of the presented embodiments.

In accordance with an aspect of the disclosure, an augmented reality device is provided by a mobile device, a projector, or a wearable device. The electronic devices providing an augmented reality service is configured in various forms to allow users to experience a realistic augmented reality service. For example, an electronic device providing an augmented reality service may be configured in the form of glasses to be worn on a user's face.

An electronic device (e.g., a wearable device) providing an augmented reality service may provide an augmented reality service independently of an electronic device (e.g., a mobile device) such as a smart phone or a mobile communication terminal. For example, when an application (e.g., an augmented reality application) installed in an electronic device providing an augmented reality service is executed, the electronic device may display virtual information (e.g., virtual objects) such that the virtual information overlaps at least a portion of the real space corresponding to a field of view of a user.

Electronic devices such as smart phones or mobile communication terminals have become popular, and may be used by relatively more users. Accordingly, the electronic device providing an augmented reality service is required to interwork with electronic devices such as smart phones or mobile communication terminals, thereby providing a variety of augmented reality services to the user.

In accordance with another aspect of the disclosure, a first electronic device is provided. The electronic device includes a communication circuit, a camera, a sensor, a display device, and a processor operably connected to the communication circuit, the display device, the sensor, and the camera, wherein the processor may be configured to establish communication with a second electronic device through the communication circuit, obtain information on at least one object corresponding to a field of view of a user wearing the first electronic device through at least one of the camera or the sensor, obtain information on a user's gaze, determine whether to use the second electronic device as an input device for an augmented reality service, based on the information on the user's gaze and the information on the at least one object, and, when it is determined to use the second electronic device as input device for an augmented reality service, transmit information related to the input device for the augmented reality service to the second electronic device through the communication circuit.

In accordance with another aspect of the disclosure, a second electronic device is provided. The electronic includes a communication circuit, an input device, and a processor operably connected to the communication circuit and the input device, wherein the processor may be configured to establish communication with a first electronic device through the communication circuit, if an input is detected through the input device, identify an input processing method of the second electronic device, if the input processing method is a first method for sharing input, transmit input information to the first electronic device through the communication circuit, and, if the input processing method is a second method in which input sharing is restricted, perform an operation corresponding to the input information.

In accordance with another aspect of the disclosure, a second electronic device is provided. The electronic device includes a communication circuit, a display device, and a processor operably connected to the communication circuit and the display device, wherein the processor may be configured to receive, from a first electronic device, information on at least one object corresponding to a field of view of a user wearing the first electronic device through the communication circuit, identify an object corresponding to a gaze of the user wearing the first electronic device, based on the information on the at least one object, identify whether the object corresponding to the gaze of the user wearing the first electronic device is an object related to the second electronic device, and, when the object corresponding to the gaze of the user wearing the first electronic device is an object different from the object related to the second electronic device, determine to use the second electronic device as an input device for an augmented reality service.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6A illustrates a screen configuration related to an augmented reality service, which is displayed on a first electronic device according to an embodiment of the disclosure;

FIG. 10C illustrates a screen configuration of a first electronic device for interworking with a second electronic device, based on user gaze information, according to an embodiment of the disclosure;

FIG. 24A illustrates an example of changing content to be displayed on a display device in a second electronic device, based on interworking with a first electronic device, according to an embodiment of the disclosure;

FIG. 24B illustrates an example of changing content to be displayed on a display device in a second electronic device, based on interworking with a first electronic device, according to various embodiments of the disclosure;

Throughout the drawings, like reference numerals will be understood to refer to like parts, components, and structures.

DETAILED DESCRIPTION

The following description with reference to the accompanying drawings is provided to assist in a comprehensive understanding of the various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
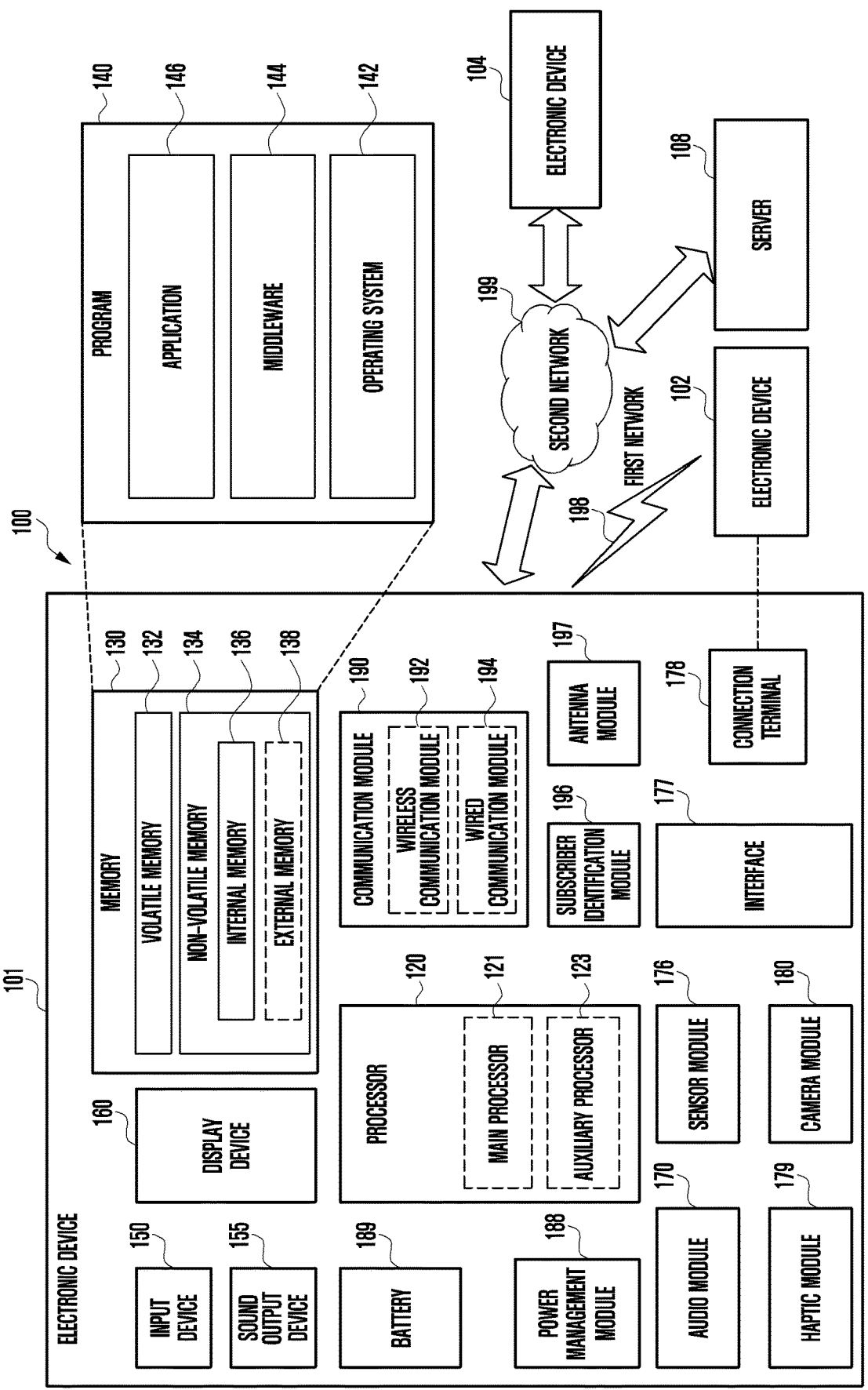
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an example embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
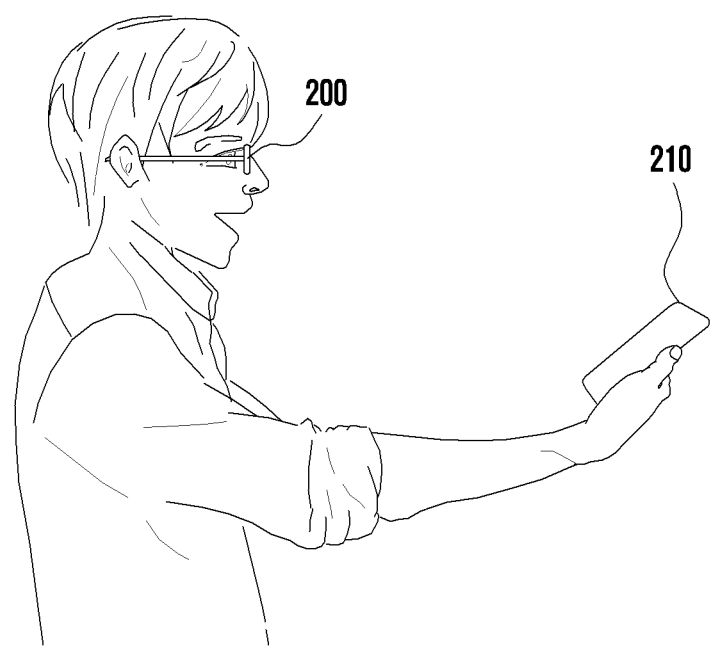
FIG. 2 illustrates a configuration of electronic devices interworking with each other for an augmented reality service according to an embodiment of the disclosure.

FIG. 2 illustrates the configuration of electronic devices interworking with each other for an augmented reality service according to an embodiment of the disclosure.

Referring to FIG. 2, according to various embodiments, a first electronic device 200 may be worn on the head of a user, and may provide an image to the user. According to an embodiment, the first electronic device 200 may provide an augmented reality (AR) service by adding virtual information (e.g., virtual objects) to at least a portion of an image (e.g., a preview image) corresponding to a real space obtained through a camera (e.g., the camera module 180 in FIG. 1) of the first electronic device 200. According to an embodiment, the first electronic device 200 may provide an augmented reality service in which virtual information (e.g., virtual objects) is displayed to overlap at least a portion of the real space corresponding to a field of view (FOV) of a user wearing the first electronic device 200. For example, the first electronic device 200 may provide an augmented reality service by adding virtual information (e.g., virtual objects) to be displayed on at least a portion of the real space to the light entering the eyes of a wearer of the first electronic device 200. As an example, the first electronic device 200 may be configured in the form of at least one of glasses, goggles, a helmet, or a hat, but is not limited thereto.

According to various embodiments, a second electronic device 210 may detect a user input. As an example, the second electronic device 210 may include, but is not limited to, at least one of a portable communication device (e.g., a smart phone) or a portable multimedia device, which may be held and carried by the user.

According to various embodiments, the first electronic device 200 and the second electronic device 210 may interwork with each other by wireless and/or wired connections. According to an embodiment, if the first electronic device 200 and the second electronic device 210 are authenticated by the same user, they may interwork with each other by wireless and/or wired connections. According to an embodiment, the first electronic device 200 may provide an augmented reality service, based on input information provided from the second electronic device 210 that is wirelessly connected thereto. As an example, the input information provided from the second electronic device 210 may include at least one of a touch input, an input onto physical buttons, or information on the movement of the second electronic device 210. As an example, the first electronic device 200 and the second electronic device 210 may interwork with each other through at least one of short-range communication or cellular communication. As an example, the short-range communication may include at least one of Bluetooth, Bluetooth low energy (BLE), or wireless LAN (e.g., Wi-Fi direct). As an example, the cellular communication may include at least one of long-term evolution (LTE), the LTE Advance (LTE-A), 5G {or new radio (NR)}, code division multiple access (CDMA), wideband CDMA (WCDMA), or a global system for mobile communication (GSM).

Figure 3:
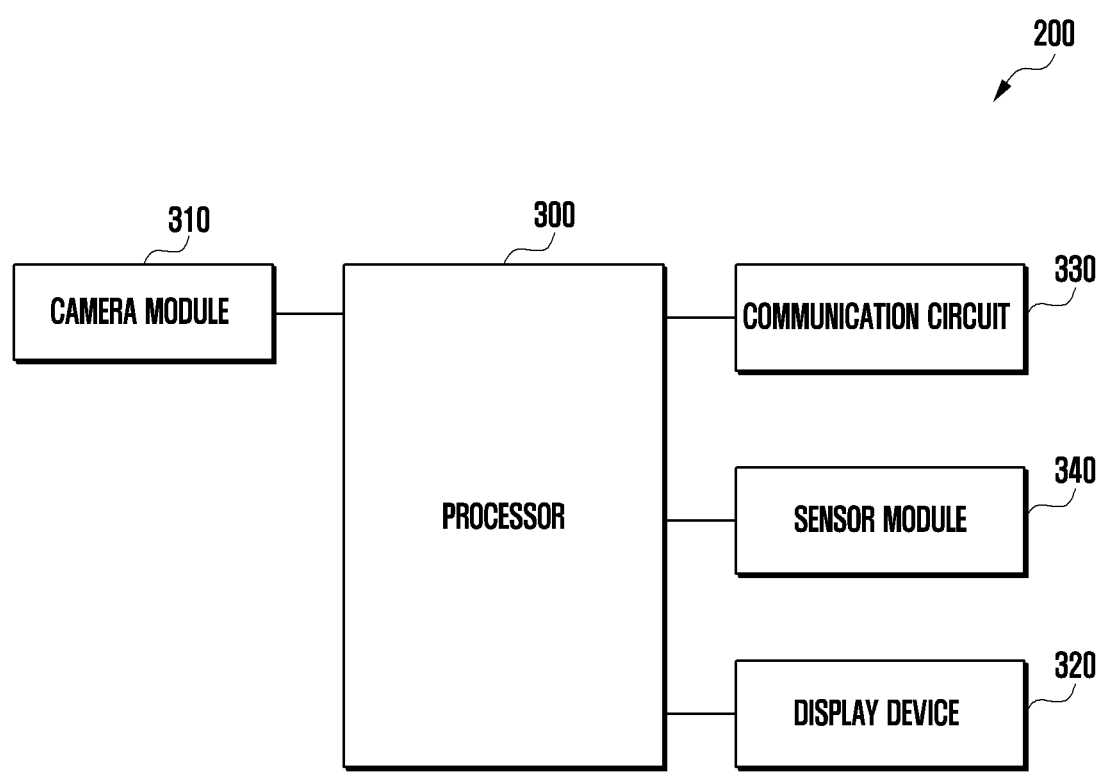
FIG. 3 is a block diagram of a first electronic device for providing an augmented reality service according to an embodiment of the disclosure.

FIG. 3 is a block diagram of a first electronic device for providing an augmented reality service according to an embodiment of the disclosure. As an example, the first electronic device 200 may be the electronic device 101 shown in FIG. 1.

Referring to FIG. 3, according to various embodiments, the first electronic device 200 may include a processor 300, a camera module 310, a display device 320, a communication circuit 330, and/or a sensor module 340. According to an embodiment, the processor 300 may be the same as the processor 120 shown in FIG. 1, or may be included in the processor 120. The camera module 310 may be the same as the camera module 180 shown in FIG. 1, or may be included in the camera module 180. The display device 320 may be the same as the display device 160 shown in FIG. 1, or may be included in the display device 160. The communication circuit 330 may be the same as the communication module 190 shown in FIG. 1, or may be included in the communication module 190. The sensor module 340 may be the same as the sensor module 176 shown in FIG. 1, or may be included in the sensor module 176.

According to various embodiments, the processor 300 may provide an augmented reality service. According to an embodiment, the processor 300 may control the display device 320 to display at least one virtual object such that the at least one virtual object is added to at least a portion of a real space corresponding to a field of view of a user wearing the first electronic device 200. According to an embodiment, the processor 300 may control the display device 320 to display an augmented reality image obtained by adding at least one virtual object to at least a portion of a real-time image (e.g., a preview image) captured by the camera module 310. As an example, the at least one virtual object may include at least one piece of information related to at least one object positioned in the real space obtained through at least one of the camera module 310 or the sensor module 340 (e.g., a spatial sensor) or content related to the execution of an application related thereto.

According to various embodiments, the processor 300 may obtain information on a gaze of a user wearing the first electronic device 200. According to an embodiment, the processor 300 may determine a user's gaze, based on at least one of a head gaze or an eye gaze. As an example, the head gaze corresponds to the movement of a head of the user wearing the first electronic device 200, and may be configured based on the center of the display device 320 or the center of the real-time image obtained through the camera module 310 (e.g., an external camera). As an example, the eye gaze may be configured based on the movement of a pupil of the user wearing the first electronic device 200, which is obtained through the sensor module 340 (e.g., an eye tracking sensor).

According to various embodiments, the processor 300 may determine whether or not to interwork with the second electronic device 210, based on at least one object included in the area corresponding to the field of view of the user wearing the first electronic device 200. According to an embodiment, the processor 300 may determine whether or not to interwork with the second electronic device 210, based on the retention time of a user's gaze corresponding to the object included in the area corresponding to the field of view of the user wearing the first electronic device 200. For example, if the user's gaze, corresponding to the object included in the area corresponding to the field of view of the user wearing the first electronic device 200, is consistently maintained for a reference time, the processor 300 may determine to interwork with the second electronic device 210. For example, if the user's gaze, corresponding to the object included in the area corresponding to the field of view of the user wearing the first electronic device 200, is not consistently maintained for a reference time, the processor 300 may determine to not interwork with the second electronic device 210. As an example, the object included in the area corresponding to the field of view of the user wearing the first electronic device 200 may include at least one of a real object (e.g., an IoT device) detected through at least one of the sensor module 340 (e.g., a spatial sensor) or the camera module 310 or a virtual object.

According to an embodiment, the processor 300 may determine whether or not to interwork with the second electronic device 210, based on whether or not an object related to the second electronic device 210 is included in the area corresponding to the field of view of the user wearing the first electronic device 200. For example, if the object related to the second electronic device 210 is included in the area corresponding to the field of view of the user wearing the first electronic device 200, the processor 300 may determine to not interwork with the second electronic device 210. For example, if the object related to the second electronic device 210 does not exist in the area corresponding to the field of view of the user wearing the first electronic device 200, the processor 300 may determine to interwork with the second electronic device 210. As an example, if object information corresponding to the external configuration exceeding a reference range, among the overall external configuration of the second electronic device 210, is obtained through at least one of the camera module 310 or the sensor module 340 (e.g., a spatial sensor), the processor 300 may determine that the object related to the second electronic device 210 is included in the area corresponding to the field of view of the user wearing the first electronic device 200. As an example, the object related to the second electronic device 210 may include at least one of an object related to the exterior of the second electronic device 210 obtained through at least one of the camera module 310 or the sensor module 340 (e.g., a spatial sensor) or an object related to the content displayed on the display device (e.g., the display device 440 in FIG. 4) of the second electronic device 210. As an example, interworking with the second electronic device may include an operation in which the first electronic device uses the second electronic device as an input device for an augmented reality service.

According to an embodiment, the processor 300 may determine whether or not to interwork with the second electronic device 210, based on a user's gaze corresponding to the object related to the second electronic device 210, which is included in the area corresponding to the field of view of the user wearing the first electronic device 200. For example, if a user's gaze corresponding to the object related to the second electronic device 210, which is included in the area corresponding to the field of view of the user wearing the first electronic device 200, is identified, the processor 300 may determine to not interwork with the second electronic device 210. For example, if a user's gaze corresponding to the object related to the second electronic device 210, which is included in the area corresponding to the field of view of the user wearing the first electronic device 200, is maintained for a reference time, the processor 300 may determine to not interwork with the second electronic device 210. For example, if the object related to the second electronic device 210 does not exist in the area corresponding to the field of view of the user wearing the first electronic device 200, or if a user's gaze corresponding to an object other than the object related to the second electronic device 210 is identified, the processor 300 may determine to interwork with the second electronic device 210.

According to an embodiment, the processor 300 may determine whether or not to interwork with the second electronic device 210, based on information on the positions of the first electronic device 200 and the second electronic device 210. For example, if the second electronic device 210 is positioned within a reference range of the first electronic device 200, the processor 300 may determine to interwork with the second electronic device 210. For example, if the second electronic device 210 is positioned outside a reference range of the first electronic device 200, the processor 300 may determine to not interwork with the second electronic device 210. As an example, the information on the position of the first electronic device 200 may be obtained based on the sensor module 340. The information on the position of the second electronic device 210 may be provided from the second electronic device 210 through a wireless path with the second electronic device 210.

According to various embodiments, if the processor 300 determines to interwork with the second electronic device 210, the processor 300 may control (or manage) an augmented reality service, based on input information provided from the second electronic device 210. According to an embodiment, if the processor 300 determines to interwork with the second electronic device 210, the processor 300 may transmit interworking information to the second electronic device 210. If the processor 300 receives input information from the second electronic device 210 in response to the interworking information, the processor 300 may control an augmented reality service, based on the input information provided from the second electronic device 210. For example, the processor 300 may control the display device 320 to display a functional user interface (UI) corresponding to the object included in the area corresponding to the field of view of the user wearing the first electronic device 200, based on the input information provided from the second electronic device 210. The processor 300 may control the operation of the corresponding object, based on a menu corresponding to additional input information provided from the second electronic device 210, among one or more menus included in the functional UI. As an example, the object in which the functional user interface is displayed may include an object corresponding to the user's gaze at the time at which the input information is received from the second electronic device 210, among the objects included in the area corresponding to the field of view of the user wearing the first electronic device 200. For example, the processor 300 may provide a control user interface corresponding to the object included in the area corresponding to the field of view of the user wearing the first electronic device 200, based on the input information provided from the second electronic device 210. As an example, the processor 300 may adjust a display form (e.g., the size, the position, or the angle) of the object corresponding to the user's gaze, based on the input information provided from the second electronic device 210. As an example, the input information provided from the second electronic device 210 may include at least one of a user input detected through an input device (e.g., the input device 420 in FIG. 4) of the second electronic device 210 or sensing data obtained through a sensor module (e.g., the sensor module 430 in FIG. 4) of the second electronic device 210. According to an embodiment, if the processor 300 determines to not interwork with the second electronic device 210, the processor 300 may transmit non-interworking information to the second electronic device 210. As an example, interworking information includes information related to the input device for the augmented reality service of the second electronic device 210.

According to various embodiments, if the processor 300 determines to interwork with the second electronic device 210, the processor 300 may configure a display method related to an augmented reality service, based on the direction of the second electronic device 210. As an example, if the direction of a relatively longer axis of the second electronic device 210, which is configured in a longitudinal shape, is parallel to the direction of gravity, the second electronic device 210 may be determined to be in the vertical direction, and if the direction of the relatively longer axis is perpendicular to the direction of gravity, the second electronic device 210 may be determined to be in the horizontal direction. According to an embodiment, the processor 300 may configure a method of displaying at least one virtual object for the augmented reality service, based on the direction of the second electronic device 210. For example, if the second electronic device 210 is in the vertical direction, the display device 320 may display the virtual object in the vertical direction. For example, if the second electronic device 210 is in the horizontal direction, the display device 320 may display the virtual object in the horizontal direction. According to an embodiment, the processor 300 may differently configure the form of the functional UI, based on the direction of the second electronic device 210. As an example, the form of the functional UI may include at least one of the types of menus, the arrangement of menus, or a method of switching menus included in the functional UI. As an example, the direction of the second electronic device 210 may be identified, based on the sensing data provided from the second electronic device 210.

According to various embodiments, the processor 300 may interwork with the second electronic device 210, thereby registering Internet of Things (IoT) devices. According to an embodiment, the processor 300 may detect the IoT devices positioned in the area corresponding to the field of view of the user wearing the first electronic device 200 using at least one of the camera module 310 or the sensor module 340 (e.g., a spatial sensor). If there is no registration information on the IoT device, the processor 300 may transmit information related to the IoT device to the second electronic device 210. As an example, if registration request information related to the IoT device is received from the second electronic device 210, the processor 300 may control the display device 320 to display a registration screen for the IoT device. If a registration input corresponding to the registration screen displayed on the display device 320 is detected, the processor 300 may register the IoT device at the position (e.g., in the living room) of the first electronic device 200. As an example, if registration information related to the IoT device is received from the second electronic device 210, the processor 300 may control the display device 320 to display a virtual object (e.g., information on the IoT device) corresponding to the IoT device. As an example, the information related to the IoT device may include the type of the device and/or information on the position thereof.

According to various embodiments, the processor 300 may change a display method and/or display information of the display device 320, based on user gaze information. According to an embodiment, if it is determined that a gaze of the user wearing the first electronic device 200 is directed toward the object related to the second electronic device 210, which is included in the area corresponding to the field of view of the user, the processor 300 may adjust the transparency and/or brightness of the virtual object displayed on the display device 440. For example, if it is determined that the user's gaze is directed toward the object related to the second electronic device 210, the processor 300 may control the display device 320 so as to relatively increase the brightness of at least one virtual object displayed on the display device 320 or adjust the transparency thereof such that the virtual object is relatively transparent, thereby facilitating the user to concentrate on the display screen of the second electronic device 210.

According to various embodiments, the camera module 310 may take a still image and/or a video. According to an embodiment, the camera module 310 may include an external camera (not shown) for taking a real-time image corresponding to the field of view of the user wearing the first electronic device 200.

According to various embodiments, the display device 320 may display information processed in the first electronic device 200. According to an embodiment, the display device 320 may display at least one virtual object in the area corresponding to the field of view of the user wearing the first electronic device 200 while the user is gazing at the real space through the display device 320. As an example, the field of view of the user may include an angle at which the user may recognize an object without turning the head or moving the pupil while looking straight ahead or a range thereof. As an example, the area corresponding to the field of view of the user may be the same as the entire display area of the display device 320, or may be configured to be smaller than the entire display area. In addition, the area corresponding to the field of view of the user may be determined or adjusted, based on the distance from the eye of the user to the display device 320. According to an embodiment, the display device 320 may display an image in an augmented reality (AR) form by adding at least one virtual object to the real-time image obtained through the camera module 310.

According to various embodiments, the communication circuit 330 may support communication between the first electronic device 200 and the second electronic device 210 using wired and/or wireless communication channels. As an example, the wireless channel of the first electronic device 200 and the second electronic device 210 may be established, based on short-range communication schemes or cellular communication schemes.

According to various embodiments, the sensor module 340 may detect the operation state of the first electronic device 200 or the external environment state, and may provide the detected information to the processor 300. According to an embodiment, the sensor module 340 may include a motion sensor for detecting the movement of the first electronic device 200 (or the user). As an example, the motion sensor may include at least one of an acceleration sensor, a tilt sensor, a gyro sensor, or a 3-axis magnetic sensor. According to an embodiment, the sensor module 340 may include a position sensor {e.g., a global navigation satellite system (GNSS)} for detecting information on the position of the first electronic device 200. According to an embodiment, the sensor module 340 may include a detection sensor (e.g., a proximity sensor) for determining whether or not the first electronic device 200 is worn on the user. According to an embodiment, the sensor module 340 may include a spatial sensor for recognizing an object included in the area (e.g., a real space) corresponding to the field of view of the user wearing the first electronic device 200. As an example, the spatial sensor may include at least one of an optical sensor (e.g., an infrared sensor) or a depth sensor.

According to various embodiments, if the object related to the second electronic device 210 is included in the area corresponding to the field of view of the user wearing the first electronic device 200, the first electronic device 200 may determine to interwork with the second electronic device 210. According to an embodiment, if the user's gaze corresponding to the object related to the second electronic device 210, which is included in the area corresponding to the field of view of the user wearing the first electronic device 200, is maintained for a reference time, the processor 300 may determine to interwork with the second electronic device 210.

Figure 4:
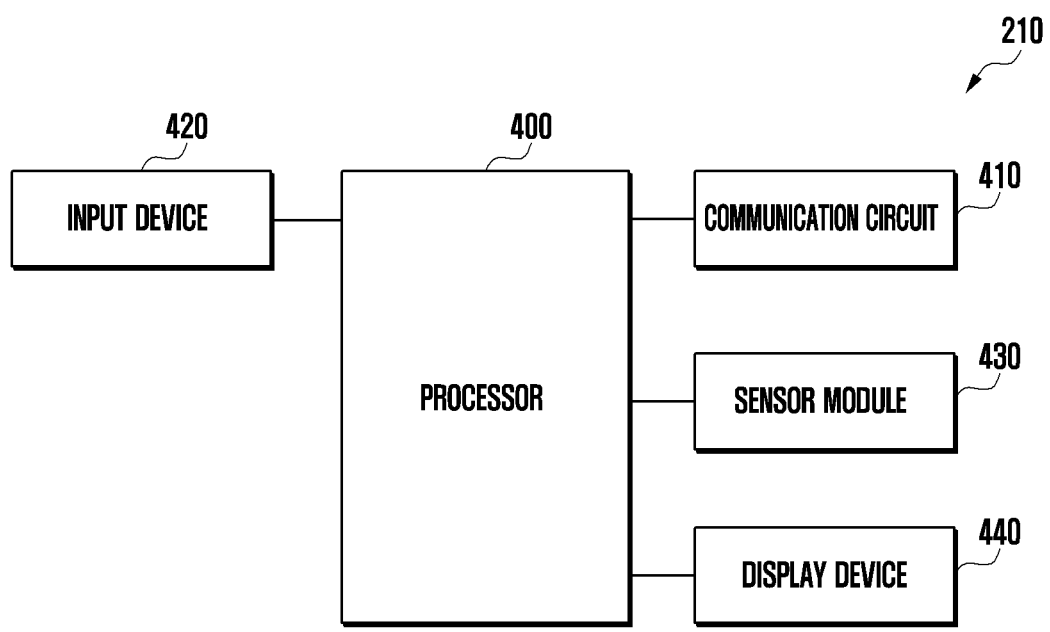
FIG. 4 is a block diagram of a second electronic device for providing an augmented reality service according to an embodiment of the disclosure.

FIG. 4 is a block diagram of a second electronic device for providing an augmented reality service according to an embodiment of the disclosure. As an example, the second electronic device 210 may be the electronic device 101 shown in FIG. 1.

Referring to FIG. 4, according to various embodiments, the second electronic device 210 may include a processor 400, a communication circuit 410, an input device 420, a sensor module 430, and/or a display device 440. According to an embodiment, the processor 400 may be the same as the processor 120 shown in FIG. 1, or may be included in the processor 120. The communication circuit 410 may be the same as the communication module 190 shown in FIG. 1, or may be included in the communication module 190. The input device 420 may be the same as the input device 150 shown in FIG. 1, or may be included in the input device 150. The sensor module 430 may be the same as the sensor module 176 shown in FIG. 1, or may be included in the sensor module 176. The display device 440 may be the same as the display device 160 shown in FIG. 1, or may be included in the display device 160.

According to various embodiments, the processor 400 may configure an input processing method of the second electronic device 210. According to an embodiment, the processor 400 may configure the input processing method of the second electronic device 210, based on interworking information provided from the first electronic device 200. For example, if interworking information is received from the first electronic device 200 through the communication circuit 410, the processor 400 may determine to interwork with the first electronic device 200 in order to provide an augmented reality service. In this case, the processor 400 may configure the input processing method of the second electronic device 210 as a first method for sharing the input information with the first electronic device 200. For example, if non-interworking information is received from the first electronic device 200 through the communication circuit 410, the processor 400 may determine that interworking with the first electronic device 200 for providing an augmented reality service is restricted. In this case, the processor 400 may configure the input processing method of the second electronic device 210 as a second method in which sharing the input information with the first electronic device 200 is restricted.

According to an embodiment, the processor 400 may configure the input processing method of the second electronic device 210, based on information related to an augmented reality service, which is provided from the first electronic device 200. As an example, the information related to an augmented reality service may include at least one piece of information on an object included in the area corresponding to the field of view of the user wearing the first electronic device 200, information on a gaze of a user wearing the first electronic device 200, or information on the position of the first electronic device 200. For example, the processor 400 may identify whether or not the second electronic device 210 is to interwork with the first electronic device 200 in order to provide an augmented reality service, based on the information on the object included in the area corresponding to the field of view of the user wearing the first electronic device 200. As an example, the processor 400 may determine whether or not to interwork with the first electronic device 200, based on at least one of a retention time of the user's gaze corresponding to the object included in the area corresponding to the field of view of the user wearing the first electronic device 200, whether or not an object related to the second electronic device 210 is included in the area corresponding to the field of view of the user wearing the first electronic device 200, or user gaze information corresponding to the object related to the second electronic device 210. For example, the processor 400 may identify whether or not the second electronic device 210 is to interwork with the first electronic device 200 in order to provide an augmented reality service, based on the information on the position of the first electronic device 200. As an example, if the second electronic device 210 interworks with the first electronic device 200 in order to provide an augmented reality service, the input processing method of the second electronic device 210 may be configured as a first method. As an example, if the second electronic device 210 interworking with the first electronic device 200 in order to provide an augmented reality service is restricted, the input processing method of the second electronic device 210 may be configured as a second method.

According to various embodiments, the processor 400 may perform control such that input information is selectively shared with the first electronic device 200. According to an embodiment, if the processor 400 detects an input through the input device 420 and/or the sensor module 430, the processor 400 may identify the input processing method of the second electronic device 210. For example, if the input processing method of the second electronic device 210 is the first method, the processor 400 may control the communication circuit 410 to transmit input information to the first electronic device 200. In this case, the processor 400 may restrict the second electronic device 210 from performing an operation corresponding to the corresponding input. For example, if the input processing method of the second electronic device 210 is the second method, the processor 400 may perform an operation corresponding to the input information.

According to various embodiments, if the second electronic device 210 interworks with the first electronic device 200 in order to provide an augmented reality service, the processor 400 may change a display method and/or display information of the display device 440. According to an embodiment, if the processor 400 determines that the second electronic device 210 is to interwork with the first electronic device 200 in order to provide an augmented reality service, the processor 400 may adjust an active mode and/or brightness of the display device 440. For example, if the processor 400 determines to interwork with the first electronic device 200, the processor 400 may control the display device 440 to switch to an inactive mode. For example, if the processor 400 determines to interwork with the first electronic device 200, the processor 400 may control the display device 440 so as to darken the display area of the display device 440. According to an embodiment, if the processor 400 determines that the second electronic device 210 is to interwork with the first electronic device 200 in order to provide an augmented reality service, the processor 400 may change content of the display device 440. For example, if the processor 400 determines to interwork with the first electronic device 200, the processor 400 may control the display device 440 to display content related to the augmented reality service provided from the first electronic device 200.

According to various embodiments, the processor 400 may interwork with the first electronic device 200, thereby registering IoT devices. According to an embodiment, the processor 400 may receive information related to an IoT device from the first electronic device 200 through the communication circuit 410. The processor 400 may identify registration information related to the IoT device, which is provided from the first electronic device 200, through a memory (e.g., the memory 130 in FIG. 1). For example, if the registration information on the IoT device is identified, the processor 400 may control the communication circuit 410 to transmit the registration information on the IoT device to the first electronic device 200. For example, if the registration information on the IoT device is not identified, the processor 400 may control the communication circuit 410 to transmit registration request information to the first electronic device 200. If the registration information on the IoT device is received from the first electronic device 200 through the communication circuit 410, the processor 400 may register the IoT device at the position of the first electronic device 200 (or the second electronic device 210). As an example, the information related to the IoT device may include the type of the device recognized in the first electronic device 200 and/or information on the position of the first electronic device 200.

According to various embodiments, the communication circuit 410 may support communication between the first electronic device 200 and the second electronic device 210 using wired and/or wireless communication channels. As an example, the wireless channel of the first electronic device 200 and the second electronic device 210 may be established, based on short-range communication schemes such as Bluetooth, BLE, or wireless LAN.

According to various embodiments, the input device 420 may receive commands or data related to the second electronic device 210 from the outside (e.g., a user) of the second electronic device 210. As an example, the input device 420 may include a microphone, a mouse, a keyboard, a digital pen (e.g., a stylus pen), or a touch circuit capable of detecting touch input.

According to various embodiments, the sensor module 430 may detect the operation state of the second electronic device 210 or the external environment state, and may provide the detected information to the processor 400. According to an embodiment, the sensor module 430 may include a motion sensor for detecting the movement of the second electronic device 210 (or the user). According to an embodiment, the sensor module 430 may include a position sensor (e.g., GNSS) for detecting information on the position of the second electronic device 210. According to an embodiment, the sensor module 430 may include a detection sensor (e.g., a proximity sensor) for determining whether or not the second electronic device 210 is worn on the user.

According to various embodiments, the display device 440 may display information processed by the second electronic device 210. According to an embodiment, the display device 440 may display content related to the application executed in the second electronic device 210.

According to various embodiments, the first electronic device 200 may provide an augmented reality service, based on the control of the second electronic device 210 or an external server (e.g., the server 108 in FIG. 1). According to an embodiment, the first electronic device 200 may display at least one virtual object such that the at least one virtual object is added to at least a portion of the real space corresponding to the field of view of the user wearing the first electronic device 200, based on information related to the virtual object provided from the second electronic device 210 or the external server. As an example, the information related to the virtual object may include at least one of the position at which the virtual object is to be displayed, the type of the virtual object, or a configuration of the virtual object. According to an embodiment, the first electronic device 200 may transmit, to the second electronic device 210 or the external server, at least one piece of information on the object included in the area corresponding to the field of view of the user wearing the first electronic device 200 (or spatial information) or user gaze information, which is obtained through at least one of the camera module 310 or the sensor module 340 (e.g., the spatial sensor). According to an embodiment, the second electronic device 210 or the external server may determine the input processing method of the second electronic device 210, based on at least one piece of the information on the object included in the area corresponding to the field of view of the user wearing the first electronic device 200 (or spatial information) or the user gaze information, which is provided from the first electronic device 200. For example, if a user's gaze corresponding to the object related to the second electronic device 210, included in the area corresponding to the field of view of the user wearing the first electronic device 200, is identified, the second electronic device 210 or the external server may configure the input processing method of the second electronic device 210 as a second method. For example, if the object related to the second electronic device 210 does not exist in the area corresponding to the field of view of the user wearing the first electronic device 200, or if a user's gaze corresponding to an object, other than the object related to the second electronic device 210, is identified, the second electronic device 210 or the external server may configure the input processing method of the second electronic device 210 as a first method. In this case, the second electronic device 210 may determine the input of the second electronic device 210 to be an input for controlling an augmented reality service.

According to various embodiments, a first electronic device (e.g., the electronic device 101 in FIG. 1 or the first electronic device 200 in FIG. 2) may include: a communication circuit (e.g., the communication module 190 in FIG. 1 or the communication circuit 330 in FIG. 3); a camera (e.g., the camera module 180 in FIG. 1 or the camera module 310 in FIG. 3); a sensor (e.g., the sensor module 176 in FIG. 1 or the sensor module 340 in FIG. 3); a display device (e.g., the display device 160 in FIG. 1 or the display device 320 in FIG. 3); and a processor (e.g., the processor 120 in FIG. 1 or the processor 300 in FIG. 3) operably connected to the communication circuit, the display device, the sensor, and the camera, wherein the processor may be configured to: establish communication with a second electronic device through the communication circuit; obtain information on at least one object corresponding to a field of view of a user wearing the first electronic device through at least one of the camera or the sensor; obtain information on a user's gaze; based on the information on the user's gaze and the information on the at least one object, determine whether to use the second electronic device as an input device for an augmented reality service; and when it is determined to use the second electronic device as the input device for an augmented reality service, transmit information related to the input device for the augmented reality service to the second electronic device through the communication circuit.

According to various embodiments, the processor is further configured to obtain the information on the user's gaze, based on at least one of a head gaze or an eye gaze of the first electronic device.

According to various embodiments, the processor is further configured to control the display device to display at least one virtual object on at least a portion of an area corresponding to the field of view of the user wearing the first electronic device.

According to various embodiments, the processor is further configured to determine to use the second electronic device as the input device for the augmented reality service when the user's gaze corresponding to at least one object corresponding to the field of view of the user wearing the first electronic device or any one object of the at least one virtual object is consistently maintained for a reference time, and determine to not use the second electronic device as the input device for the augmented reality service when the user's gaze corresponding to the any one object is not maintained for the reference time.

According to various embodiments, the processor is further configured to: when an object related to the second electronic device exists in an area corresponding to the field of view of the user wearing the first electronic device, identify whether the user's gaze is directed toward the object related to the second electronic device; when the user's gaze is directed toward an object other than the object related to the second electronic device, determine to use the second electronic device as the input device for the augmented reality service; and when the user's gaze is directed toward the object related to the second electronic device, determine to not use the second electronic device as the input device for the augmented reality service.

According to various embodiments, the processor is further configured to: when it is determined to use the second electronic device as the input device for the augmented reality service, identify whether input information is received from the second electronic device through the communication circuit; and, when the input information is received from the second electronic device, perform an operation corresponding to the input information.

According to various embodiments, the input information received from the second electronic device may include at least one of a touch input, a physical button input, or information on a motion of the second electronic device.

According to various embodiments, the processor is further configured to, when the input information is received from the second electronic device, identify an object corresponding to the user's gaze and control the display device to display a control menu related to the object corresponding to the user's gaze.

According to various embodiments, a second electronic device (e.g., the electronic device 101 in FIG. 1 or the second electronic device 210 in FIG. 2) may include: a communication circuit (e.g., the communication module 190 in FIG. 1 or the communication circuit 410 in FIG. 4); an input device (e.g., the input device 150 in FIG. 1 or the input device 420 in FIG. 4); and a processor (e.g., the processor 120 in FIG. 1 or the processor 400 in FIG. 4) operably connected to the communication circuit and the input device, wherein the processor may be configured to: establish communication with a first electronic device through the communication circuit; if an input is detected through the input device, identify an input processing method of the second electronic device; when the input processing method is a first method for sharing input, transmit information on the input to the first electronic device through the communication circuit; and when the input processing method is a second method in which input sharing is restricted, perform an operation corresponding to the information on the input.

According to various embodiments, the processor is further configured to configure the input processing method of the second electronic device as the first method when information related to an input device for an augmented reality service is received from the first electronic device through the communication circuit, and configure the input processing method of the second electronic device as a second method when the information related to the input device for the augmented reality service is not received from the first electronic device through the communication circuit, or when non-interworking information is received therefrom.

According to various embodiments, the second electronic device may further include a display device, and the processor is further configured to, when information related to an input device for an augmented reality service is received from the first electronic device through the communication circuit, control the display device to one of change display information or change a display method of the display device.

According to various embodiments, the input device may include at least one of a touch circuit or physical buttons.

According to various embodiments, a second electronic device (e.g., the electronic device 101 in FIG. 1 or the second electronic device 210 in FIG. 2) may include: a communication circuit; a display device; and a processor operably connected to the communication circuit and the display device, wherein the processor may be configured to:

receive, from a first electronic device, information on at least one object corresponding to a field of view of a user wearing the first electronic device through the communication circuit; based on the information on the at least one object, identify an object corresponding to a gaze of the user wearing the first electronic device, identify whether the object corresponding to the gaze of the user wearing the first electronic device is an object related to the second electronic device; and when the object corresponding to the gaze of the user wearing the first electronic device is an object different from the object related to the second electronic device, determine to use the second electronic device as an input device for an augmented reality service.

According to various embodiments, the processor is further configured to obtain information on the user's gaze, based on at least one of a head gaze or an eye gaze of the first electronic device.

According to various embodiments, the processor is further configured to control the first electronic device to display at least one virtual object on at least a portion of the area corresponding to the field of view of the user wearing the first electronic device.

According to various embodiments, the processor is further configured to, when the object related to the second electronic device is not included in the at least one object corresponding to the field of view of the user wearing the first electronic device, determine to use the second first electronic device as the input device for an augmented reality service.

According to various embodiments, the processor is further configured to, when the user's gaze is directed toward the object related to the second electronic device, determine to not use the second first electronic device as the input device for the augmented reality service.

According to various embodiments, the processor is further configured to, when it is determined to use the second electronic device as the input device for the augmented reality service, transmit, to the first electronic device, information related to an operation corresponding to input information obtained by the second electronic device.

According to various embodiments, the input information obtained by the second electronic device may include at least one of a touch input, a physical button input, or information on a motion of the second electronic device.

According to various embodiments, the processor is further configured to, when the input information is detected, identify an object corresponding to the user's gaze based on the information on the at least one object, and transmit a control menu related to the object corresponding to the user's gaze to the first electronic device.

Figure 5:
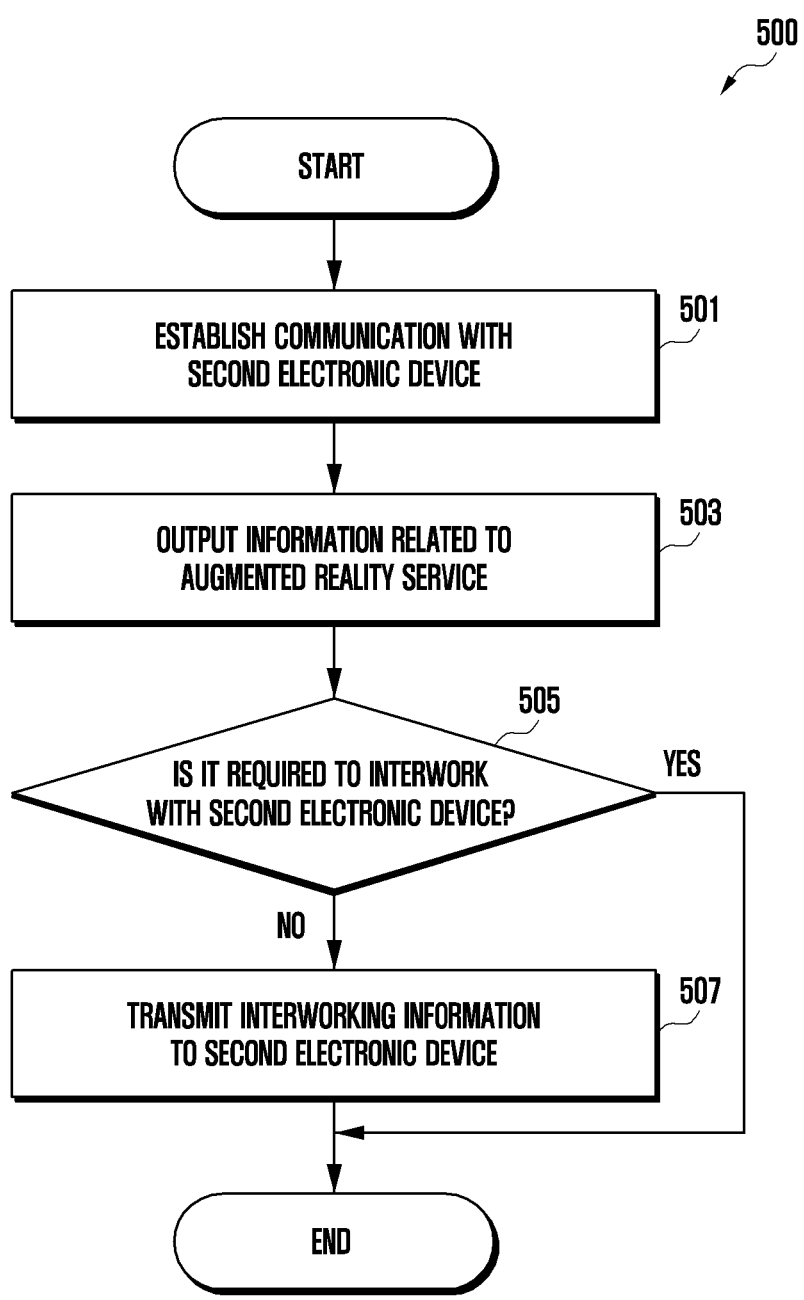
FIG. 5 is a flowchart in which a first electronic device interworks with a second electronic device according to an embodiment of the disclosure.

FIG. 5 is a flowchart in which a first electronic device interworks with a second electronic device according to an embodiment of the disclosure. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the first electronic device 200 shown in FIG. 3. As an example, at least some of the elements shown in FIG. 5 will be described with reference to FIGS. 6A, 6B, 6C and 6D.

FIG. 6A illustrates a screen configuration related to an augmented reality service, which is displayed on a first electronic device according to an embodiment of the disclosure.

Figure 6B:
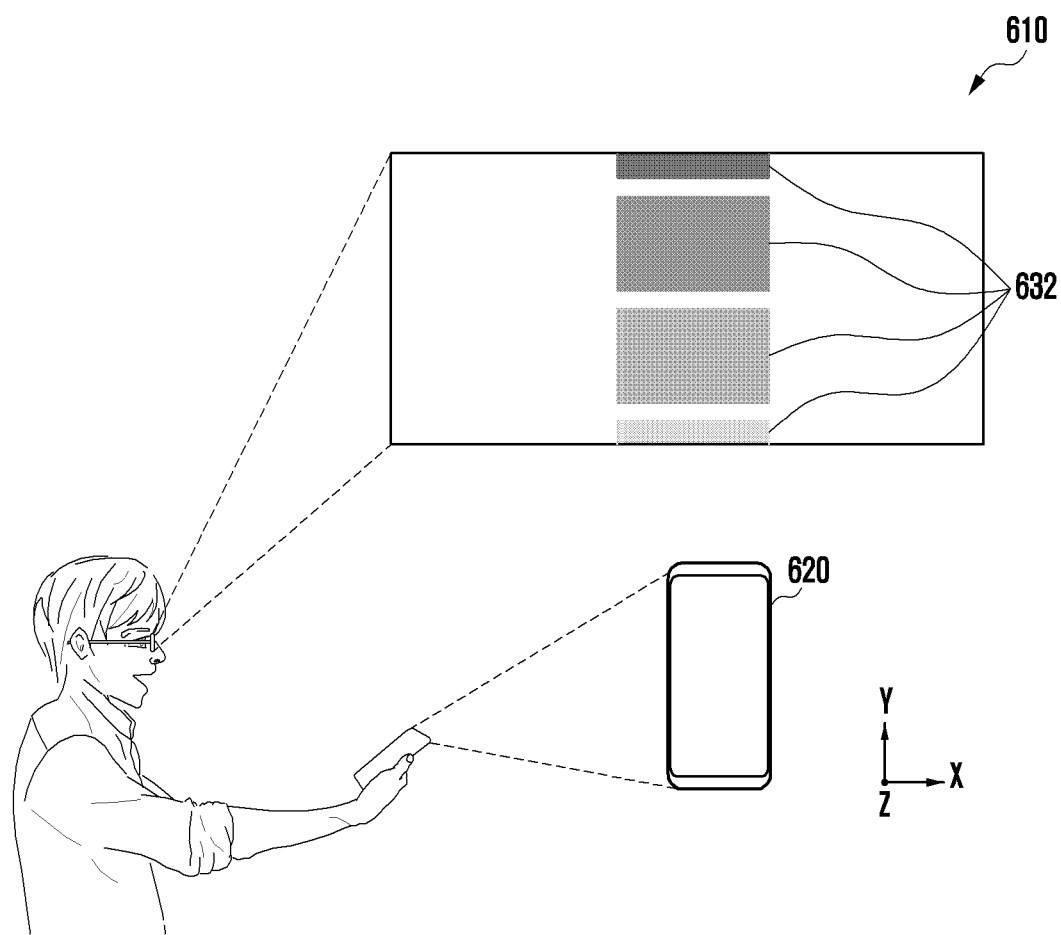
FIG. 6B illustrates a screen configuration related to an augmented reality service, which is displayed on a first electronic device according to an embodiment of the disclosure.

FIG. 6B illustrates a screen configuration related to an augmented reality service, which is displayed on a first electronic device according to an embodiment of the disclosure.

Figure 6C:
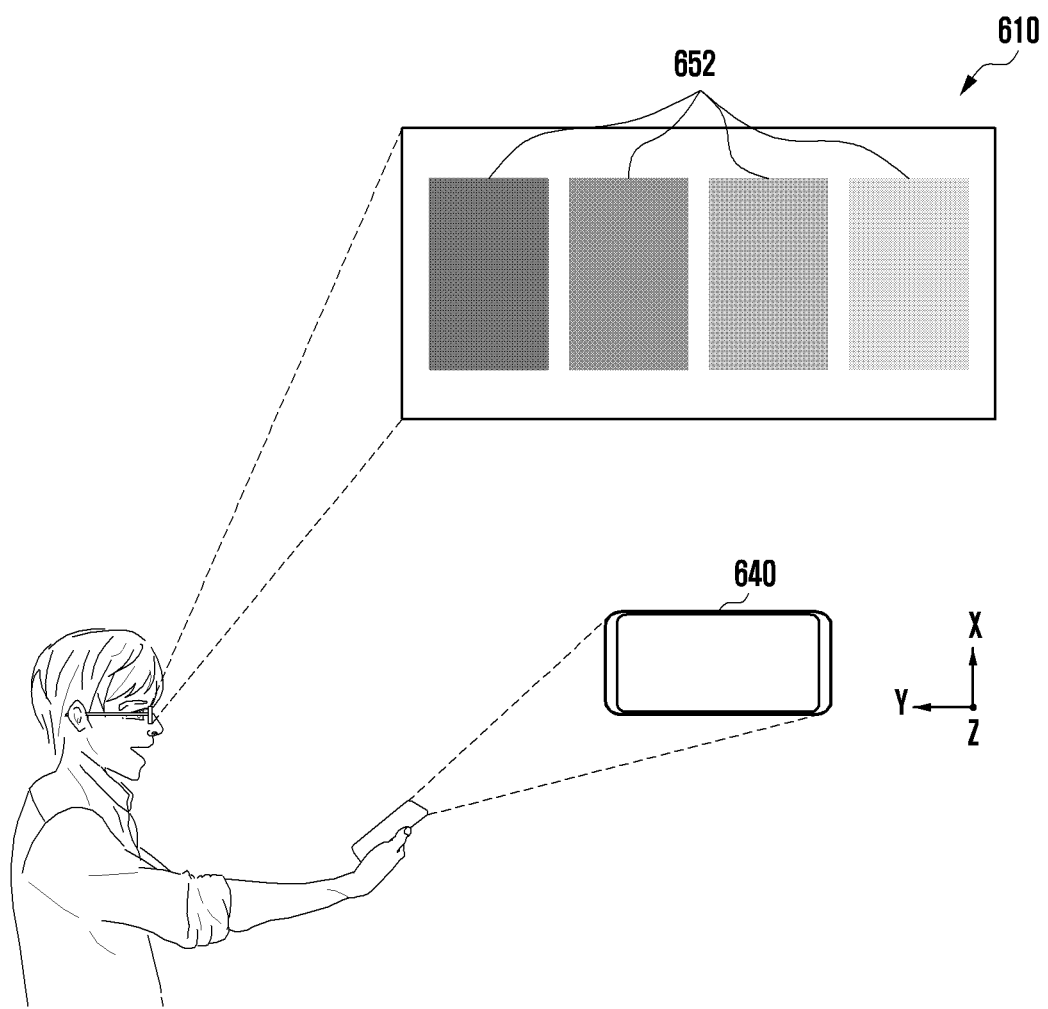
FIG. 6C illustrates a screen configuration related to an augmented reality service, which is displayed on a first electronic device according to an embodiment of the disclosure.

FIG. 6C illustrates a screen configuration related to an augmented reality service, which is displayed on a first electronic device according to an embodiment of the disclosure.

Figure 6D:
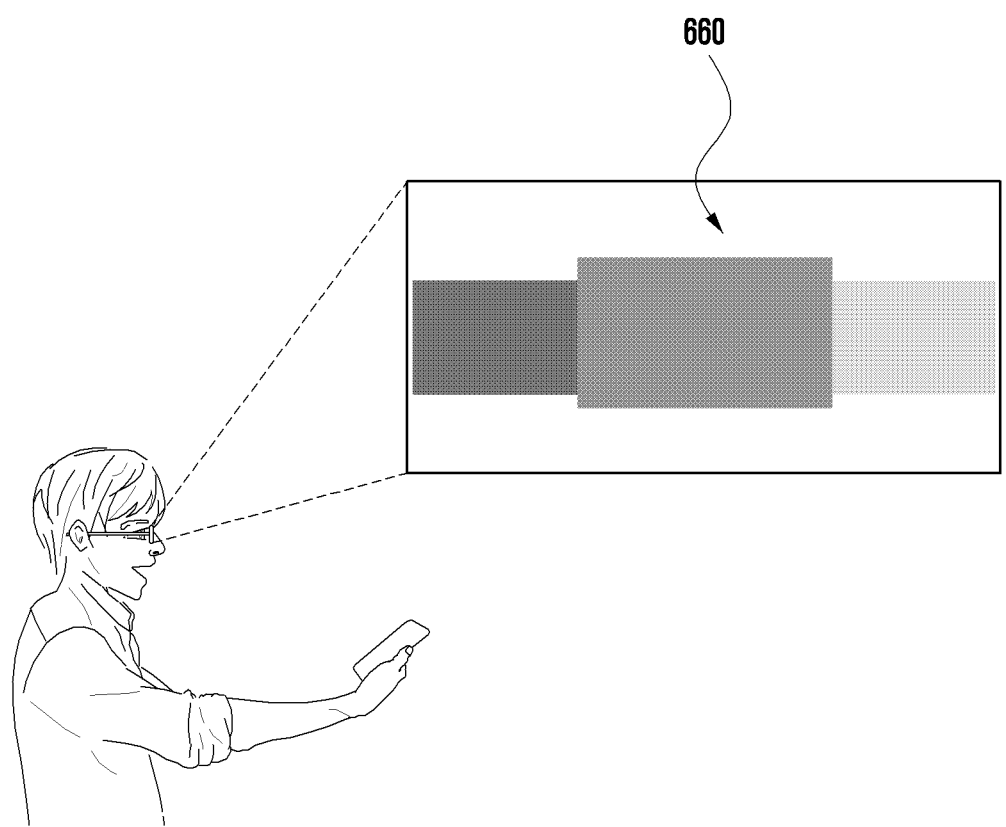
FIG. 6D illustrates a screen configuration related to an augmented reality service, which is displayed on a first electronic device according to various embodiment of the disclosure.

FIG. 6D illustrates a screen configuration related to an augmented reality service, which is displayed on a first electronic device according to an embodiment of the disclosure.

Referring to FIG. 5, according to various embodiments, in a method 500, a first electronic device (e.g., the processor 120 in FIG. 1, the communication module 190 in FIG. 1, the processor 300 in FIG. 3, or the communication circuit 330 in FIG. 3) may establish a communication link (or a communication channel) with a second electronic device (e.g., the second electronic device 210 in FIG. 2) in operation 501. According to an embodiment, if user information configured in the first electronic device 200 is the same as that configured in the second electronic device 210, the processor 300 may control the communication circuit 330 to establish a communication link (or a communication channel) with the second electronic device 210.

According to various embodiments, the first electronic device (e.g., the processor 120 or 300) may output information related to an augmented reality service in operation 503. According to an embodiment, the processor 300 may recognize at least one object existing in a real space corresponding to a field of view of a user wearing the first electronic device 200 through at least one of the camera module 310 or the sensor module 340 (e.g., the spatial sensor). The processor 300 may control the display device 320 to display at least one virtual object related to at least one object existing in the real space.

Referring to FIG. 6A, the display device 320 may display at least one virtual object 614 and/or 616 in the area 610 corresponding to the field of view of the user wearing the first electronic device 200 while the user is gazing at the real space through the display device 320. As an example, a first virtual object 614 may include information (e.g., state information) related to the object 612 (e.g., a television set) in the real space. As an example, a second virtual object 616 may include information (e.g., a play screen) related to an application (e.g., a music application) executed in the first electronic device 200. According to an embodiment, the processor 300 may control the display device 320 to display an augmented reality image in which at least one virtual object is added to at least a portion of a real-time image (e.g., a preview image) obtained through the camera module 310. According to an embodiment, the processor 300 may configure a method of displaying virtual objects, based on the direction of the second electronic device 210 connected to the first electronic device 200 through the communication link.

Referring to FIG. 6B, if the second electronic device 210 is in the vertical direction (see 620), the processor 300 may control the display device 320 to display a plurality of virtual objects 632 in the vertical direction in the area 610 corresponding to the field of view of the user wearing the first electronic device 200.

Referring to FIG. 6C, if the second electronic device 210 is in the horizontal direction (see 640), the processor 300 may control the display device 320 to display a plurality of virtual objects 652 in the horizontal direction in the area 610 corresponding to the field of view of the user wearing the first electronic device 200.

According to various embodiments, in operation 505, the first electronic device (e.g., the processor 120 or 300) may determine whether or not to interwork with the second electronic device (e.g., the second electronic device 210 in FIG. 2) while providing an augmented reality service. According to an embodiment, the processor 300 may determine whether or not to interwork with the second electronic device, based on information on an object included in the area corresponding to the field of view of the user wearing the first electronic device 200. As an example, the information on the object included in the area corresponding to the field of view of the user may include at least one of a retention time of a user's gaze corresponding to the object included in the area corresponding to the field of view of the user wearing the first electronic device 200, whether or not an object related to the second electronic device 210 is included in the area corresponding to the field of view of the user wearing the first electronic device 200, or information on a user's gaze corresponding to the object related to the second electronic device 210. According to an embodiment, the processor 300 may determine whether or not to interwork with the second electronic device, based on information on the positions of the first electronic device 200 and the second electronic device 210. As an example, interworking with the second electronic device may include an operation in which the first electronic device uses the second electronic device as an input device for an augmented reality service.

According to various embodiments, if the first electronic device (e.g., the processor 120 or 300) determines to interwork with the second electronic device (e.g., the second electronic device 210 in FIG. 2) for an augmented reality service (e.g., "YES" in operation 505), the first electronic device may transmit interworking information related to an augmented reality service to the second electronic device in operation 507. As an example, interworking information includes information related to the input device for the augmented reality service of the second electronic device 210. According to an embodiment, the processor 300 may control the communication circuit 330 to transmit, to the second electronic device 210, information indicating interworking with the second electronic device 210 for an augmented reality service.

According to various embodiments, if the first electronic device (e.g., the processor 120 or 300) determines to not interwork with the second electronic device (e.g., the second electronic device 210 in FIG. 2) for an augmented reality service (e.g., "NO" in operation 505), the first electronic device may transmit non-interworking information for an augmented reality service to the second electronic device. According to an embodiment, if the processor 300 determines to not interwork with the second electronic device 210 for an augmented reality service, the processor 300 may control the communication circuit 330 to transmit information indicating non-interworking for an augmented reality service to the second electronic device 210.

According to various embodiments, in the case of providing an augmented reality service, the first electronic device 200 may display the object corresponding to a user's gaze to be distinguished from other objects.

Referring again to FIG. 6A, the first electronic device 200 may display a virtual object related to a user's gaze around the object 612 corresponding to the user's gaze. As an example, if the object 612 corresponding to the user's gaze is an active object, the virtual object related to the user's gaze may be displayed around the corresponding object 612.

Referring to FIG. 6D, the first electronic device 200 may display the object 660 (e.g., a virtual object) corresponding to the user's gaze to be relatively larger than other objects. As an example, the active object may include at least one of an object in the real space defined to be capable of providing a variety of information, based on the augmented reality service, among a plurality of objects included in the area corresponding to the field of view of the user wearing the first electronic device 200, or a virtual object.

According to various embodiments, the first electronic device 200 may identify whether or not to interwork with the second electronic device 210 for an augmented reality service, based on a request from the second electronic device 210. According to an embodiment, if input information is detected, the second electronic device 210 may transmit, to the first electronic device 200, a signal for identifying whether or not interworking for an augmented reality service is required. According to an embodiment, the first electronic device 200 may determine whether or not to interwork with the second electronic device 210 for an augmented reality service, based on information on the object included in the area corresponding to the field of view of the user wearing the first electronic device 200 at the time of receiving the signal for identifying whether or not interworking for an augmented reality service is required. According to an embodiment, the first electronic device 200 may determine whether or not to interwork with the second electronic device 210 for an augmented reality service, based on information on the positions of the first electronic device 200 and the second electronic device 210 at the time of receiving the signal for identifying whether or not interworking for an augmented reality service is required.

Figure 7:
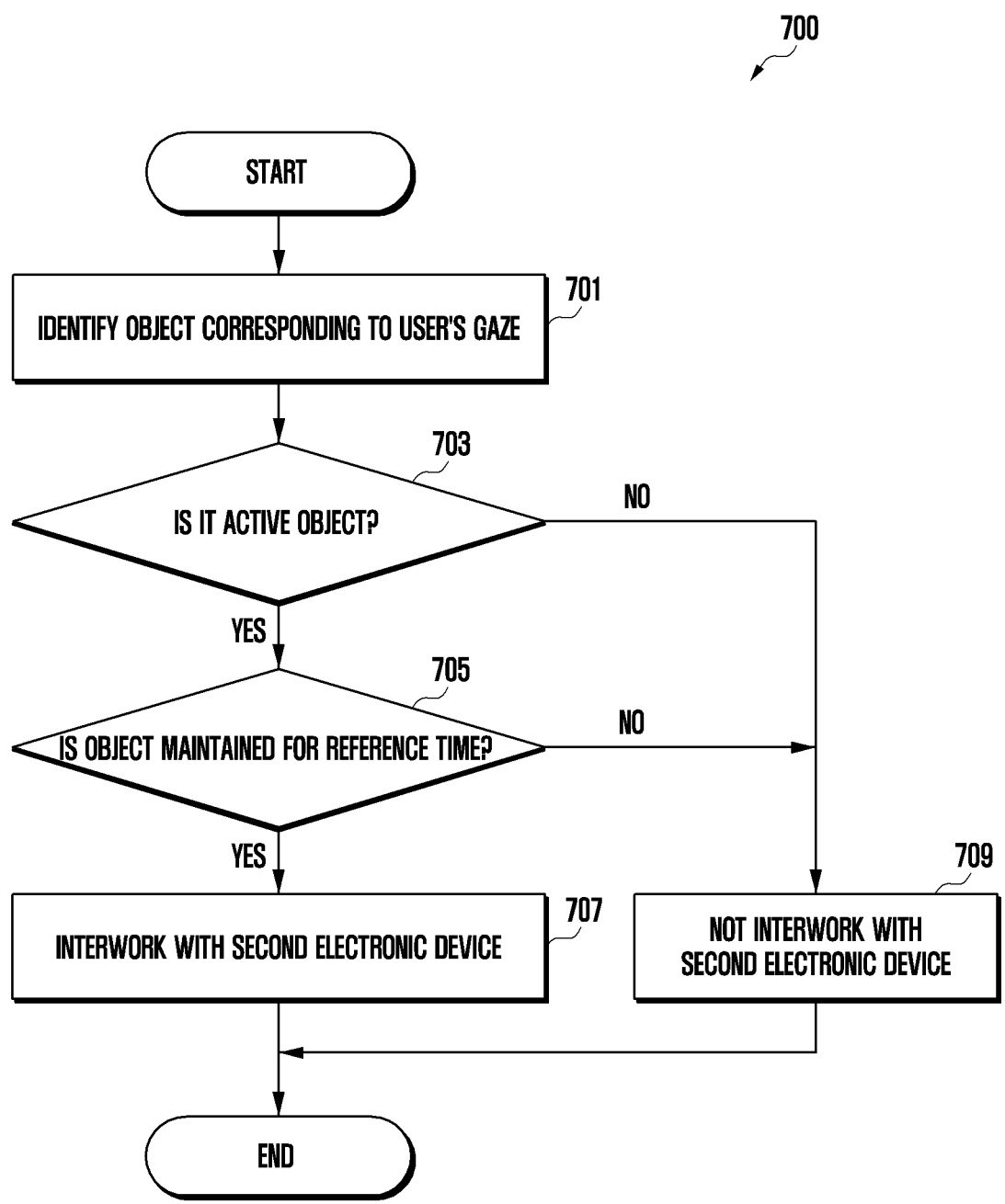
FIG. 7 is a flowchart in which a first electronic device interworks with a second electronic device, based on information on a gaze at an object, according to an embodiment of the disclosure.

FIG. 7 is a flowchart in which a first electronic device interworks with a second electronic device, based on information on a gaze at an object, according to an embodiment of the disclosure. According to an embodiment, the operations in FIG. 7 may be details of the operation 505 in FIG. 5. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the first electronic device 200 shown in FIG. 3. As an example, at least some of the elements shown in FIG. 7 will be described with reference to FIGS. 8A, 8B, 8C and 8D.

Figure 8A:
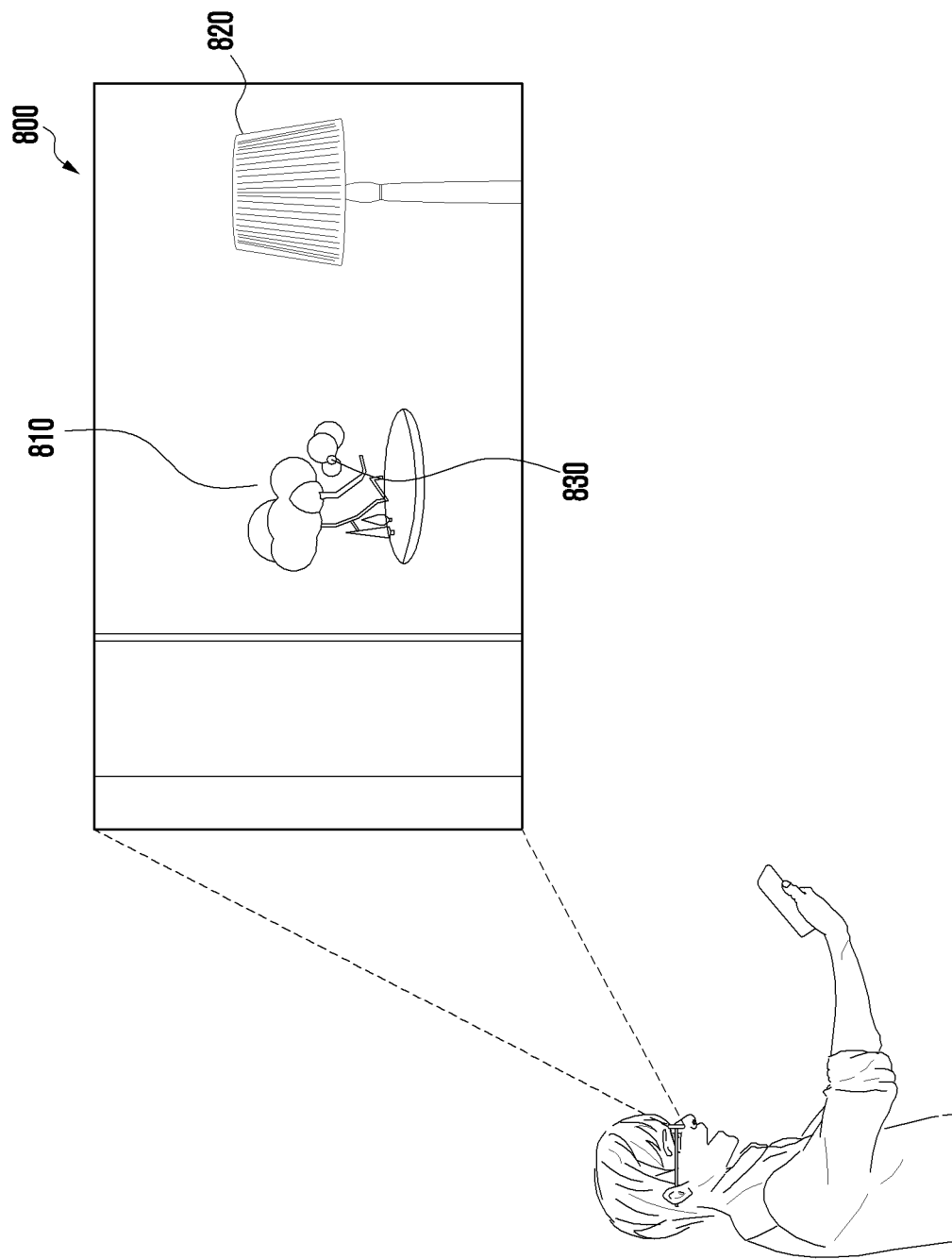
FIG. 8A illustrates a screen configuration of a first electronic device for interworking with a second electronic device, based on information on a gaze at an object, according to an embodiment of the disclosure.

FIG. 8A illustrates a screen configuration of a first electronic device for interworking with a second electronic device, based on information on a gaze at an object, according to an embodiment of the disclosure.

Figure 8B:
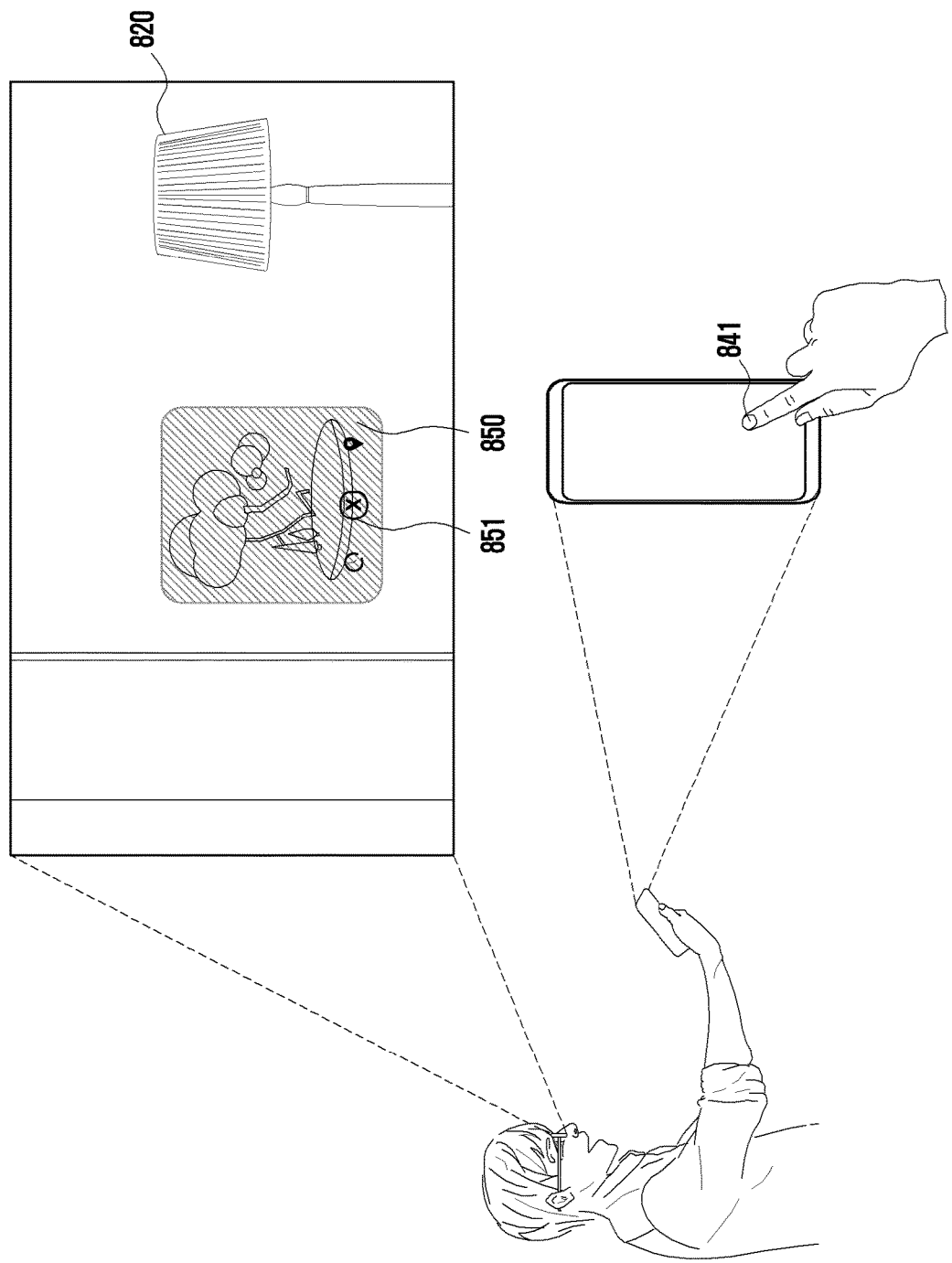
FIG. 8B illustrates a screen configuration of a first electronic device for interworking with a second electronic device, based on information on a gaze at an object, according to an embodiment of the disclosure.

FIG. 8B illustrates a screen configuration of a first electronic device for interworking with a second electronic device, based on information on a gaze at an object, according to an embodiment of the disclosure.

Figure 8C:
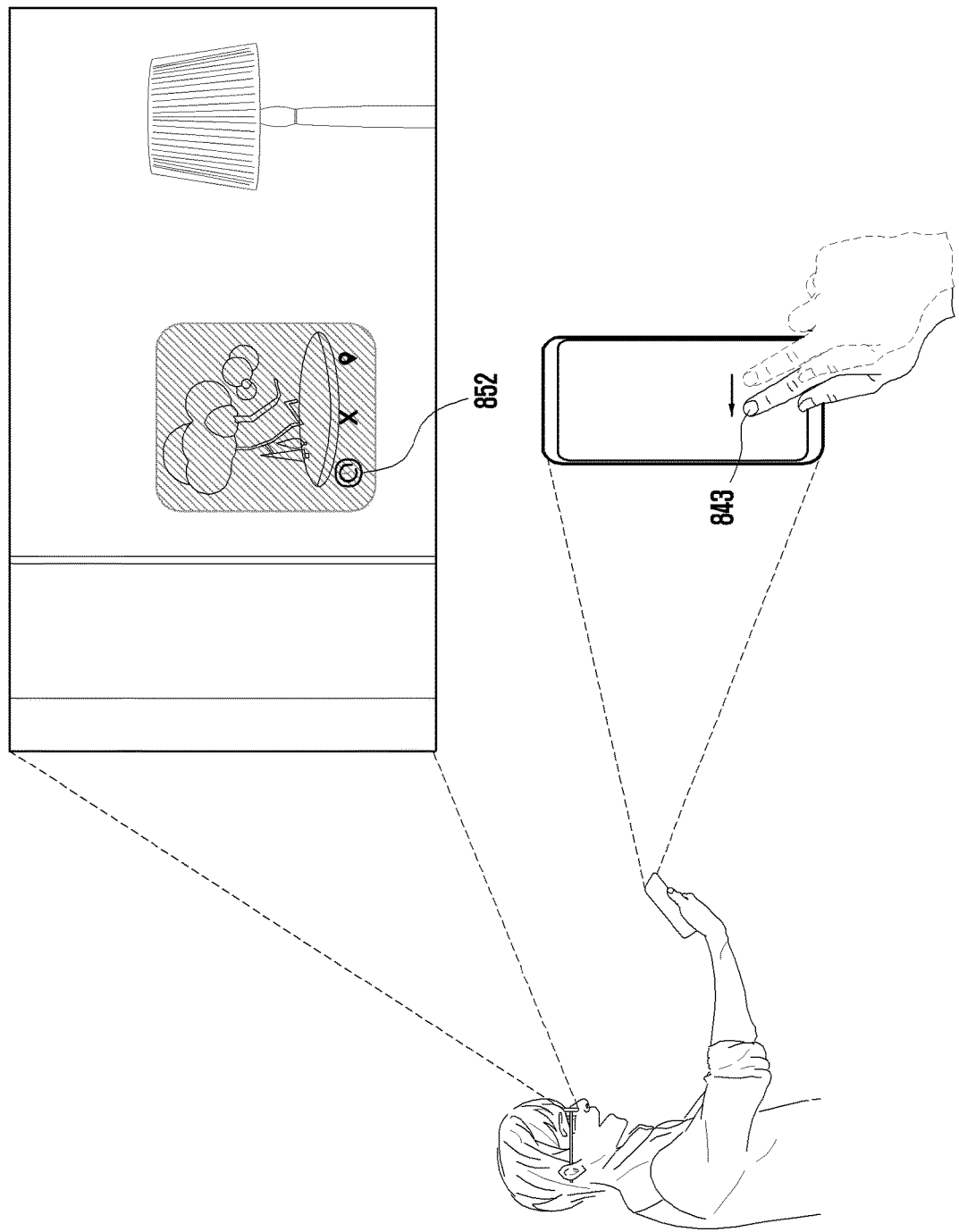
FIG. 8C illustrates a screen configuration of a first electronic device for interworking with a second electronic device, based on information on a gaze at an object, according to an embodiment of the disclosure.

FIG. 8C illustrates a screen configuration of a first electronic device for interworking with a second electronic device, based on information on a gaze at an object, according to an embodiment of the disclosure.

Figure 8D:
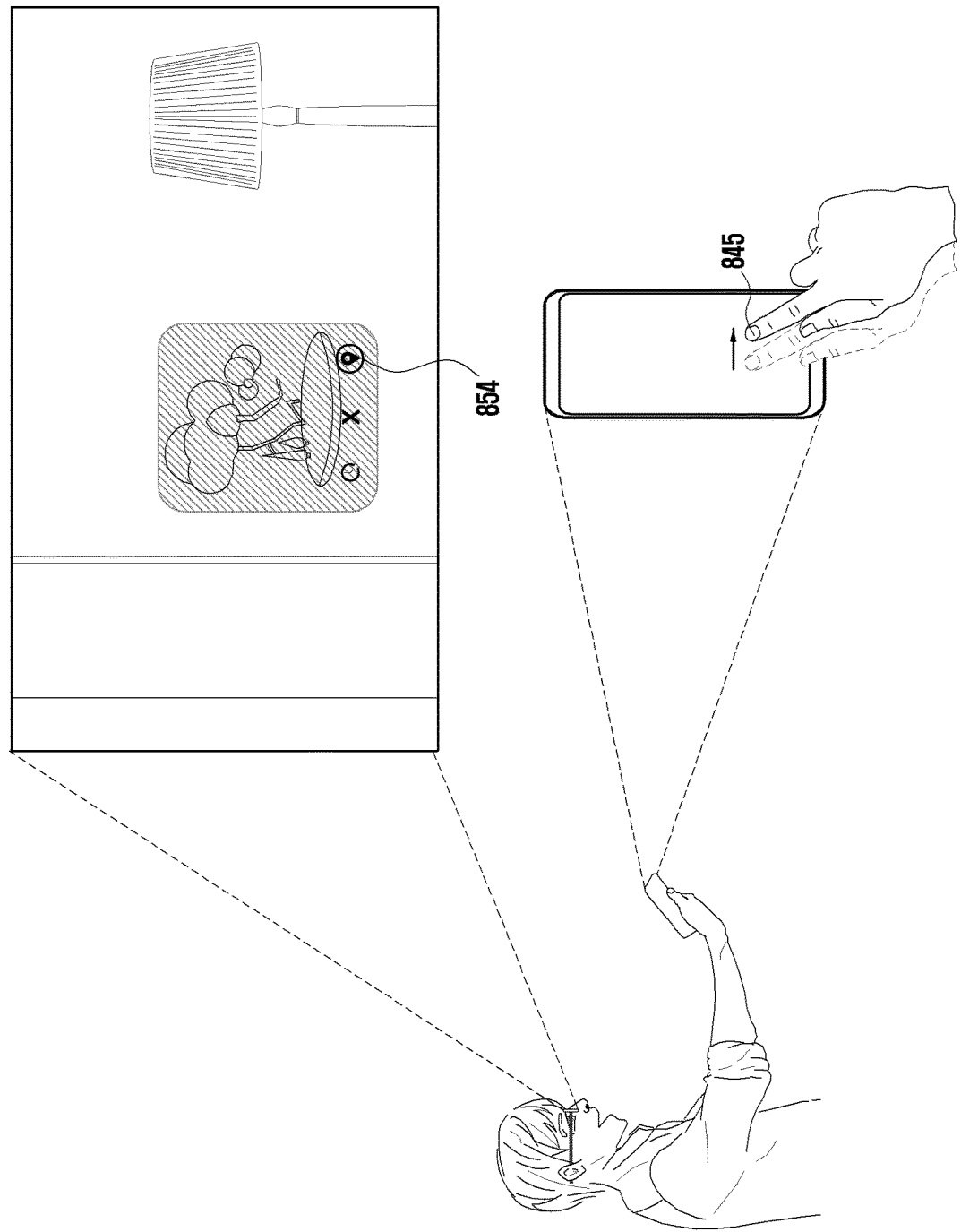
FIG. 8D illustrates a screen configuration of a first electronic device for interworking with a second electronic device, based on information on a gaze at an object, according to various embodiments of the disclosure.

FIG. 8D illustrates a screen configuration of a first electronic device for interworking with a second electronic device, based on information on a gaze at an object, according to various embodiments of the disclosure.

Referring to FIG. 7, according to various embodiments, in a method 700, a first electronic device (e.g., the processor 120 in FIG. 1 or the processor 300 in FIG. 3) may identify an object corresponding to a gaze of a user wearing the first electronic device (e.g., the first electronic device 200 in FIG. 2) in operation 701. In an embodiment, in the case of providing an augmented reality service, the processor 300 may control the display device 320 to display at least one virtual object to overlap a real space corresponding to a field of view of the user wearing the first electronic device 200.

Referring to FIG. 8A, the user wearing the first electronic device 200 may identify a plurality of objects 810 and 820 through the area 800 corresponding to the field of view of the user wearing the first electronic device 200. As an example, the object corresponding to the user's gaze may include a first object 810 on which a user's gaze 830 is displayed in FIG. 8A. As an example, the first object 810 may include a virtual object displayed on the display device 320, and the second object 820 may include an object (e.g., an IoT device) existing in the real space corresponding to the field of view of the user. As an example, the area 800 corresponding to the field of view of the user wearing the first electronic device 200 may be configured to be equal to or smaller than the display area of the display device 320.

According to various embodiments, in operation 703, the first electronic device (e.g., the processor 120 or 300) may identify whether or not the object corresponding to the gaze of the user wearing the first electronic device (e.g., the first electronic device 200 in FIG. 2) is an active object. As an example, the active object may include at least one of an object in the real space defined to be capable of providing a variety of information, based on the augmented reality service, among a plurality of objects included in the area corresponding to the field of view of the user wearing the first electronic device 200, or a virtual object. As an example, the active object may be configured or removed based on user input.

According to various embodiments, if the object corresponding to the gaze of the user wearing the first electronic device (e.g., the first electronic device 200 in FIG. 2) is an active object (e.g., "YES" in operation 703), the first electronic device (e.g., the processor 120 or 300) may identify whether or not the user's gaze at the active object is consistently maintained for a reference time in operation 705. According to an embodiment, the processor 300 may identify whether or not the user's gaze 830 corresponding to the first object 810 in FIG. 8A is consistently maintained for a reference time. As an example, the user's gaze may be configured based on at least one of a head gaze or an eye gaze.

According to various embodiments, if the user's gaze at the active object is consistently maintained for a reference time (e.g., "YES" in operation 705), the first electronic device (e.g., the processor 120 or 300) may determine to interwork with the second electronic device (e.g., the second electronic device 210 in FIG. 2) for an augmented reality service in operation 707. According to an embodiment, if the user's gaze at the active object included in the area corresponding to the field of view of the user wearing the first electronic device 200 is maintained for a reference time, the processor 300 may determine to configure the second electronic device 210 as an input device for an augmented reality service.

According to various embodiments, if the object corresponding to the gaze of the user wearing the first electronic device (e.g., the first electronic device 200 in FIG. 2) is not an active object (e.g., "NO" in operation 703), or if the user's gaze at the active object is not maintained for a reference time (e.g., "NO" in operation 705), the first electronic device (e.g., the processor 120 or 300) may determine to not interwork with the second electronic device (e.g., the second electronic device 210 in FIG. 2) for an augmented reality service in operation 709.

According to various embodiments, the first electronic device 200 may identify whether or not to interwork with the second electronic device 210 for an augmented reality service, based on a request from the second electronic device 210. According to an embodiment, if input information is detected, the second electronic device 210 may transmit, to the first electronic device 200, a signal for identifying whether or not interworking for an augmented reality service is required. If the first electronic device 200 receives a signal for identifying whether or not interworking for an augmented reality service is required from the second electronic device 210 while the user's gaze at the active object is maintained, the first electronic device 200 may determine to interwork with the second electronic device 210 for an augmented reality service. In this case, the first electronic device 200 may determine to interwork with the second electronic device 210 for an augmented reality service, regardless of a retention time of the user's gaze at the active object.

According to various embodiments, if the first electronic device 200 determines to interwork with the second electronic device 210 for an augmented reality service, the first electronic device 200 may control an augmented reality service, based on input information provided from the second electronic device 210.

Referring to FIG. 8B, if the processor 300 receives information on a tap input 841 from the second electronic device 210, the processor 300 may control the display device 320 to display a functional UI 850 for the first object 810 corresponding to the user's gaze. As an example, the functional UI 850 may be displayed to overlap, at least in part, the first object 810, or may be displayed adjacent thereto. As an example, the display device 320 may display a cursor on a first menu 851 (e.g., a cancel menu) among a plurality of menus corresponding to the first object 810 included in the functional UI 850. As an example, if the processor 300 receives an additional input (e.g., a tap input) from the second electronic device 210, the processor 300 may control the display device 320 to remove the display of the functional UI 850, based on the first menu 851 on which the cursor is displayed.

Referring to FIG. 8C, if the processor 300 receives, from the second electronic device 210, information on a touch movement input 843 (e.g., drag) in a first direction (e.g., the left direction), the processor 300 may move the cursor displayed on the functional UI 850 of the first object 810 in the first direction (e.g., the left direction). As an example, the display device 320 may display a cursor on a second menu 852 (e.g., a time menu) among the plurality of menus corresponding to the first object 810 included in the functional UI 850 as a result of the movement of cursor in the first direction (e.g., the left direction). As an example, if the processor 300 receives an additional input (e.g., a tab input) from the second electronic device 210, the processor 300 may control the display device 320 to display time information, based on the second menu 852 on which the cursor is displayed.

Referring to FIG. 8D, if the processor 300 receives, from the second electronic device 210, information on a touch movement input 845 (e.g., drag) in a second direction (e.g., the right direction), the processor 300 may move the cursor displayed on the functional UI 850 of the first object 810 in the second direction (e.g., the right direction). As an example, the display device 320 may display a cursor on a third menu 854 (e.g., a position menu) among the plurality of menus corresponding to the first object 810 included in the functional UI 850 as a result of the movement of the cursor in the second direction (e.g., the right direction). As an example, if the processor 300 receives an additional input (e.g., a tab input) from the second electronic device 210, the processor 300 may control the display device 320 to display position information, based on the third menu 854 on which the cursor is displayed.

Figure 9:
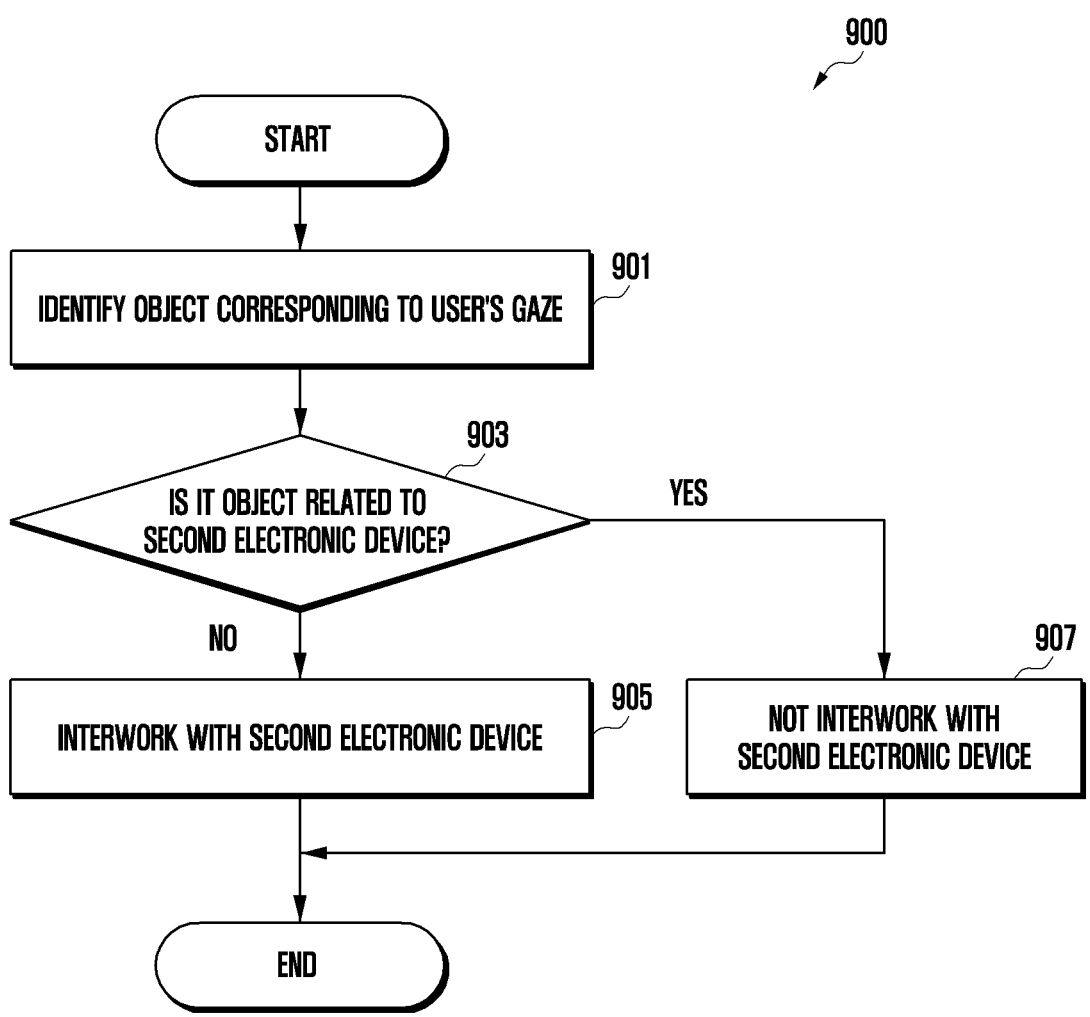
FIG. 9 is a flowchart in which a first electronic device interworks with a second electronic device, based on information on a gaze at an object in relation to the second electronic device, according to an embodiment of the disclosure.

FIG. 9 is a flowchart in which a first electronic device interworks with a second electronic device, based on information on a gaze at an object related to the second electronic device, according to an embodiment of the disclosure. According to an embodiment, the operations in FIG. 9 may be details of the operation 505 in FIG. 5. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the first electronic device 200 shown in FIG. 3. As an example, at least some of the elements shown in FIG. 9 will be described with reference to FIGS. 10A, 10B, 10C and 10D, and FIGS. 11A, 11B and 11C.

Figure 10A:
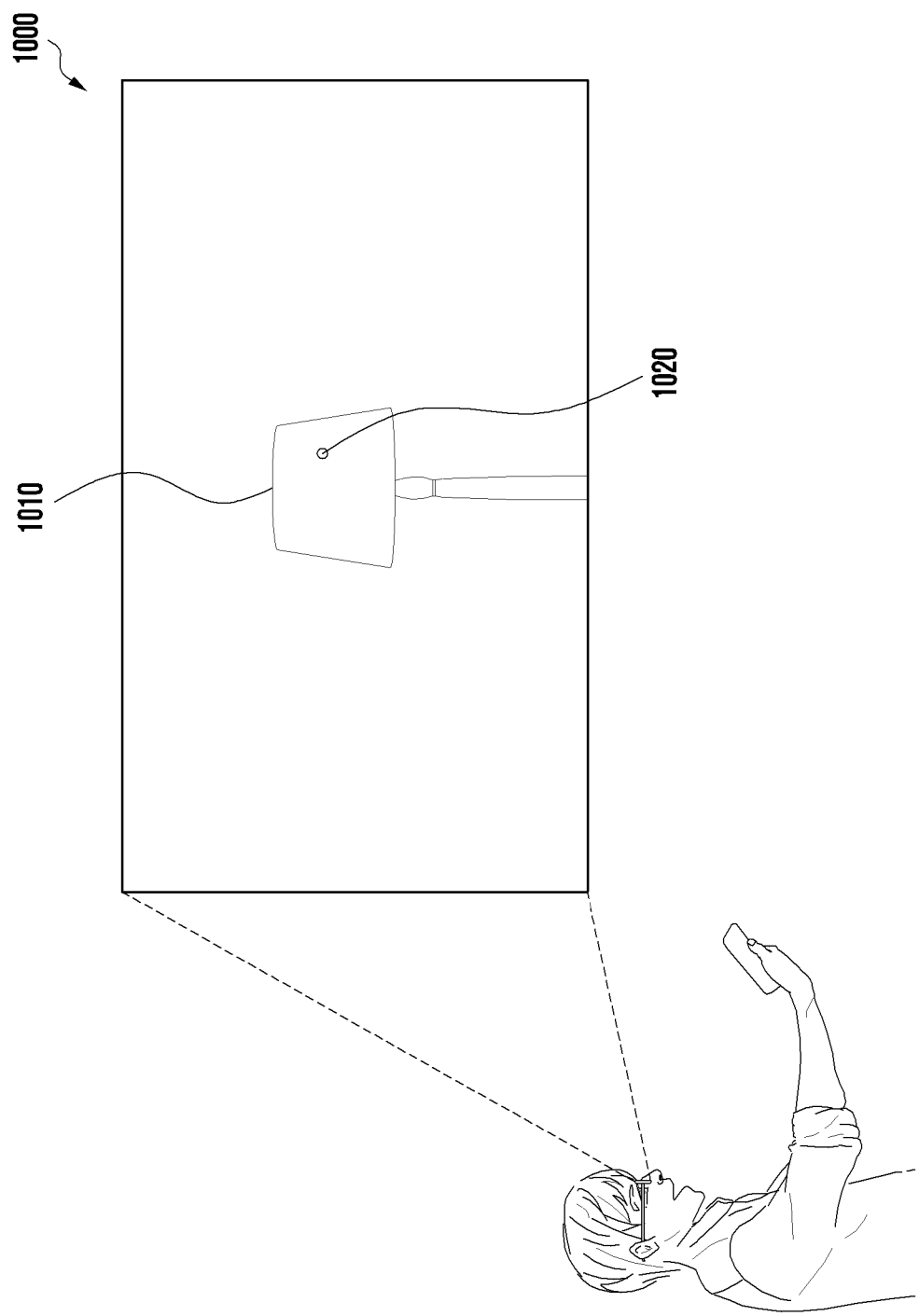
FIG. 10A illustrates a screen configuration of a first electronic device for interworking with a second electronic device, based on user gaze information, according to an embodiment of the disclosure.

FIG. 10A illustrates a screen configuration of a first electronic device for interworking with a second electronic device, based on user gaze information, according to an embodiment of the disclosure.

Figure 10B:
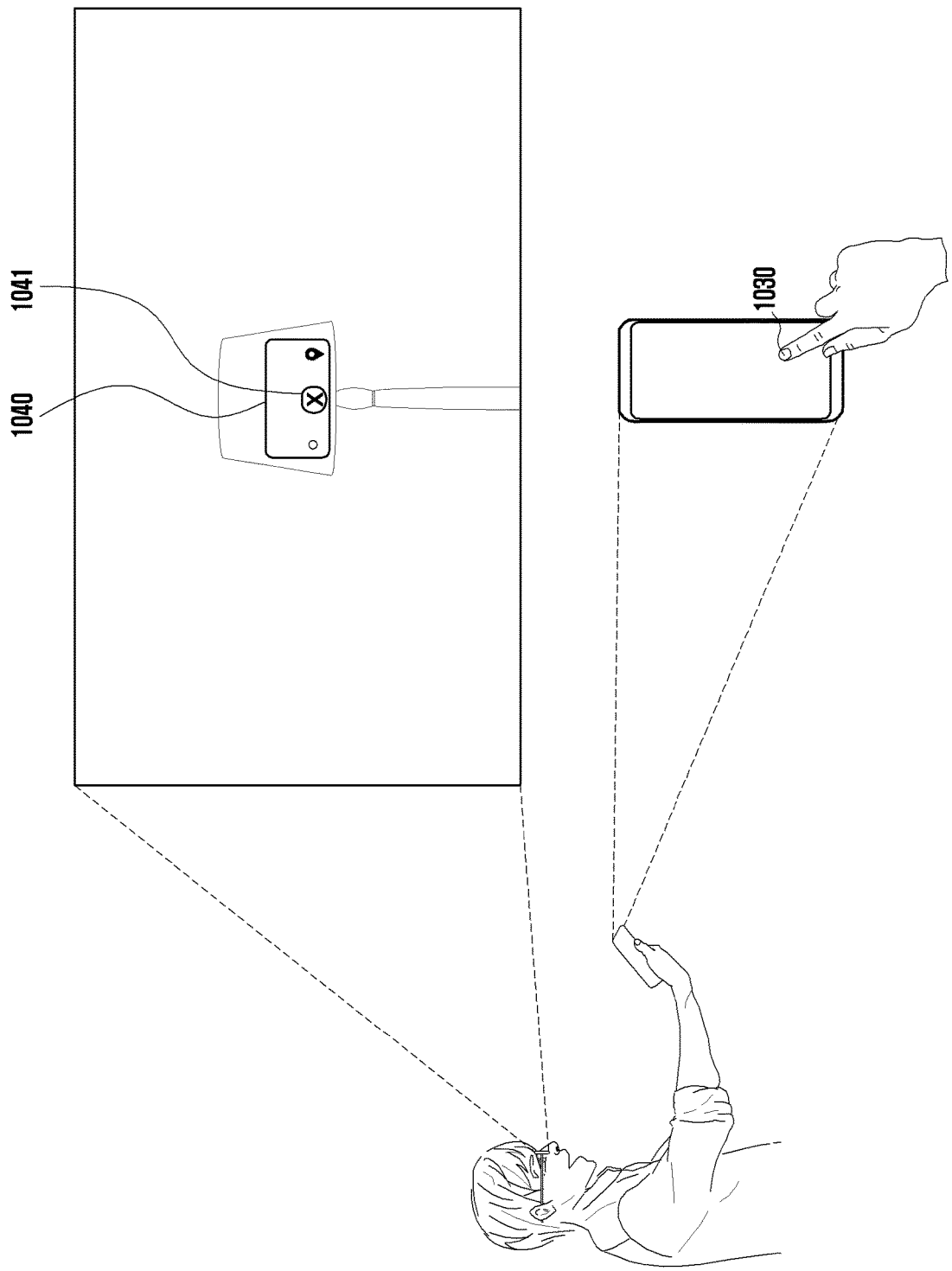
FIG. 10B illustrates a screen configuration of a first electronic device for interworking with a second electronic device, based on user gaze information, according to an embodiment of the disclosure.

FIG. 10B illustrates a screen configuration of a first electronic device for interworking with a second electronic device, based on user gaze information, according to an embodiment of the disclosure.

FIG. 10C illustrates a screen configuration of a first electronic device for interworking with a second electronic device, based on user gaze information, according to an embodiment of the disclosure.

Figure 10D:
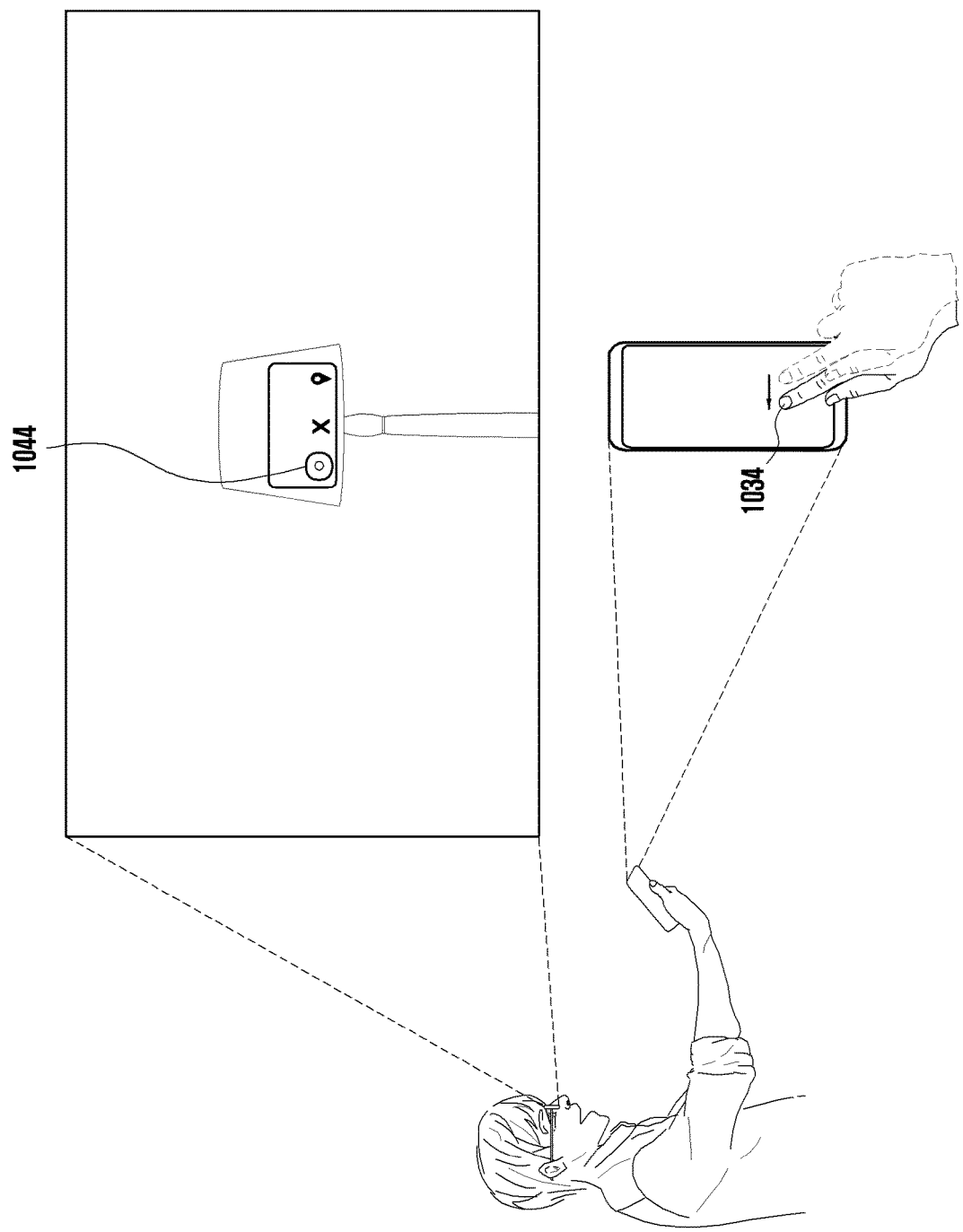
FIG. 10D illustrates a screen configuration of a first electronic device for interworking with a second electronic device, based on user gaze information, according to an embodiments of the disclosure.

FIG. 10D illustrates a screen configuration of a first electronic device for interworking with a second electronic device, based on user gaze information, according to an embodiment of the disclosure.

Figure 11A:
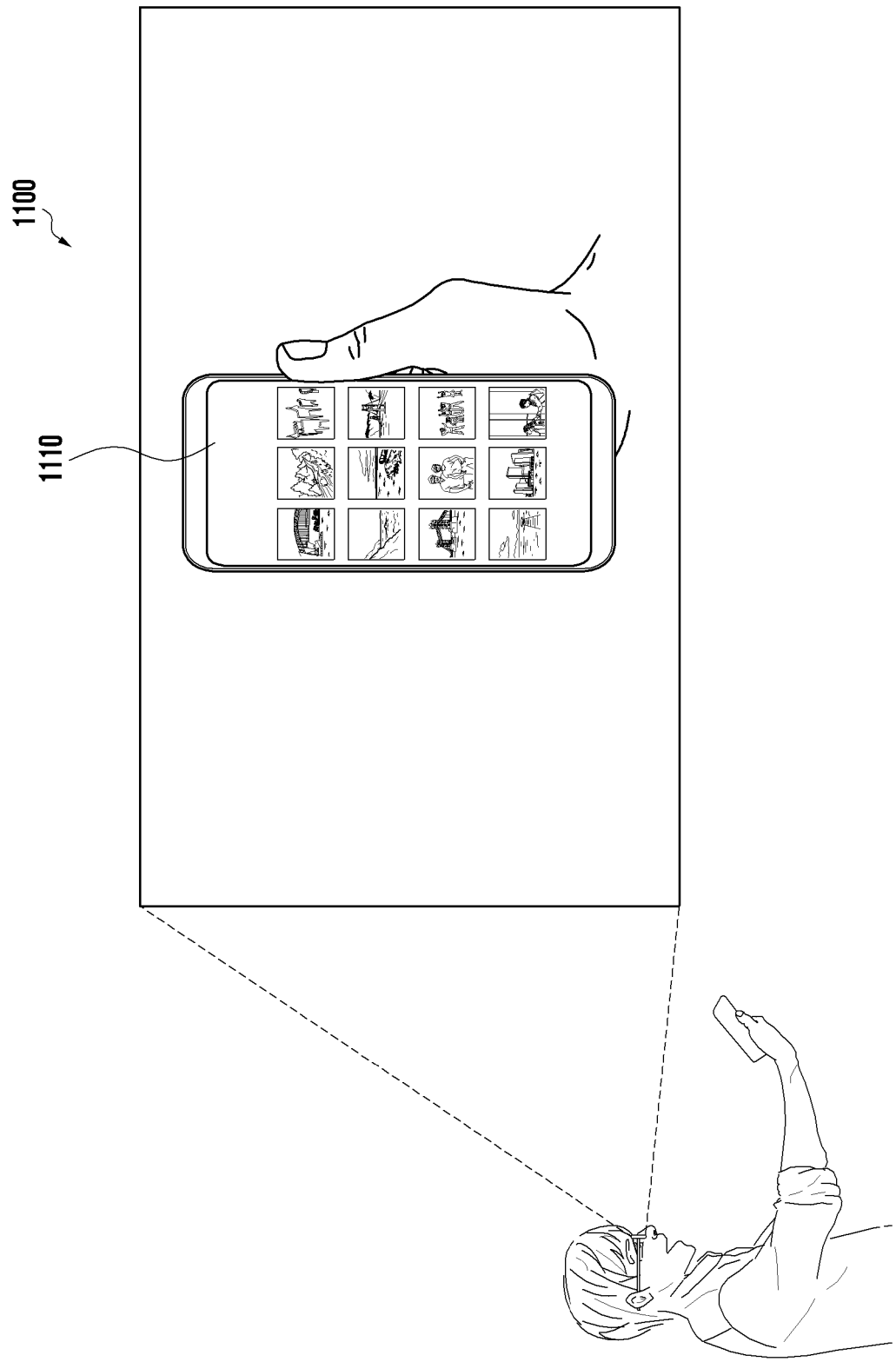
FIG. 11A illustrates a screen configuration of a first electronic device for interworking with a second electronic device, based on information on a gaze at an object related to the second electronic device, according to an embodiment of the disclosure.

FIG. 11A illustrates a screen configuration of a first electronic device for interworking with a second electronic device, based on information on a gaze at an object related to the second electronic device, according to an embodiment of the disclosure.

Figure 11B:
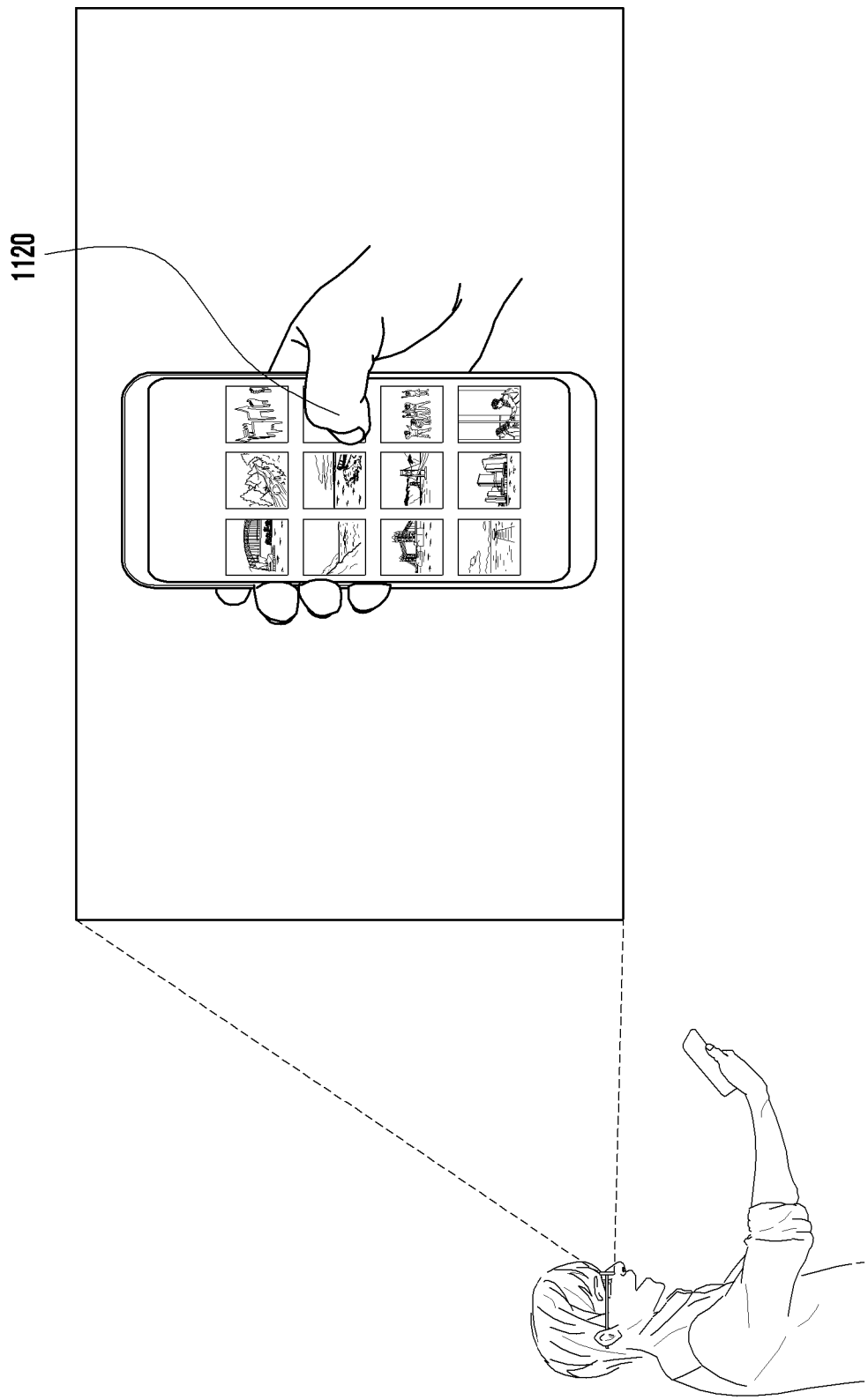
FIG. 11B illustrates a screen configuration of a first electronic device for interworking with a second electronic device, based on information on a gaze at an object related to the second electronic device, according to an embodiment of the disclosure.

FIG. 11B illustrates a screen configuration of a first electronic device for interworking with a second electronic device, based on information on a gaze at an object related to the second electronic device, according to an embodiment of the disclosure.

Figure 11C:
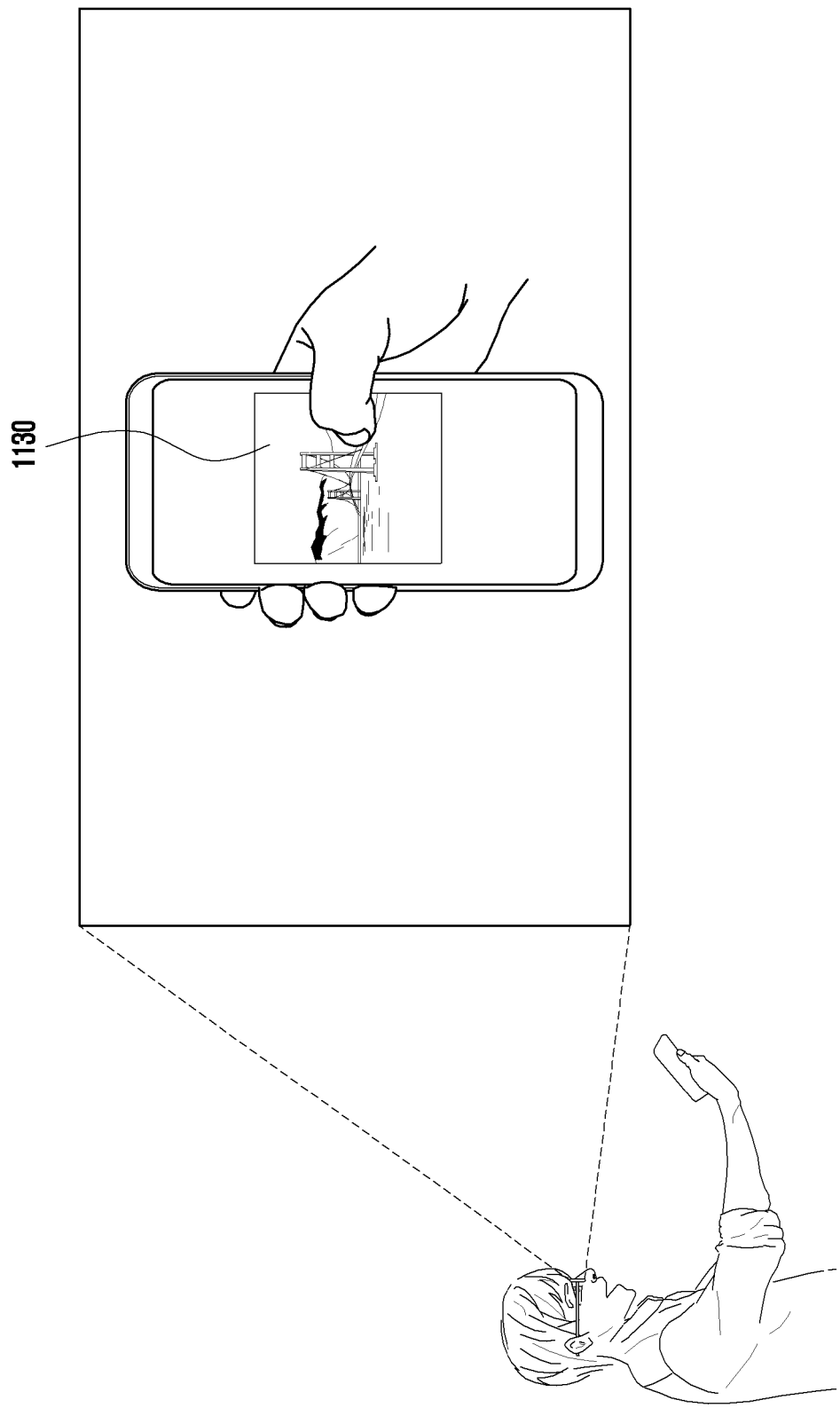
FIG. 11C illustrates a screen configuration of a first electronic device for interworking with a second electronic device, based on information on a gaze at an object related to the second electronic device, according to an embodiment of the disclosure.

FIG. 11C illustrates a screen configuration of a first electronic device for interworking with a second electronic device, based on information on a gaze at an object related to the second electronic device, according to an embodiment of the disclosure.

Referring to FIG. 9, according to various embodiments, in a method 900, a first electronic device (e.g., the processor 120 in FIG. 1 or the processor 300 in FIG. 3) may identify an object corresponding to a gaze of a user wearing the first electronic device (the first electronic device 200 in FIG. 2) in operation 901.

Referring to FIG. 10A, the user wearing the first electronic device 200, may identify an object 1010 (e.g., an IoT device) existing in a real space through the area 1000 corresponding to a field of view of the user wearing the first electronic device 200. The processor 300 may recognize the object 1010 positioned in the real space corresponding to the field of view of the user through at least one of the camera module 310 or the sensor module 340 (e.g., the spatial sensor). As an example, the object corresponding to the user's gaze may include the object 1010 on which a user's gaze 1020 is displayed in FIG. 10A.

According to various embodiments, in operation 903, the first electronic device (e.g., the processor 120 or 300) may identify whether or not the object corresponding to the gaze of the user wearing the first electronic device (e.g., the first electronic device 200 in FIG. 2) is an object related to the second electronic device (e.g., the second electronic device 210 in FIG. 2). As an example, the object related to the second electronic device 210 may include an object related to content displayed on the display device 440 of the second electronic device 210, which is detected by analyzing an image obtained through the camera module 310. As an example, the object related to the second electronic device 210 may include an object related to the exterior of the second electronic device 210 recognized through at least one of the camera module 310 or the sensor module 340 (e.g., the spatial sensor).

According to various embodiments, if the object corresponding to the gaze of the user wearing the first electronic device (e.g., the first electronic device 200 in FIG. 2) is not the object related to the second electronic device (e.g., the second electronic device 210 in FIG. 2) (e.g., "NO" in operation 903), the first electronic device (e.g., the processor 120 or 300) may determine to interwork with the second electronic device (e.g., the second electronic device 210 in FIG. 2) for an augmented reality service in operation 905. According to an embodiment, if the processor 300 determines that the gaze of the user wearing the first electronic device 200 is directed toward an object 1010 (e.g., an IoT device) (see 1020) other than the object related to the second electronic device 210 as shown in FIG. 10A, the processor 300 may determine to interwork with the second electronic device 210 for an augmented reality service.

According to various embodiments, if the object corresponding to the gaze of the user wearing the first electronic device (e.g., the first electronic device 200 in FIG. 2) is the object related to the second electronic device (e.g., the second electronic device 210 in FIG. 2) (e.g., "YES" in operation 903), the first electronic device (e.g., the processor 120 or 300) may determine to not interwork with the second electronic device (e.g., the second electronic device 210 in FIG. 2) for an augmented reality service in operation 907. According to an embodiment, if it is determined that the gaze of the user wearing the first electronic device 200 is directed toward the object 1110 related to the second electronic device 210, which is included in the area 1100 corresponding to the field of view of the user as shown in FIG. 11A, the processor 300 may determine to not interwork with the second electronic device 210 for an augmented reality service.

According to various embodiments, if the first electronic device 200 determines to interwork with the second electronic device 210 for an augmented reality service, the first electronic device 200 may control an augmented reality service, based on information on an input provided from the second electronic device 210.

Referring to FIG. 10B, if the processor 300 receives information on a tap input 1030 from the second electronic device 210, the processor 300 may control the display device 320 to display a functional UI 1040 for the object 1010 corresponding to the user's gaze. As an example, the functional UI 1040 may be displayed to overlap, at least in part, the object 1010. As an example, the display device 320 may display a cursor on a first menu 1041 (e.g., a cancel menu) among a plurality of menus related to the object 1010 included in the functional UI 1040.

Referring to FIG. 10C, if the processor 300 receives, from the second electronic device 210, information on a touch movement input 1032 (e.g., drag) in a second direction (e.g., the right direction), the processor 300 may move the cursor displayed on the functional UI 1040 in the second direction (e.g., the right direction). As an example, the display device 320 may display a cursor on a third menu 1042 (e.g., a position menu) among the plurality of menus related to the object 1010 included in the functional UI 1040 as a result of the movement of cursor in the second direction (e.g., the right direction).

Referring to FIG. 10D, if the processor 300 receives, from the second electronic device 210, information on a touch movement input 1034 (e.g., drag) in a first direction (e.g., the left direction), the processor 300 may move the cursor displayed on the functional UI 1040 in the first direction (e.g., the left direction). As an example, the display device 320 may display a cursor on a fourth menu 1044 (e.g., a switch menu) among the plurality of menus related to the object 1010 included in the functional UI 1040 as a result of the movement of the cursor in the first direction (e.g., the left direction). According to an embodiment, if the processor 300 receives an additional input (e.g., a tap input) from the second electronic device 840, the processor 300 may perform an operation corresponding to the menu 1041, 1042, or 1044 on which the cursor is displayed. As an example, if the processor 300 receives an additional input (e.g., a tap input) from the second electronic device 840 while the cursor is displayed on the fourth menu 1044, the processor 300 may control the communication circuit 330 to transmit an active signal (or an inactive signal) to an IoT device corresponding to the object 1010.

According to various embodiments, if the first electronic device 200 determines to not perform interworking for an augmented reality service, the second electronic device 210 may process input information.

Referring to FIG. 11A, the processor 400 may control the display device 440 to display a list of images stored in the second electronic device 210, based on execution of a gallery application.

Referring to FIG. 11B, if a tap input 1120 is detected through the input device 420 (e.g., a touch circuit).

Referring to FIG. 11C, the processor 400 may enlarge and display a first image corresponding to the tap input 1120 (see 1130).

Figure 12:
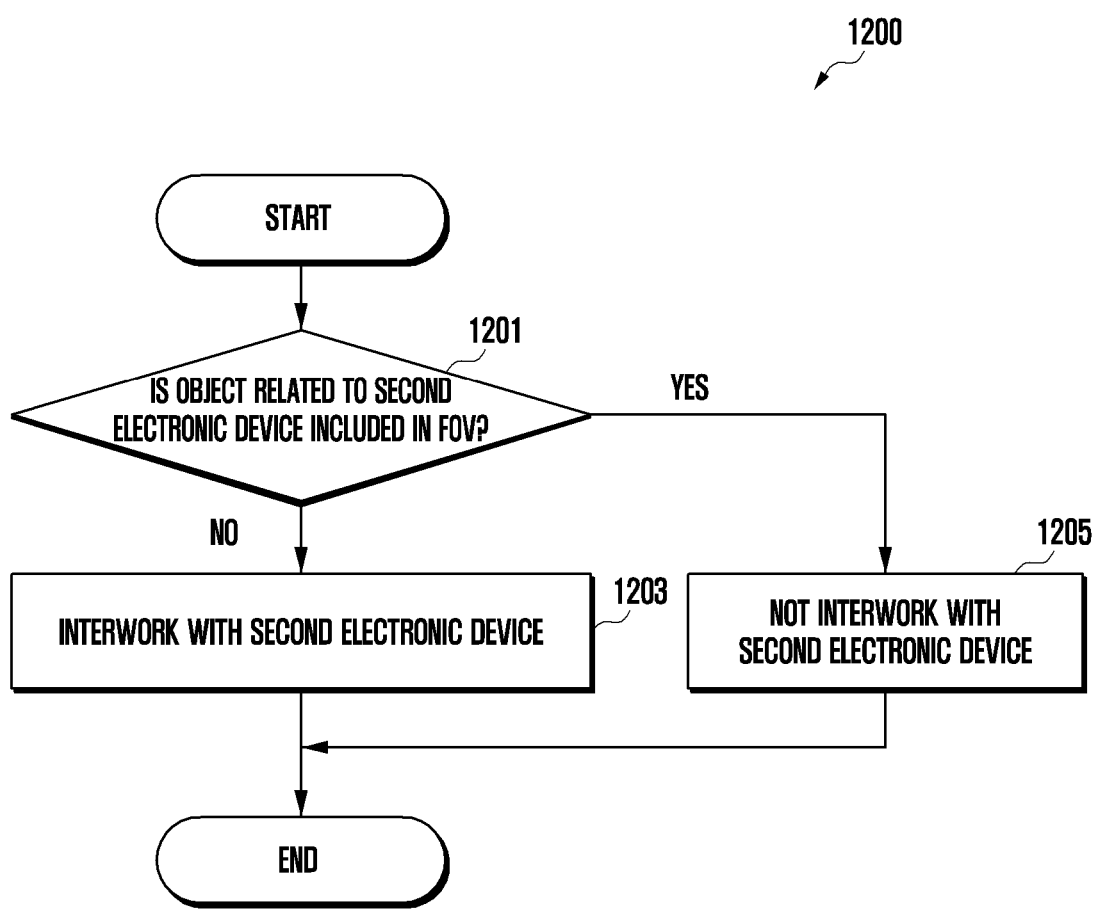
FIG. 12 is a flowchart in which a first electronic device interworks with a second electronic device, based on FOV information, according to an embodiment of the disclosure.

FIG. 12 is a flowchart in which a first electronic device interworks with a second electronic device, based on FOV information, according to an embodiment of the disclosure. According to an embodiment, the operations in FIG. 12 may be details of the operation 505 in FIG. 5. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the first electronic device 200 shown in FIG. 3. As an example, at least some of the elements shown in FIG. 12 will be described with reference to FIG. 13.

Figure 13:
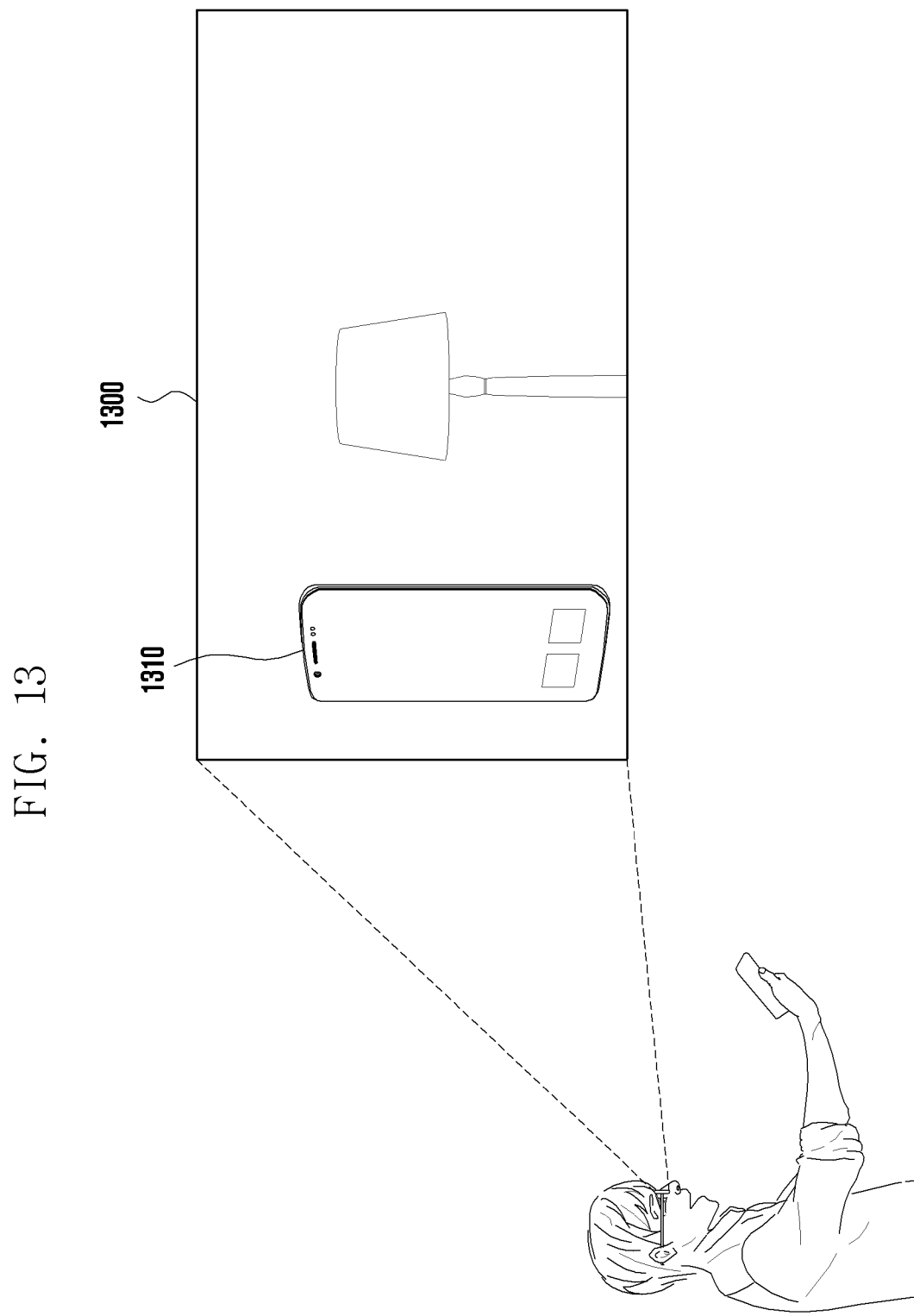
FIG. 13 illustrates a screen configuration of a first electronic device for interworking with a second electronic device, based on FOV information on the first electronic device, according to an embodiment of the disclosure.

FIG. 13 illustrates a screen configuration of a first electronic device for interworking with a second electronic device, based on FOV information on the first electronic device, according to an embodiment of the disclosure.

Referring to FIG. 12, according to various embodiments, in a method 1200, a first electronic device (e.g., the processor 120 in FIG. 1 or the processor 300 in FIG. 3) may identify whether or not an object related to a second electronic device (e.g., the second electronic device 210 in FIG. 2) is included in an area corresponding to a field of view of a user wearing the first electronic device (e.g., the first electronic device 200 in FIG. 2) in operation 1201. According to an embodiment, the processor 300 may recognize at least one object existing in the real space corresponding to the field of view of the user through at least one of the camera module 310 or the sensor module 340 (e.g., the spatial sensor). In this case, the processor 300 may identify whether or not the object related to the second electronic device 210 exists among at least one object in the real space. As an example, the object related to the second electronic device 210 may include at least one of an object related to the exterior of the second electronic device 210 or an object related to content displayed on the display device 440 of the second electronic device 210.

According to various embodiments, if the object related to the second electronic device (e.g., the second electronic device 210 in FIG. 2) is not included in the area corresponding to the field of view of the user wearing the first electronic device (e.g., the first electronic device 200 in FIG. 2) (e.g., "NO" in operation 1201), the first electronic device (e.g., the processor 120 or 300) may determine to interwork with the second electronic device (e.g., the second electronic device 210 in FIG. 2) for an augmented reality service in operation 1203. According to an embodiment, if the object related to the second electronic device 210 does not exist in the area 1000 corresponding to the field of view of the user wearing the first electronic device 200 as shown in FIG. 10A, the processor 300 may determine to interwork with the second electronic device 210 for an augmented reality service.

According to various embodiments, if the object related to the second electronic device (e.g., the second electronic device 210 in FIG. 2) is included in the area corresponding to the field of view of the user wearing the first electronic device (e.g., the first electronic device 200 in FIG. 2) (e.g., "YES" in operation 1201), the first electronic device (e.g., the processor 120 or 300) may determine to not interwork with the second electronic device (e.g., the second electronic device 210 in FIG. 2) for an augmented reality service in operation 1205.

Referring to FIG. 13, if the object 1310 related to the second electronic device 210 exists in the area 1300 corresponding to the field of view of the user wearing the first electronic device 200, the processor 300 may determine to not interwork with the second electronic device 210 for an augmented reality service.

Figure 14:
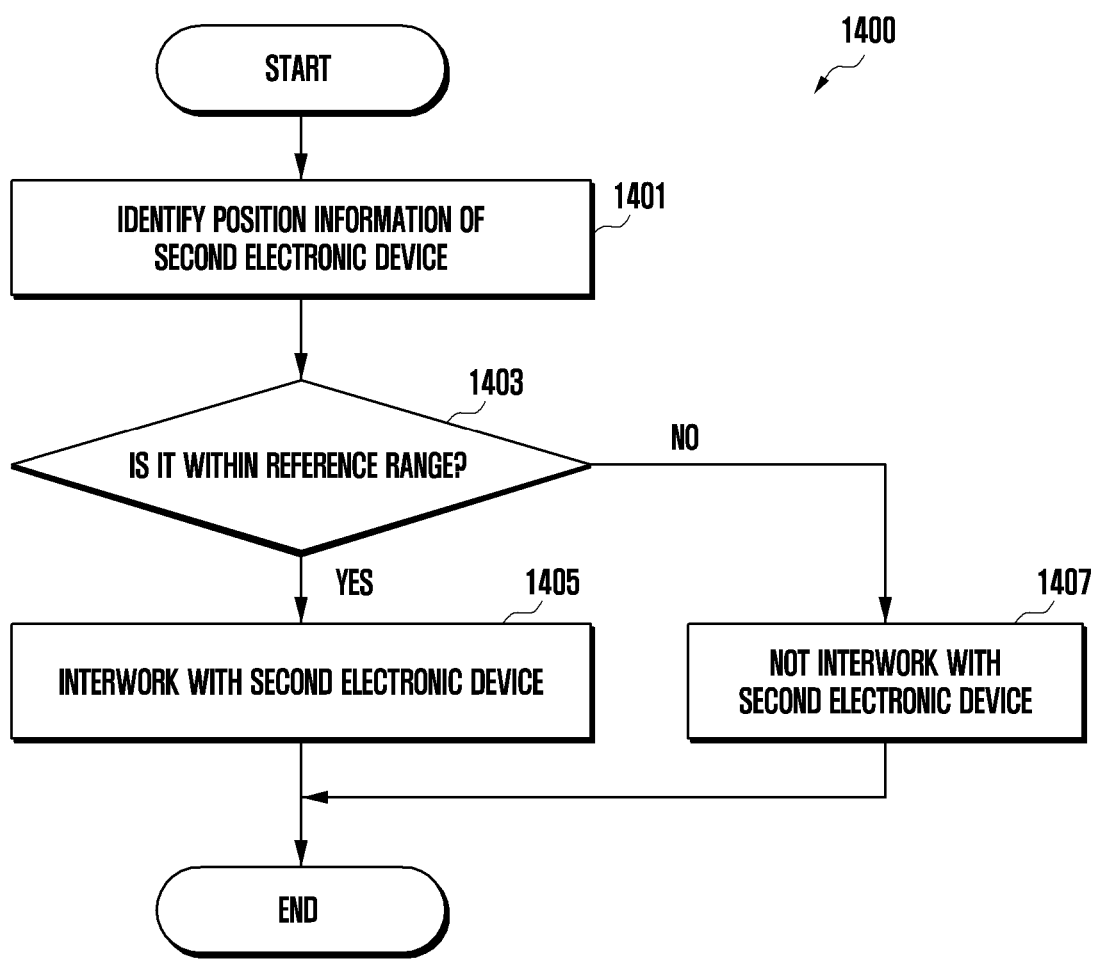
FIG. 14 is a flowchart in which a first electronic device interworks with a second electronic device, based on position information, according to an embodiment of the disclosure.

FIG. 14 is a flowchart in which a first electronic device interworks with a second electronic device, based on position information, according to an embodiment of the disclosure. According to an embodiment, the operations in FIG. 14 may be details of the operation 505 in FIG. 5. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the first electronic device 200 shown in FIG. 3.

Referring to FIG. 14, according to various embodiments, in a method 1400, in operation 1401, a first electronic device (e.g., the processor 120 in FIG. 1 or the processor 300 in FIG. 3) may identify information on the position of a second electronic device (e.g., the second electronic device 210 in FIG. 2) connected to the first electronic device (e.g., the first electronic device 200 in FIG. 2) through a communication link (or a communication channel). According to an embodiment, the processor 300 may periodically receive information on the position of the second electronic device 210 from the second electronic device 210 through the communication circuit 330. According to an embodiment, the processor 300 may receive information on the changed position of the second electronic device 210 from the second electronic device 210 through the communication circuit 330 at the time at which the position of the second electronic device 210 changes.

According to various embodiments, in operation 1403, the first electronic device (e.g., the processor 120 or 300) may identify whether or not the second electronic device (e.g., the second electronic device 210 in FIG. 2) is within a reference range of the first electronic device (e.g., the first electronic device 200 in FIG. 2). As an example, the reference range may be configured based on information on the position of the first electronic device 200.

According to various embodiments, if the second electronic device (e.g., the second electronic device 210 in FIG. 2) is within the reference range of the first electronic device (e.g., the first electronic device 200 in FIG. 2) (e.g., "YES" in operation 1403), the first electronic device (e.g., the processor 120 or 300) may determine to interwork with the second electronic device (e.g., the second electronic device 210 in FIG. 2) for an augmented reality service in operation 1405.

According to various embodiments, if the second electronic device (e.g., the second electronic device 210 in FIG. 2) is not within the reference range of the first electronic device (e.g., the first electronic device 200 in FIG. 2) (e.g., "NO" in operation 1403), the first electronic device (e.g., the processor 120 or 300) may determine to not interwork with the second electronic device (e.g., the second electronic device 210 in FIG. 2) for an augmented reality service in operation 1407.

Figure 15:
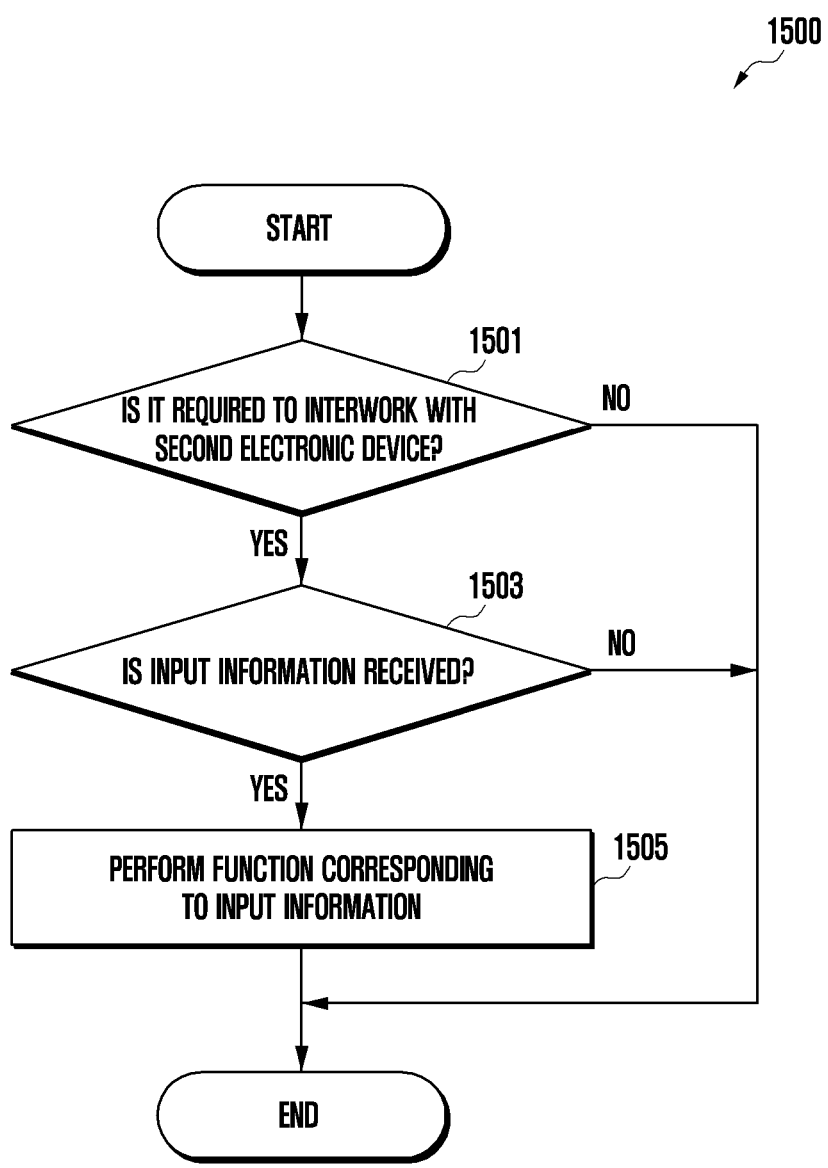
FIG. 15 is a flowchart in which a first electronic device processes input information provided from a second electronic device according to an embodiment of the disclosure.

FIG. 15 is a flowchart in which a first electronic device processes input information provided from a second electronic device according to an embodiment of the disclosure. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the first electronic device 200 shown in FIG. 3. As an example, at least some of the elements shown in FIG. 15 will be described with reference to FIGS. 16A, 16B, and 16C, FIGS. 17A, 17B and 17C, FIGS. 18A and 18B, FIGS. 19A and 19B, and FIGS. 20A and 20B.

Figure 16A:
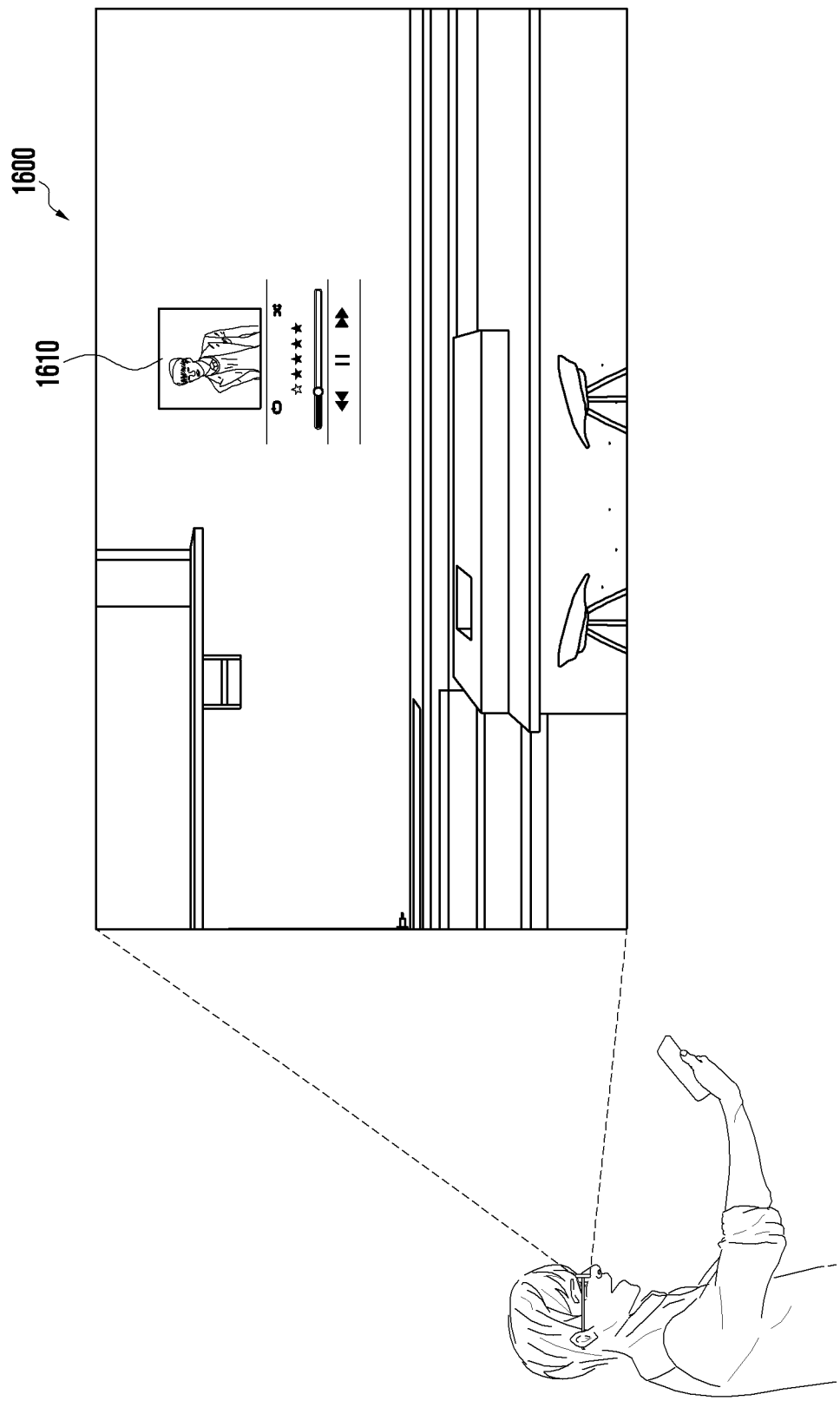
FIG. 16A illustrates a screen configuration of a first electronic device for displaying a functional UI, based on input information provided from a second electronic device, according to an embodiment of the disclosure.

FIG. 16A illustrates a screen configuration of a first electronic device for displaying a functional UI, based on input information provided from a second electronic device, according to an embodiment of the disclosure.

Figure 16B:
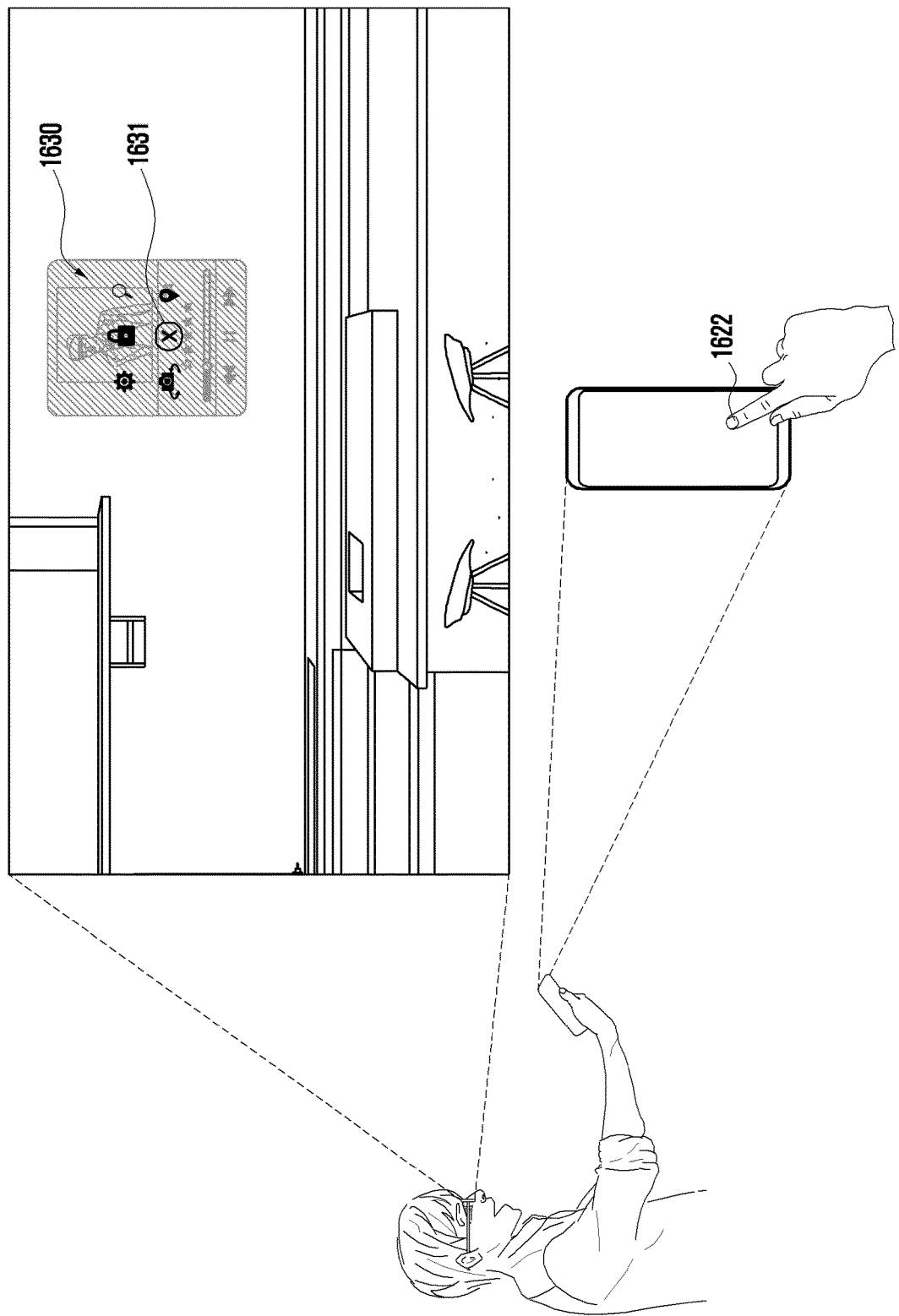
FIG. 16B illustrates a screen configuration of a first electronic device for displaying a functional UI, based on input information provided from a second electronic device, according to an embodiment of the disclosure.

FIG. 16B illustrates a screen configuration of a first electronic device for displaying a functional UI, based on input information provided from a second electronic device, according to an embodiment of the disclosure.

Figure 16C:
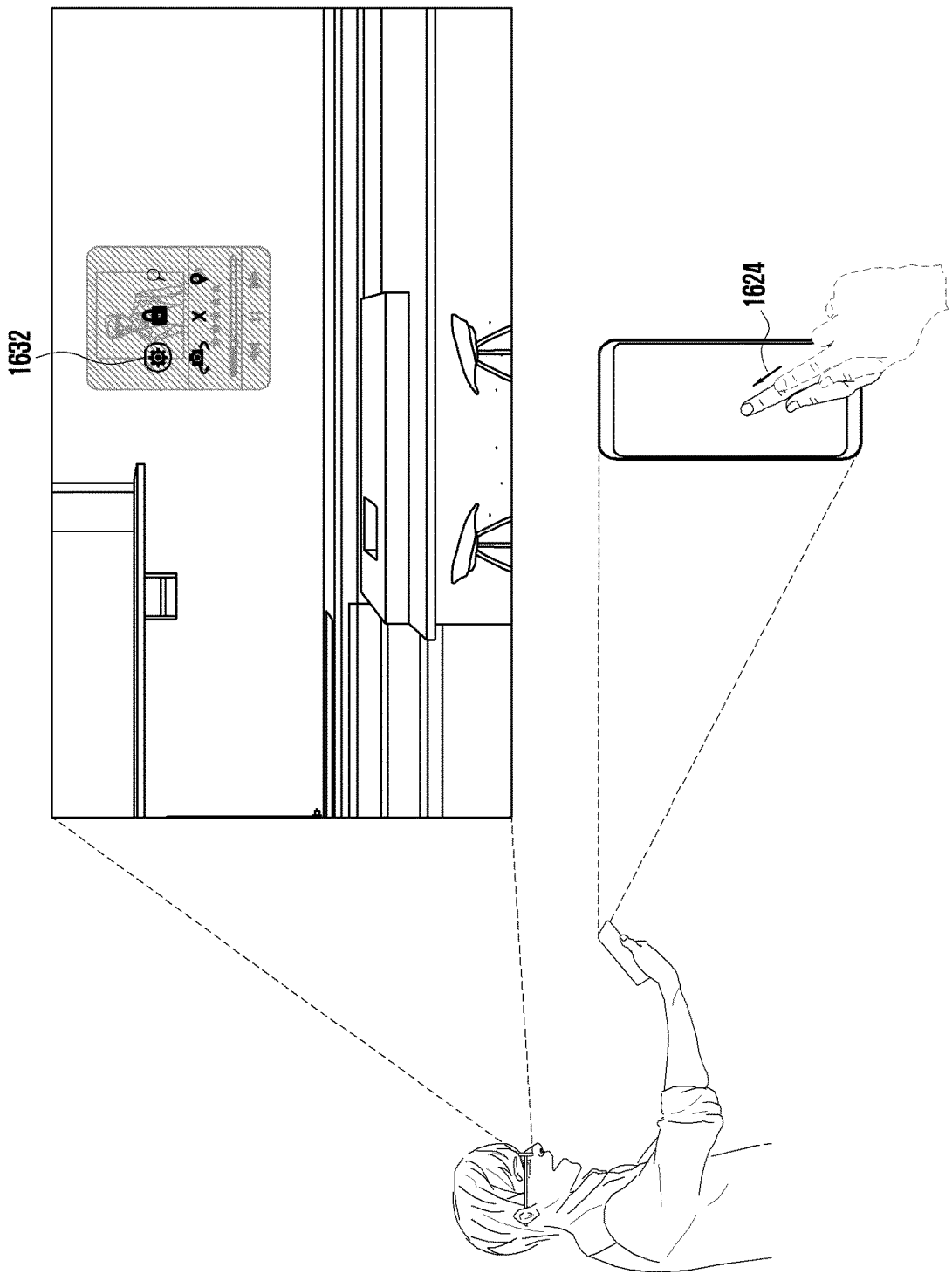
FIG. 16C illustrates a screen configuration of a first electronic device for displaying a functional UI, based on input information provided from a second electronic device, according to an embodiment of the disclosure.

FIG. 16C illustrates a screen configuration of a first electronic device for displaying a functional UI, based on input information provided from a second electronic device, according to an embodiment of the disclosure.

Figure 17A:
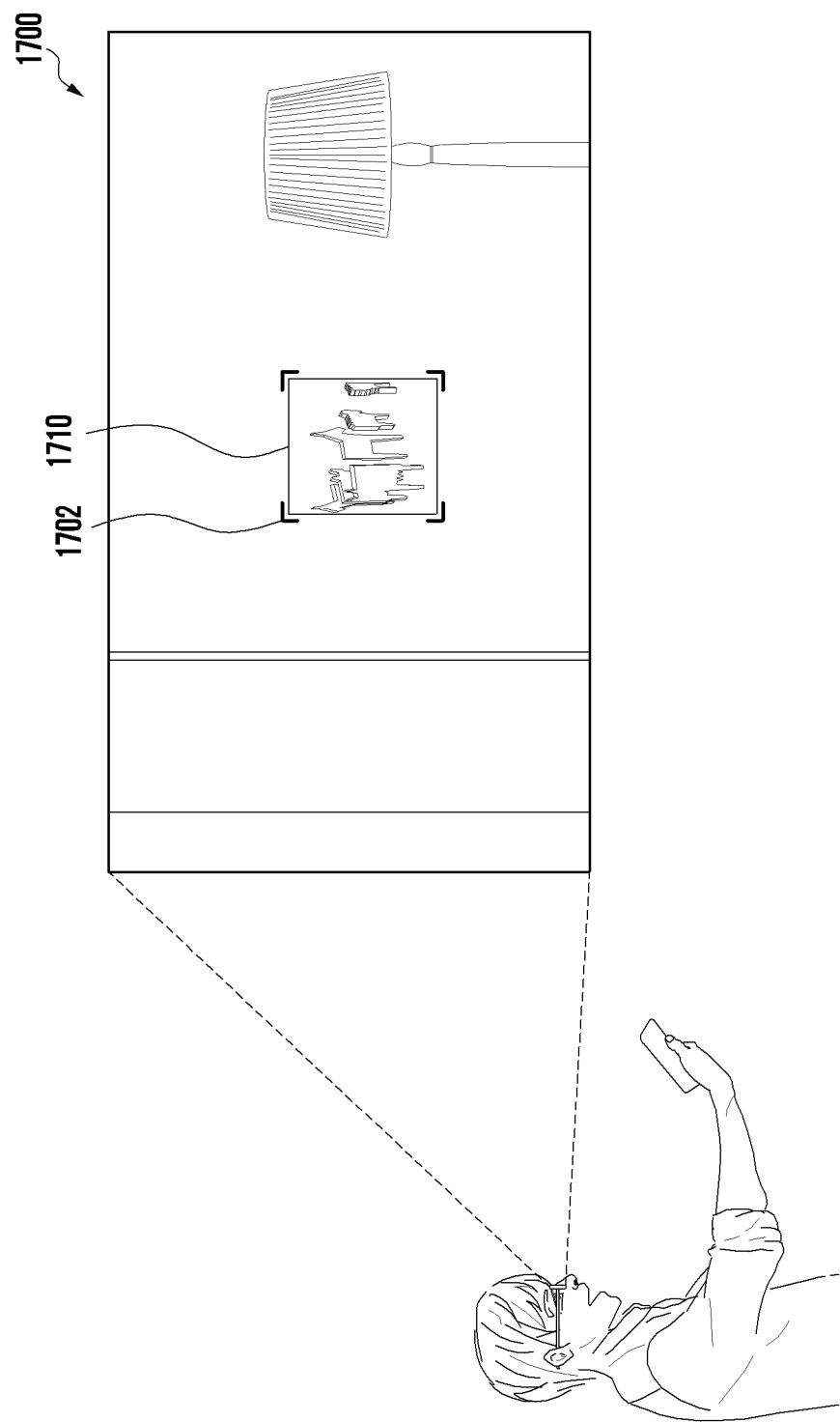
FIG. 17A illustrates a screen configuration of a first electronic device for displaying a control UI, based on input information provided from a second electronic device, according to an embodiment of the disclosure.

FIG. 17A illustrates a screen configuration of a first electronic device for displaying a control UI, based on input information provided from a second electronic device, according to an embodiment of the disclosure.

Figure 17B:
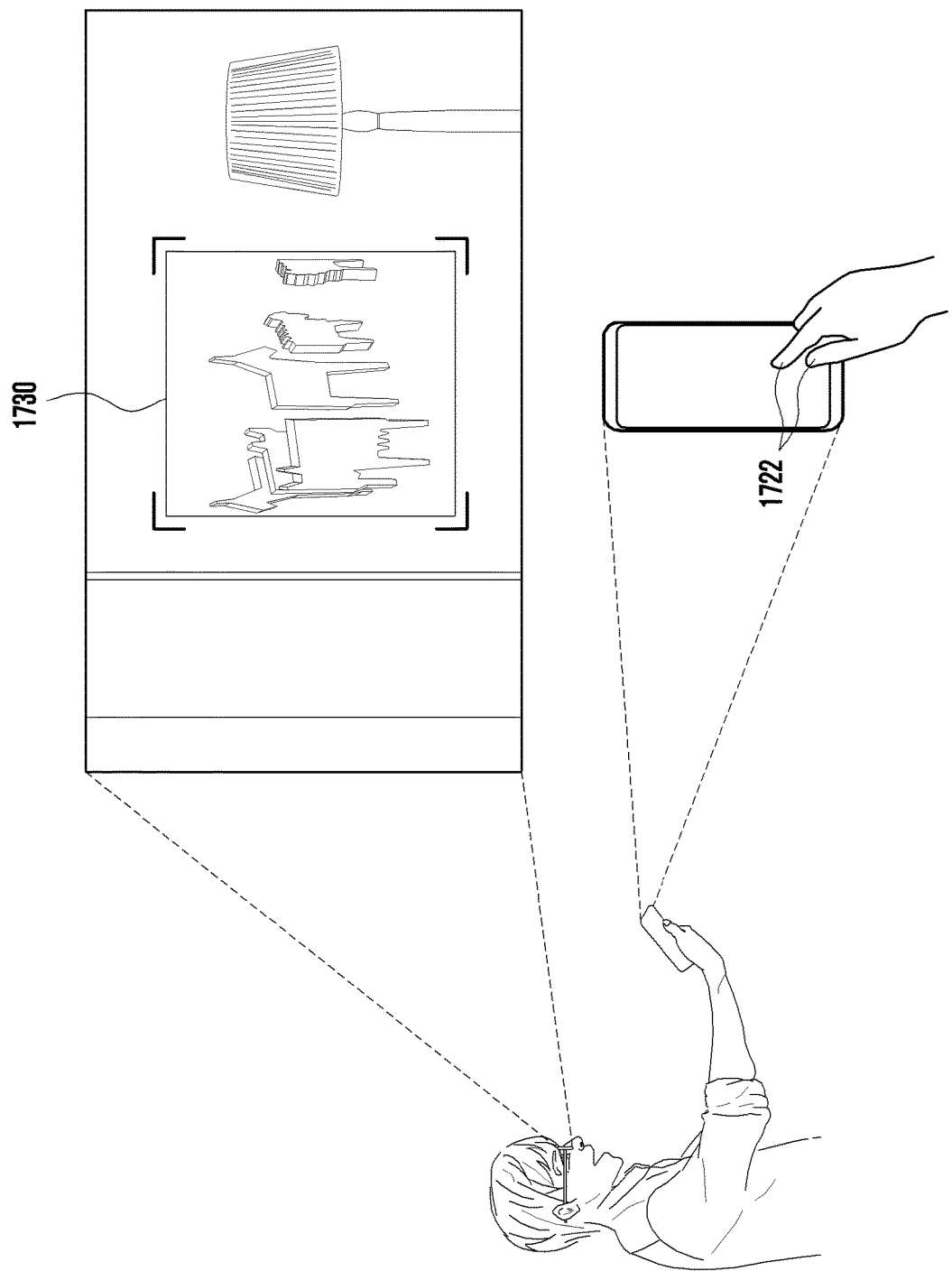
FIG. 17B illustrates a screen configuration of a first electronic device for displaying a control UI, based on input information provided from a second electronic device, according to an embodiment of the disclosure.

FIG. 17B illustrates a screen configuration of a first electronic device for displaying a control UI, based on input information provided from a second electronic device, according to an embodiment of the disclosure.

Figure 17C:
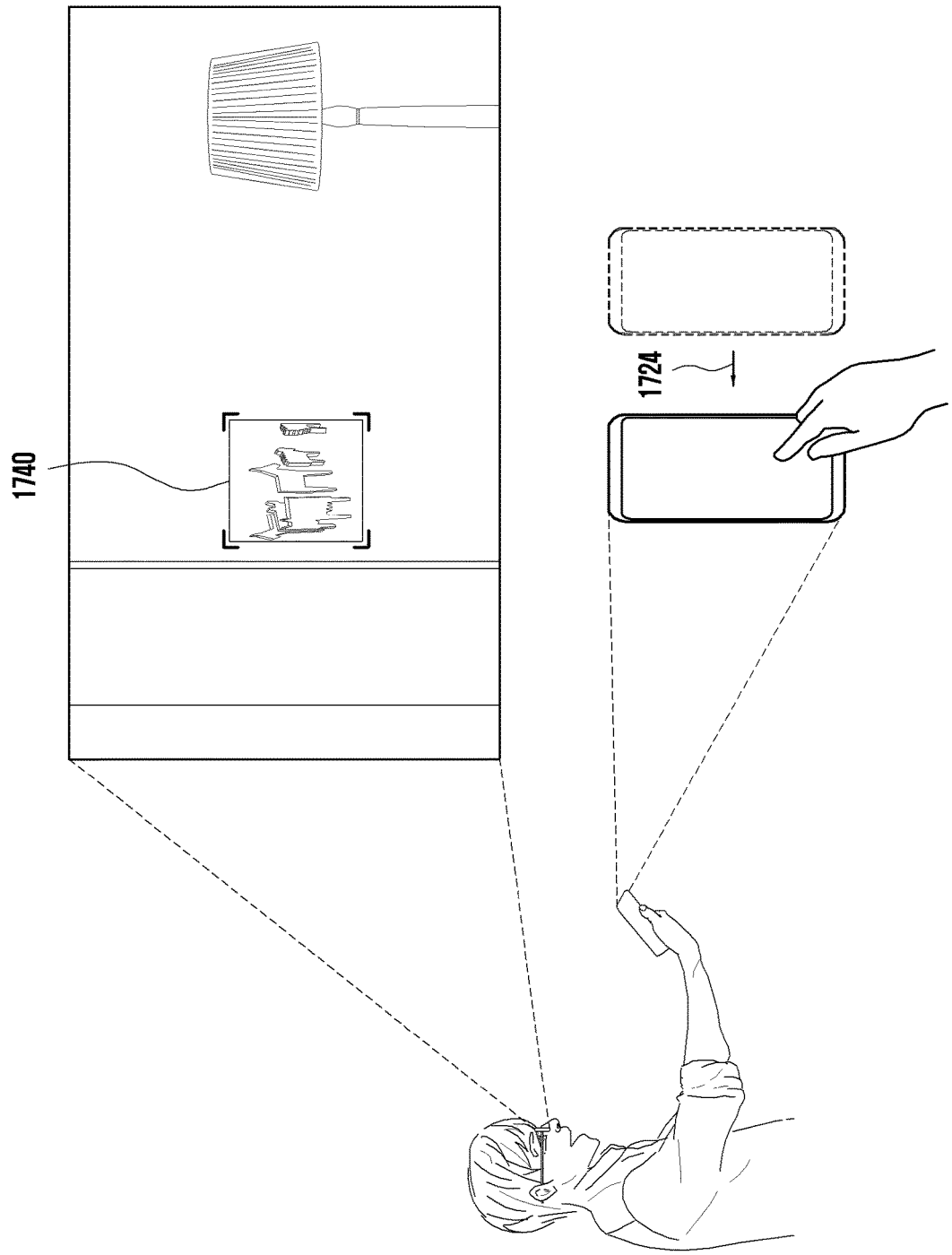
FIG. 17C illustrates a screen configuration of a first electronic device for displaying a control UI, based on input information provided from a second electronic device, according to an embodiment of the disclosure.

FIG. 17C illustrates a screen configuration of a first electronic device for displaying a control UI, based on input information provided from a second electronic device, according to an embodiment of the disclosure.

Figure 18A:
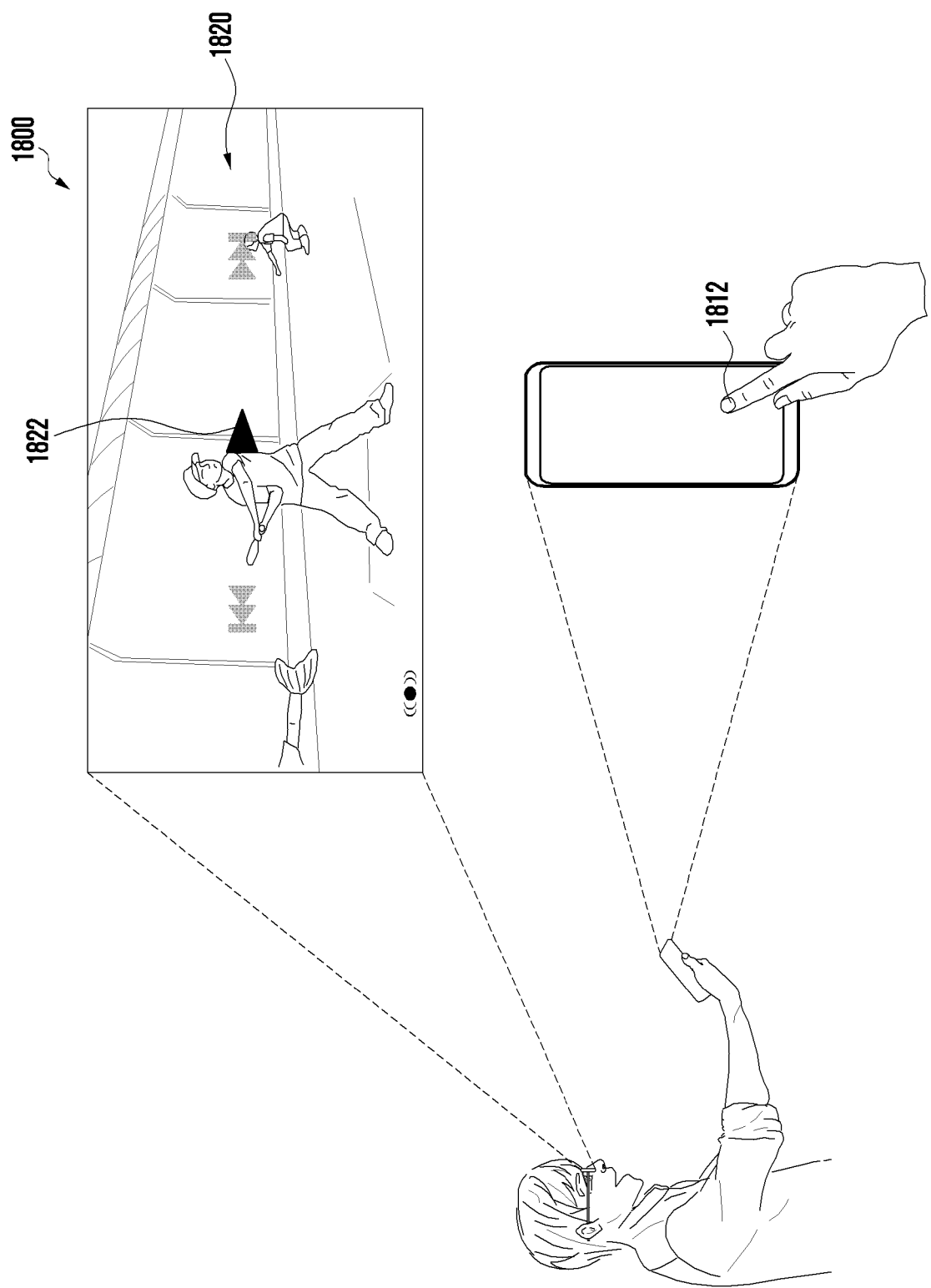
FIG. 18A illustrates a screen configuration of a first electronic device for controlling video content, based on input information provided from a second electronic device, according to an embodiment of the disclosure.

FIG. 18A illustrates a screen configuration of a first electronic device for controlling video content, based on input information provided from a second electronic device, according to an embodiment of the disclosure.

Figure 18B:
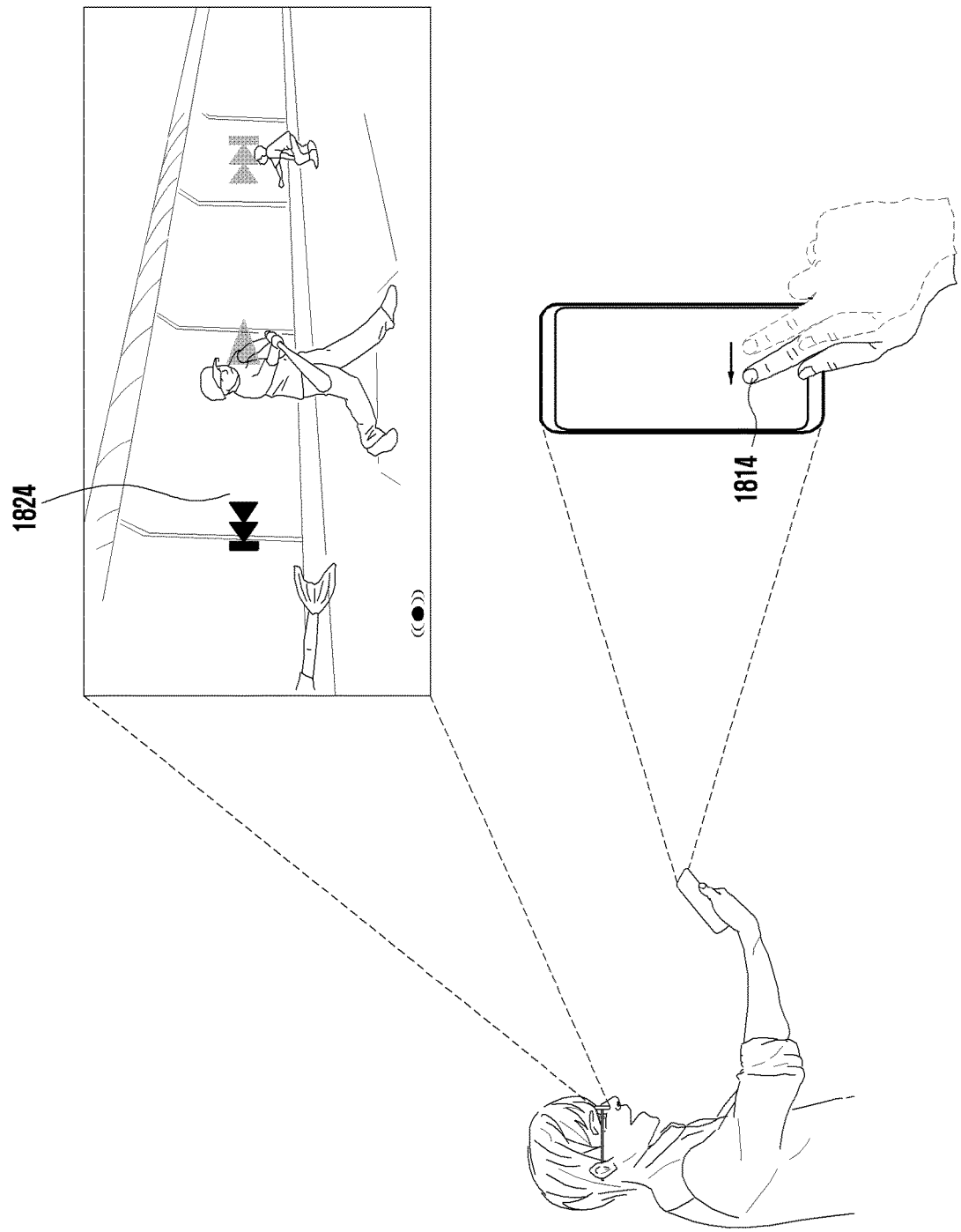
FIG. 18B illustrates a screen configuration of a first electronic device for controlling video content, based on input information provided from a second electronic device, according to an embodiment of the disclosure.

FIG. 18B illustrates a screen configuration of a first electronic device for controlling video content, based on input information provided from a second electronic device, according to an embodiment of the disclosure.

Figure 19A:
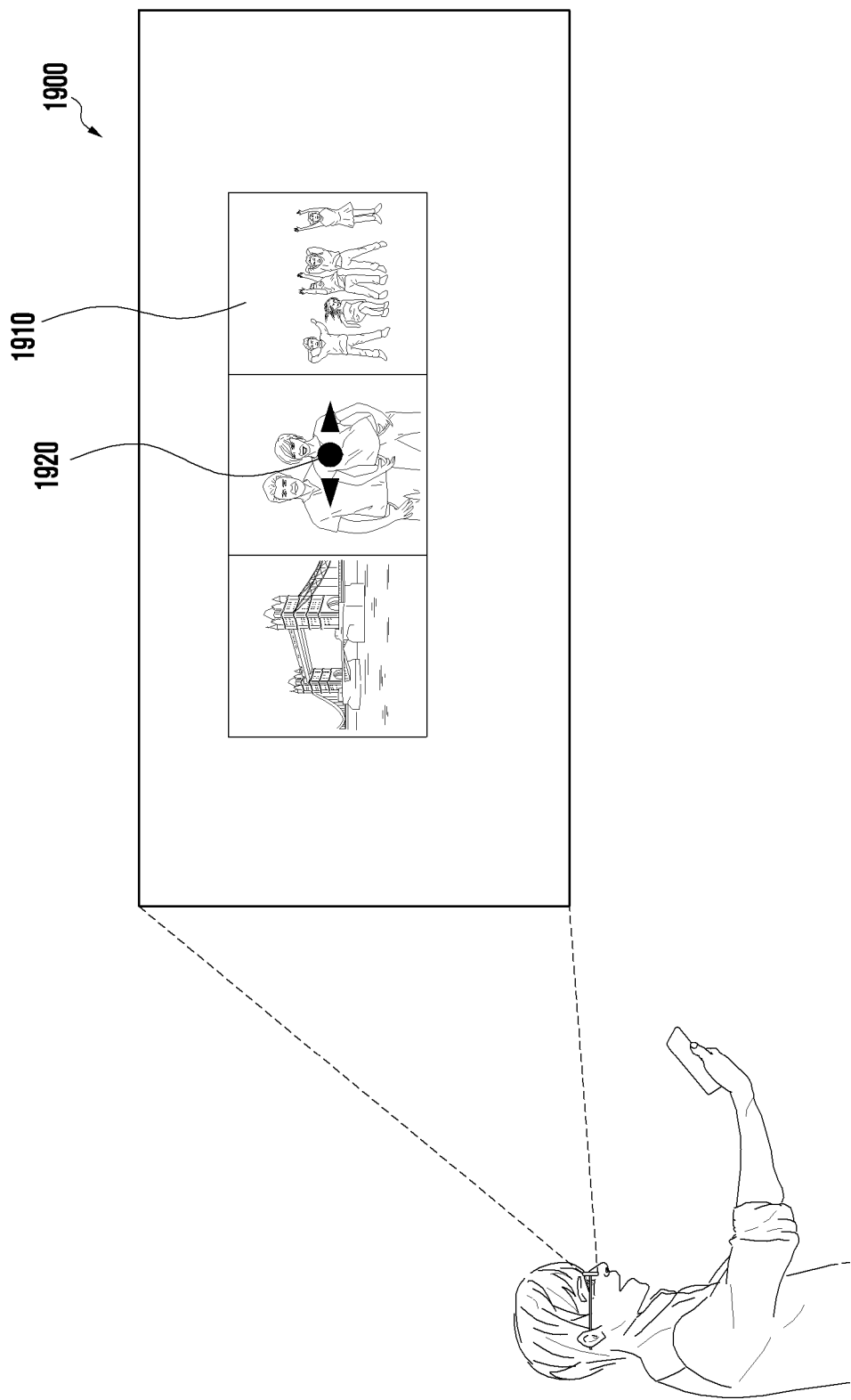
FIG. 19A illustrates a screen configuration of a first electronic device for providing guide information according to an embodiment of the disclosure.

FIG. 19A illustrates a screen configuration of a first electronic device for providing guide information according to an embodiment of the disclosure.

Figure 19B:
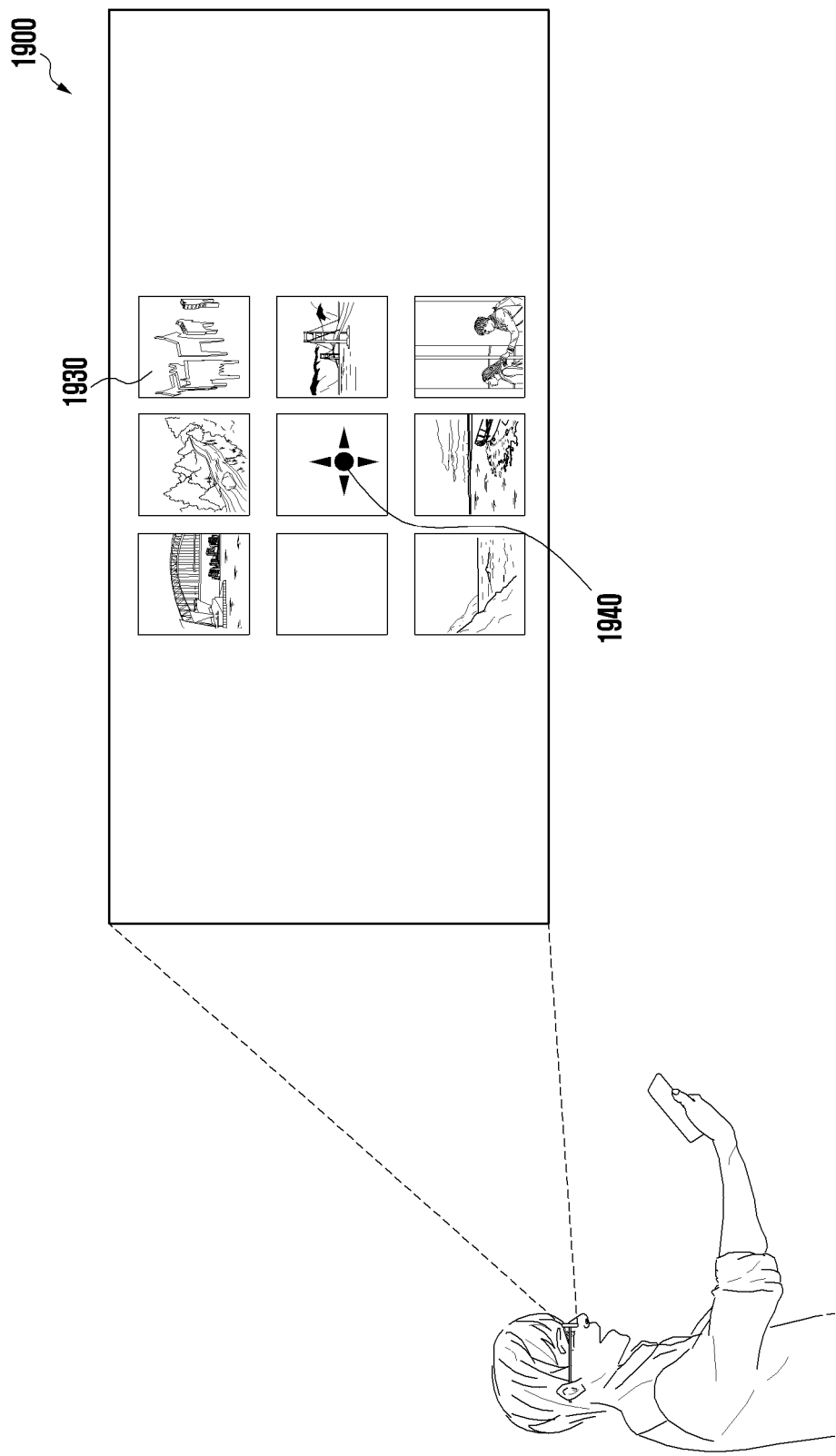
FIG. 19B illustrates a screen configuration of a first electronic device for providing guide information according to an embodiment of the disclosure.

FIG. 19B illustrates a screen configuration of a first electronic device for providing guide information according to an embodiment of the disclosure.

Figure 20A:
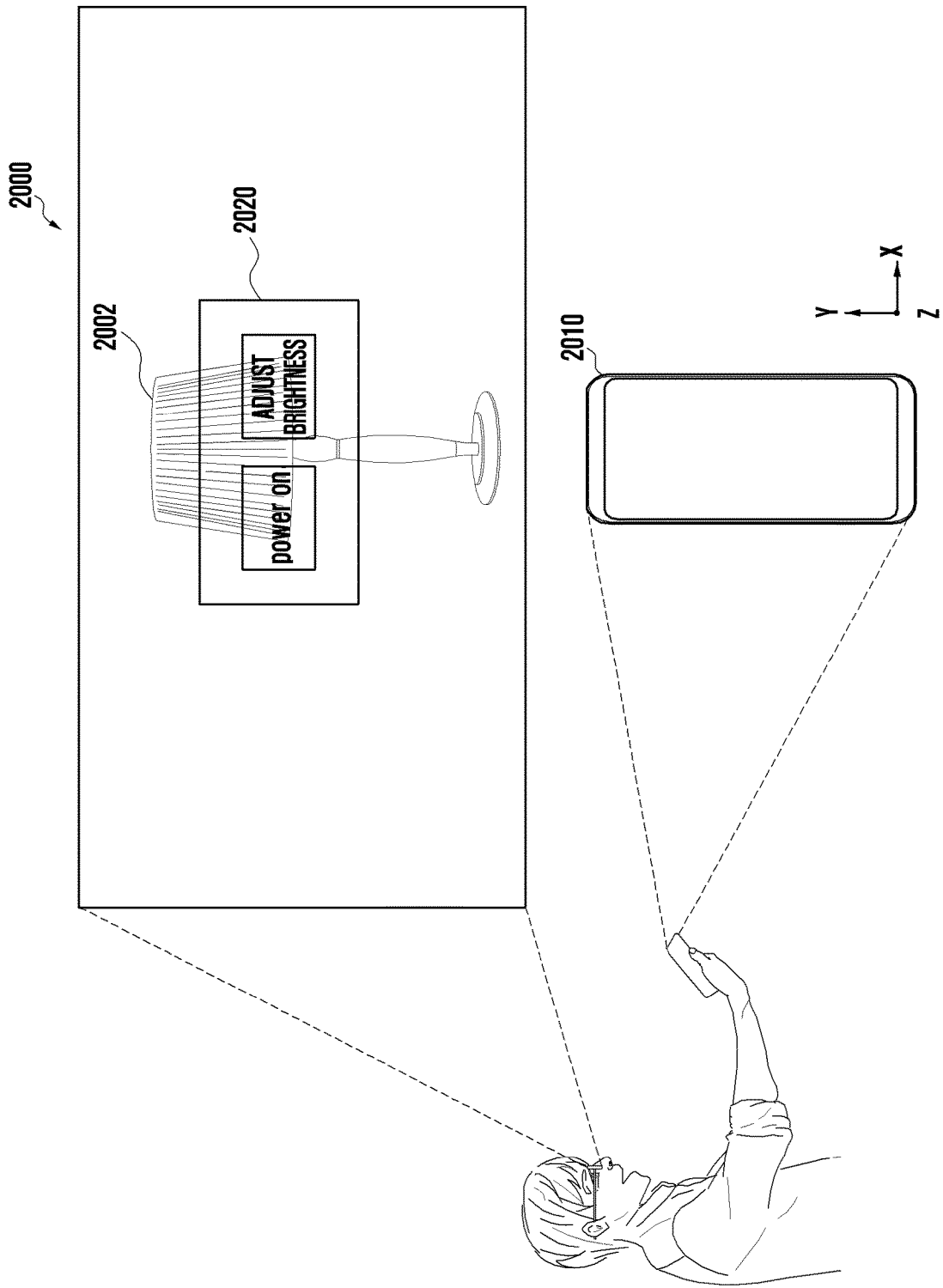
FIG. 20A illustrates a screen configuration of a first electronic device for displaying a functional UI, based on a form of a second electronic device, according to an embodiment of the disclosure.

FIG. 20A illustrates a screen configuration of a first electronic device for displaying a functional UI, based on the form of a second electronic device, according to an embodiment of the disclosure.

Figure 20B:
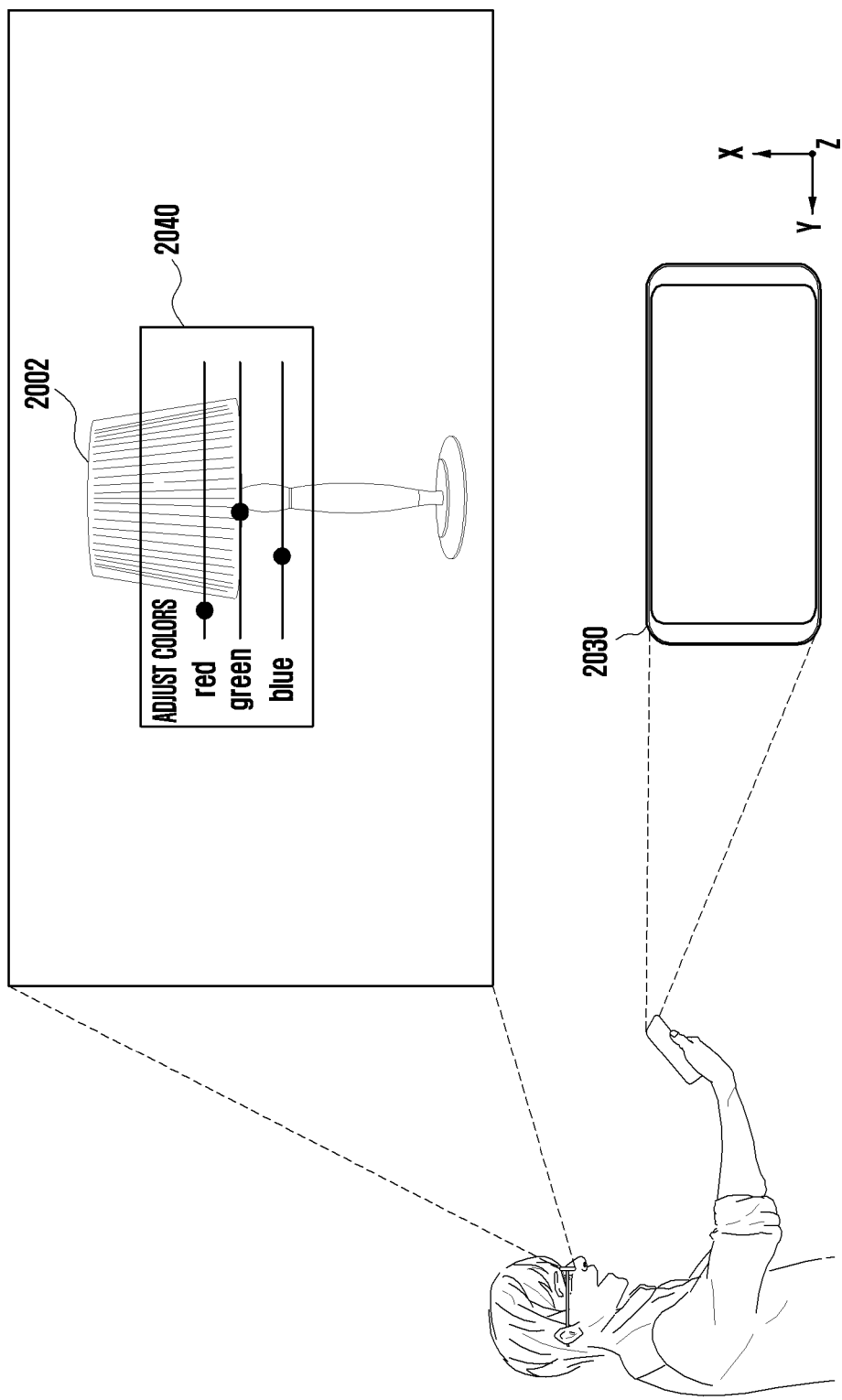
FIG. 20B illustrates a screen configuration of a first electronic device for displaying a functional UI, based on a form of a second electronic device, according to an embodiment of the disclosure.

FIG. 20B illustrates a screen configuration of a first electronic device for displaying a functional UI, based on the form of a second electronic device, according to an embodiment of the disclosure.

Referring to FIG. 15, according to various embodiments, in a method 1500, a first electronic device (e.g., the processor 120 in FIG. 1 or the processor 300 in FIG. 3) may determine whether or not to interwork with the second electronic device (e.g., the second electronic device 210 in FIG. 2), which is connected through a communication link (or a communication channel), for an augmented reality service in operation 1501. According to an embodiment, as described in operations 701 to 709 in FIG. 7, the processor 300 may determine whether or not to interwork with the second electronic device 210 for an augmented reality service, based on a retention time of a user's gaze corresponding to an active object. According to an embodiment, as described in operations 901 to 907 in FIG. 9, the processor 300 may determine whether or not to interwork with the second electronic device 210 for an augmented reality service, based on whether or not a user's gaze is directed toward an object related to the second electronic device 210. For example, in the case of providing an augmented reality service, as shown in FIG. 16A.

Referring to FIG. 16A, the processor 300 may control the display device 320 to display a virtual object 1610 (e.g., a playback screen) related to an application (e.g., a music application) executed in the first electronic device 200 on at least a portion of the area 1600 corresponding to a field of view of a user wearing the first electronic device 200. If a user's gaze is directed toward the virtual object 1610, the processor 300 may configure the second electronic device 210 as an input device for an augmented reality service. According to an embodiment, as described in operations 1201 to 1205 in FIG. 12, the processor 300 may determine whether or not to interwork with second electronic device 210 for an augmented reality service, based on whether or not the object related to the second electronic device 210 is included in the area corresponding to the field of view of the user wearing the first electronic device 200. According to an embodiment, as described in operations 1401 to 1407 in FIG. 14, the processor may determine whether or not to interwork with the second electronic device 210 for an augmented reality service, based on information on the positions of the first electronic device 200 and the second electronic device 210.

According to various embodiments, if the first electronic device (e.g., the processor 120 or 300) determines to interwork with the second electronic device (e.g., the second electronic device 210 in FIG. 2) for an augmented reality service (e.g., "YES" in operation 1501), the first electronic device may identify whether or not input information is received from the second electronic device (e.g., the second electronic device 210 in FIG. 2) in operation 1503.

According to various embodiments, if the first electronic device (e.g., the processor 120 or 300) receives input information from the second electronic device (e.g., the second electronic device 210 in FIG. 2) (e.g., "YES" in operation 1503), the first electronic device may perform a function corresponding to the input information received from the second electronic device (e.g., second electronic device 210 in FIG. 2) in operation 1505.

Referring to FIG. 16B, if the processor 300 receives information related to a tap input 1622 from the second electronic device 210, the processor 300 may control the display device 320 to display a functional UI 1630 of the virtual object 1610 corresponding to the user's gaze. As an example, the functional UI 1630 may be displayed to overlap, at least in part, the virtual object 1610, or may be displayed adjacent thereto. As an example, the functional UI 1630 may display a cursor on a first menu 1631 (e.g., a cancel menu) among a plurality of menus corresponding to the virtual object 1610.

Referring to FIG. 16C, if the processor 300 receives, from the second electronic device 210, information on a touch movement input 1624 (e.g., drag) in a third direction (e.g., the left diagonal direction) while the functional UI 1630 is being displayed, the processor 300 may move the cursor displayed on the functional UI 1630 in the third direction (e.g., the left diagonal direction). As an example, the cursor of the functional UI 1630 may be displayed on a fifth menu 1632 (e.g., a setting menu) among the plurality of menus corresponding to the virtual object 1610 included in the functional UI 1630 as a result of the movement in the third direction (e.g., the left diagonal direction). According to an embodiment, if the processor 300 receives a selection input (e.g., a tab input) from the second electronic device 210 while the functional UI 1630 is being displayed as shown in FIG. 16B or 16C, the processor 300 may perform an operation (e.g., removing a functional UI or displaying a setting menu) corresponding to the menu 1631 or 1632 on which the cursor is displayed.

According to various embodiments, if the first electronic device (e.g., the processor 120 or 300) determines to not interwork with the second electronic device (e.g., the second electronic device 210 in FIG. 2) for an augmented reality service (e.g., "NO" in operation 1501), or if the input information is not received from the second electronic device (e.g., the second electronic device 210 in FIG. 2) (e.g., "NO" in operation 1503), the first electronic device may control (or manage) the augmented reality service, based on the input information detected in the first electronic device (e.g., the first electronic device 200 in FIG. 2).

According to various embodiments, if the first electronic device 200 determines to interwork with the second electronic device 210 for an augmented reality service, the first electronic device 200 may control a display form (e.g., the size, the position, or the angle) of the virtual object displayed on the display device 320, based on the input information provided from the second electronic device 210. In an embodiment, in the case of providing an augmented reality service, the processor 300 may control the display device 320 to display at least one virtual object 1710 on at least a portion of the area 1700 corresponding to the field of view of the user wearing the first electronic device 200 as shown in FIG. 17A.

Referring to FIG. 17A, the user wearing the first electronic device 200 may identify an image object 1710 displayed on at least a portion of the real space through the area 1700 corresponding to a field of view of the user wearing the first electronic device 200. As an example, if a user's gaze is directed toward the image object 1710, gaze information 1702 may be displayed on the image object 1710. According to an embodiment, if the processor 300 receives information on a multi-tap input 1722 from the second electronic device 210 while the user's gaze is directed toward the image object 1710 as shown in FIG. 17A.

Referring to FIG. 17B, the processor 300 may control the display device 320 to enlarge the image object 1710 (see 1730). As an example, the image object 1710 may be enlarged based on a predefined ratio or a ratio corresponding to the multi-tap input 1722.

Referring to FIG. 17C, if the processor 300 receives, from the second electronic device 210, information 1724 on the movement of the second electronic device 210 in a first direction (e.g., the left direction) while the user's gaze is directed toward the image object 1710, the processor 300 may control the display device 320 such that the image object 1710 moves in the first direction (e.g., the left direction) (see 1740). As an example, the moving distance of the image object 1710 may be configured based on the moving distance of the electronic device 210. As an example, the processor 300 may control the display device 320 such that the image object 1710 moves based on the motion information 1724 of the second electronic device 210 while the multi-tap input 1722 is maintained.

According to various embodiments, if the first electronic device 200 determines to interwork with the second electronic device 210 for an augmented reality service, the first electronic device 200 may control the driving of an application (e.g., a video application) executed in the first electronic device 200, based on the input information provided from the second electronic device 210. In an embodiment, in the case of providing an augmented reality service, as shown in FIG. 18A.

Referring to FIG. 18A, the processor 300 may control the display device 320 to display a execution screen of the application executed in the first electronic device 200 on the area 1800 corresponding to the field of view of the user wearing the first electronic device 200. According to an embodiment, if the processor 300 receives information on a tap input 1812 from the second electronic device 210 while the execution screen of the application is being displayed on the display device 320 as shown in FIG. 18A, the processor 300 may control the display device 320 to display a functional UI (or a control menu) 1820 of the application. As an example, a cursor may be displayed on a sixth menu (e.g., a playback menu) 1822 among a plurality of menus included in the functional UI 1820.

Referring to FIG. 18B, if the processor 300 receives, from the second electronic device 210, information on a touch movement input 1814 (e.g., drag) in a first direction (e.g., the left direction) while the functional UI (or a control menu)

1820 of the application is being displayed as shown in FIG. 18A, the processor 300 may move the cursor displayed on the functional UI 1820 in the first direction (e.g., the left direction) as shown in FIG. 18B. As an example, the cursor of the functional UI 1820 may be moved in the first direction (e.g., the left direction), and may then be displayed on a seventh menu 1824 (e.g., a backward menu) included in the functional UI 1820.

According to an embodiment, if a user's gaze is directed toward the seventh menu 1824 while the functional UI (or a control menu) 1820 of the application is being displayed as shown in FIG. 18A, the processor 300 may control the display device 320 to display the cursor, which is displayed on the functional UI 1820, on the seventh menu 1824 (e.g., a backward menu).

According to an embodiment, if the processor 300 receives information on a selection input (for example, a tap input) from the second electronic device 210 while the functional UI 1820 is being displayed as shown in FIG. 18A or 18B, the processor 300 may perform an operation (e.g., play or go backwards) corresponding to the menu 1822 or 1824 on which the cursor is displayed.

According to various embodiments, if the first electronic device 200 determines to interwork with the second electronic device 210 for an augmented reality service, the first electronic device 200 may provide guide information corresponding to a user input.

Referring to FIGS. 19A and 19B, in the case of providing an augmented reality service, the processor 300 may control the display device 320 to display at least one virtual object in the area 1900 corresponding to a field of view of the user wearing the first electronic device 200. For example, the display device 320 may display one or more virtual objects 1910 arranged horizontally as shown in FIG. 19A. For example, the display device 320 may display one or more virtual objects 1930 arranged in a lattice form as shown in FIG. 19B. According to an embodiment, the processor 300 may control the display device 320 to display user gaze information in the form corresponding to the form in which one or more virtual objects are displayed. For example, in the case where one or more objects 1910 are arranged horizontally as shown in FIG. 19A, the display device 320 may display user gaze information 1920 in the form capable of moving to the left/right. For example, in the case where one or more objects 1930 are arranged in a lattice form as shown in FIG. 19B, the display device 320 may display user gaze information 1940 in the form capable of moving up/down/left/right. As an example, the display device 320 may display an object corresponding to cursor so as to be relatively large or have a different depth, among the one or more virtual objects displayed in the area 1900 corresponding to the field of view of the user wearing the first electronic device 200.

According to various embodiments, the first electronic device 200 may differently configure the functional UI, based on motion information (e.g., the direction) of the second electronic device 210.

Referring to FIG. 20A, the user wearing the first electronic device 200 may identify an object 2002 in the real space through the area 2000 corresponding to the field of view of the user wearing the first electronic device 200. As an example, the object 2002 may correspond to an external device supporting an IoT service. If the processor 300 receives input information (e.g., a tap input) from the second electronic device 210 while a user's gaze is directed toward the object 2002, the processor 300 may control the display device 320 to display a control menu (e.g., a functional UI) corresponding to the object 2002. For example, if the second electronic device 210 is in the vertical direction (see 2010) as shown in FIG. 20A, the display device 320 may display a relatively simple control menu 2020 corresponding to the object 2002. As an example, the control menu 2020 may include a switch menu and/or a brightness adjustment menu.

Referring to FIG. 20B, if the second electronic device 210 is in the horizontal direction (see 2030), the display device 320 may display a relatively detailed control menu 2040 corresponding the object 2002. As an example, the control menu 2040 may include a menu for adjusting the color of the object 2002.

Figure 21:
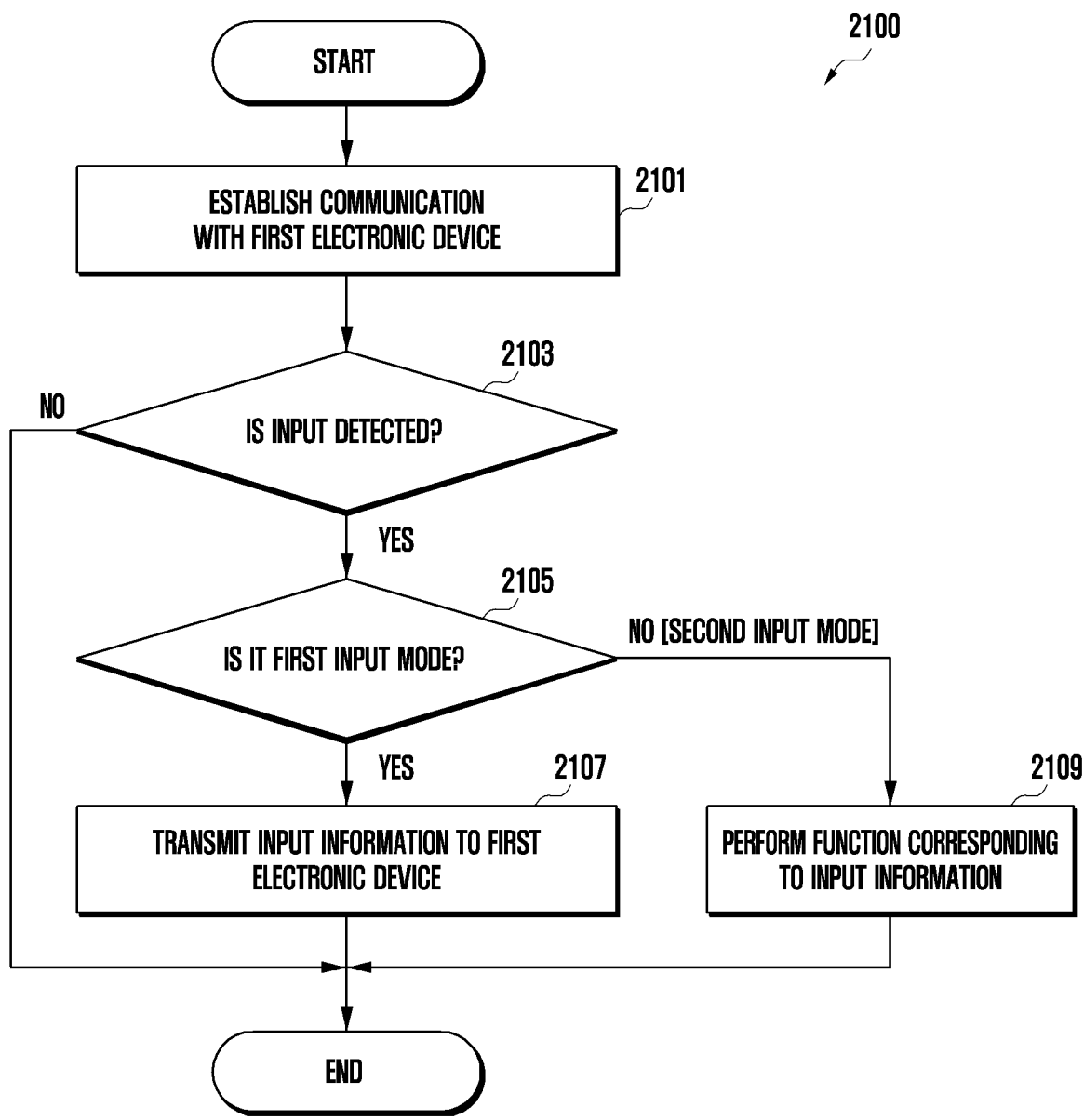
FIG. 21 is a flowchart in which a second electronic device interworks with a first electronic device according to an embodiment of the disclosure.

FIG. 21 is a flowchart in which a second electronic device interworks with a first electronic device according to an embodiment of the disclosure. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the second electronic device 210 shown in FIG. 4.

Referring to FIG. 21, according to various embodiments, in a method 2100, a second electronic device (e.g., the processor 120 or the communication module 190 in FIG. 1, or the processor 400 or the communication circuit 410 in FIG. 4) may establish a communication link (or a communication channel) with a first electronic device (e.g., the first electronic device 200 in FIG. 2) in operation 2101. According to an embodiment, if user authentication for establishment of a communication link between the first electronic device 200 and the second electronic device 210 is successful, the processor 400 may control the communication circuit 410 to establish a communication link (or a communication channel) with the first electronic device 200. As an example, the communication link (or the communication channel) may be established based on short-range communication schemes such as Bluetooth, BLE, or wireless LAN (e.g., Wi-Fi direct).

According to various embodiments, in operation 2103, the second electronic device (e.g., the processor 120 or 400) may identify whether or not input information is detected. As an example, the input information may include at least one of user input information detected by the input device 420 and/or the operation state (e.g., motion information) of the second electronic device 210 detected by the sensor module 430.

According to various embodiments, if input information is not detected (e.g., "NO" in operation 2103), the second electronic device (e.g., the processor 120 or 400) may identify whether or not input information is detected.

According to various embodiments, if input information is detected (e.g., "YES" in operation 2103), the second electronic device (e.g., the processor 120 or 400) may determine whether or not the input processing method of the second electronic device (e.g., the second electronic device 210 in FIG. 2) is configured as a first method in operation 2105. As an example, the first method may include an input processing method for sharing the input information with the first electronic device 200.

According to various embodiments, if the first method is configured (e.g., "YES" in operation 2105), the second electronic device (e.g., the processor 120 or 400) may transmit the input information to the first electronic device (e.g., the first electronic device 200 in FIG. 2) interworking for an augmented reality service in operation 2107. As an example, the input information transmitted to the first electronic device 200 may include commend information (e.g., tap, multi-tap, drag, long touch, or double tap) corresponding to the input detected in the second electronic device 210 or row data detected for recognizing the command information.

According to various embodiments, if the first method is not configured (e.g., "NO" in operation 2105), the second electronic device (e.g., the processor 120 or 400) may perform a function (or an operation) corresponding to the input information in operation 2109. According to an embodiment, if a tap input 1120 is detected as shown in FIG. 11B, the processor 400 may control the display device 440 to enlarge and display an image object selected by the tap input 1120 (see 1130) as shown in FIG. 11C.

Figure 22:
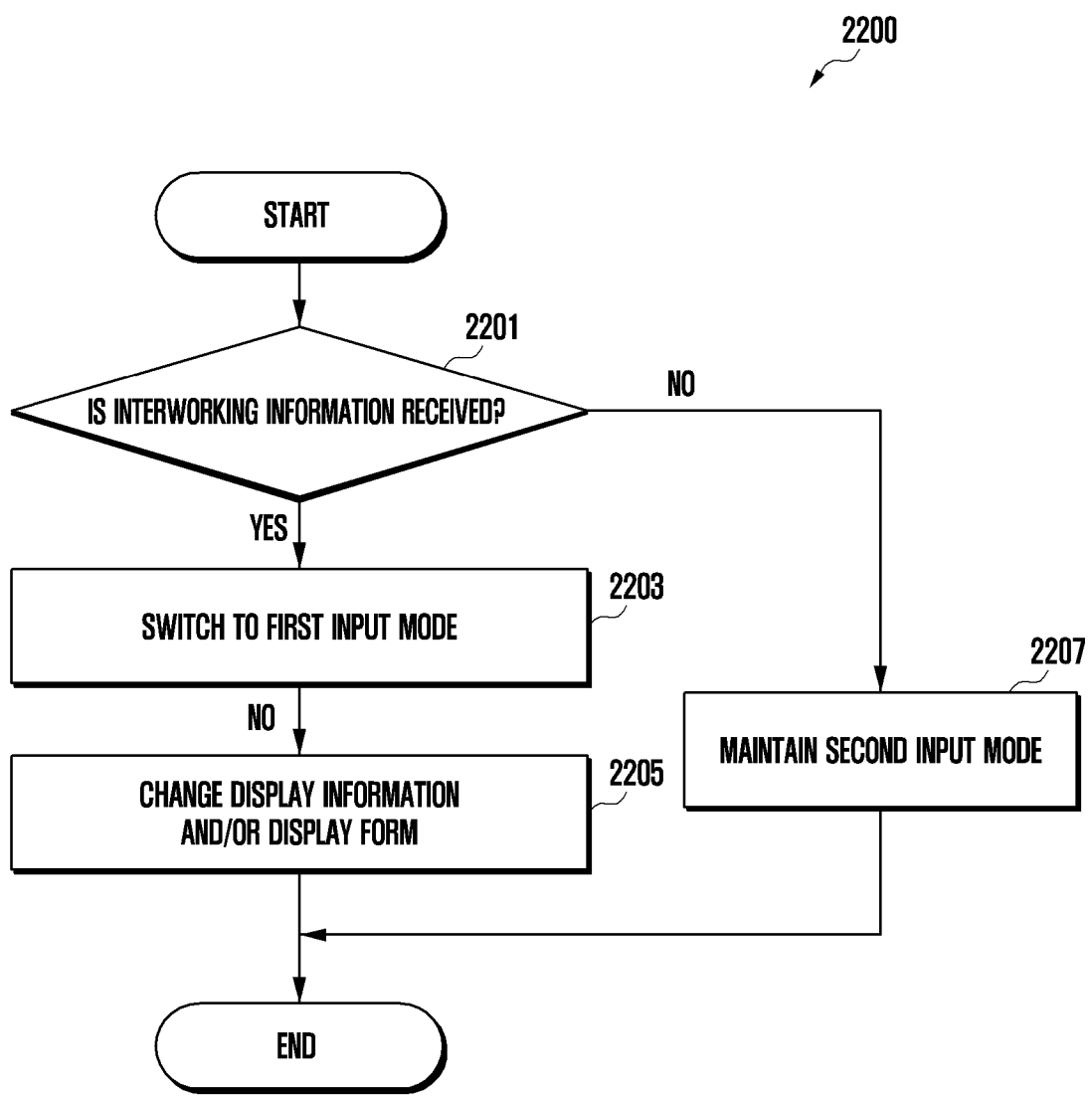
FIG. 22 is a flowchart in which a second electronic device interworks with a first electronic device, based on control of the first electronic device, according to an embodiment of the disclosure.

FIG. 22 is a flowchart in which a second electronic device interworks with a first electronic device, based on control of the first electronic device, according to an embodiment of the disclosure. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the second electronic device 210 shown in FIG. 4. As an example, at least some of the elements shown in FIG. 22 will be described with reference to FIGS. 23A to 24B.

Figures 23A, 23B:
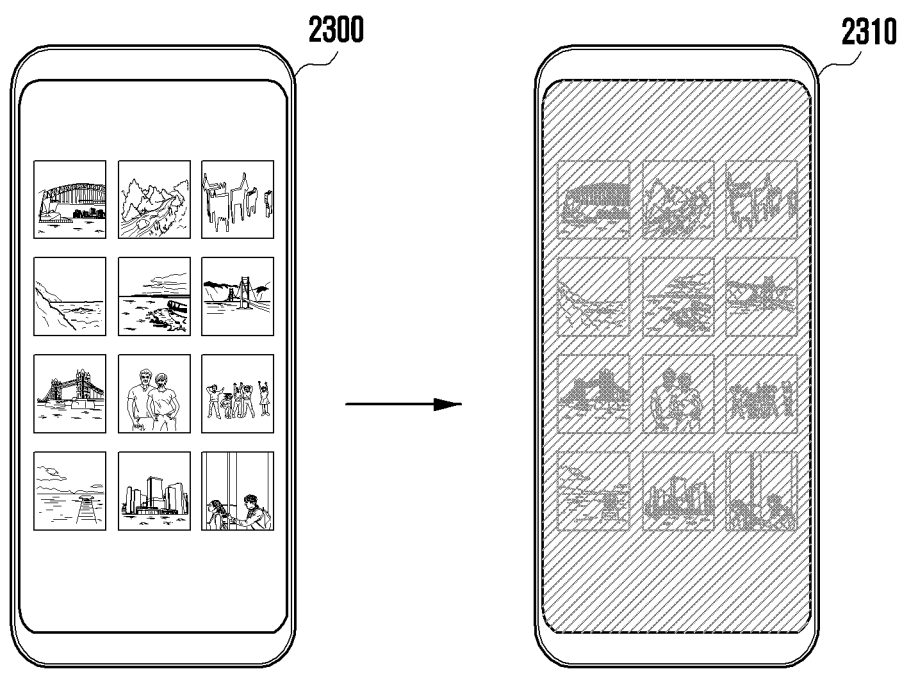
FIG. 23A illustrates an example of changing a display method in a second electronic device, based on interworking with a first electronic device, according to an embodiment of the disclosure.
FIG. 23B illustrates an example of changing a display method in a second electronic device, based on interworking with a first electronic device, according to an embodiment of the disclosure.

FIG. 23A illustrates an example of changing a display method in a second electronic device, based on interworking with a first electronic device, according to an embodiment of the disclosure.

FIG. 23B illustrates an example of changing a display method in a second electronic device, based on interworking with a first electronic device, according to an embodiment of the disclosure.

FIG. 24A illustrates an example of changing content to be displayed on a display device in a second electronic device, based on interworking with a first electronic device, according to an embodiments of the disclosure.

FIG. 24B illustrates an example of changing content to be displayed on a display device in a second electronic device, based on interworking with a first electronic device, according to an embodiment of the disclosure.

Referring to FIG. 22, according to various embodiments, in a method 2200, in operation 2201, a second electronic device (e.g., the processor 120 or the communication module 190 in FIG. 1, or the processor 400 or the communication circuit 410 in FIG. 4) may identify whether or not interworking information is received from a first electronic device (e.g., the first electronic device 200 in FIG. 2) connected through an established communication link (or the communication channel). According to an embodiment, as described in operations 501 or 507 in FIG. 5, if the first electronic device 200 determines to interwork with the second electronic device 210 for an augmented reality service, the first electronic device 200 may transmit interworking information related to an augmented reality service to the second electronic device 210. Accordingly, the processor 400 may identify whether or not the interworking information related to an augmented reality service is received from the first electronic device 200 through the communication circuit 410.

According to various embodiments, if the interworking information is received from the first electronic device (e.g., the first electronic device 200 in FIG. 2) (e.g., "YES" in operation 2201), the second electronic device (e.g., the processor 120 or 400) may switch the input processing method of the second electronic device (e.g., the second electronic device 210 in FIG. 2) to a first method in operation 2203. As an example, the first method may include an input processing method for sharing an input in the second electronic device 210 with the first electronic device 200 for interworking for an augmented reality service.

According to various embodiments, in operation 2205, the second electronic device (e.g., the processor 120 or 400) may change display information and/or a display method of the display device (e.g., the display device 440 in FIG. 4), based on the switching to the first method. According to an embodiment, if the input processing method of the second electronic device 210 switches to the first method, the processor 400 may recognize that the second electronic device 210 is to interwork with the first electronic device 200 for an augmented reality service. Accordingly, the processor 400 may control the display device 440 such that display information and/or a display method of the display device 440 change for the augmented reality service.

Referring to FIG. 23A, the display device 440 may display an execution screen (e.g., an image list) 2300 of an application (e.g., a gallery application) executed in the second electronic device 210.

Referring to FIG. 23B, if the input processing method of the second electronic device 201 switches to the first method, the processor 400 may control the display device 440 such that the brightness of the image list 2310 of the display device 440 is relatively reduced. As an example, if the input processing method of the second electronic device 201 switches from the first method to the second method, the processor 400 may control the display device 440 such that the brightness of the display device 440 is restored as shown in FIG. 23A.

Referring to FIG. 24A, the display device 440 may display a standby screen 2400 of the second electronic device 210.

Referring to FIG. 24B, if the input processing method of the second electronic device 201 switches to the first method, the processor 400 may control the display device 440 to display content 2410 (e.g., game information) corresponding to an augmented reality service. As an example, if the input processing method of the second electronic device 201 switches from the first input processing method to the second method, the processor 400 may control the display device 440 to display the standby screen 2400 as shown in FIG. 24A.

According to various embodiments, if interworking information is not received from the first electronic device (e.g., the first electronic device 200 in FIG. 2) (e.g., "NO" in operation 2201), the second electronic device (e.g., the processor 120 or 400) may maintain the second method of the second electronic device (e.g., the second electronic device 210 in FIG. 2) in operation 2207. According to an embodiment, if the processor 400 configures the second method as a basic input processing method of the second electronic device 210, and if interworking information related to an augmented reality service is received from the first electronic device 200, the processor 400 may switch the input processing method of the second electronic device 210 to the first method.

Figure 25:
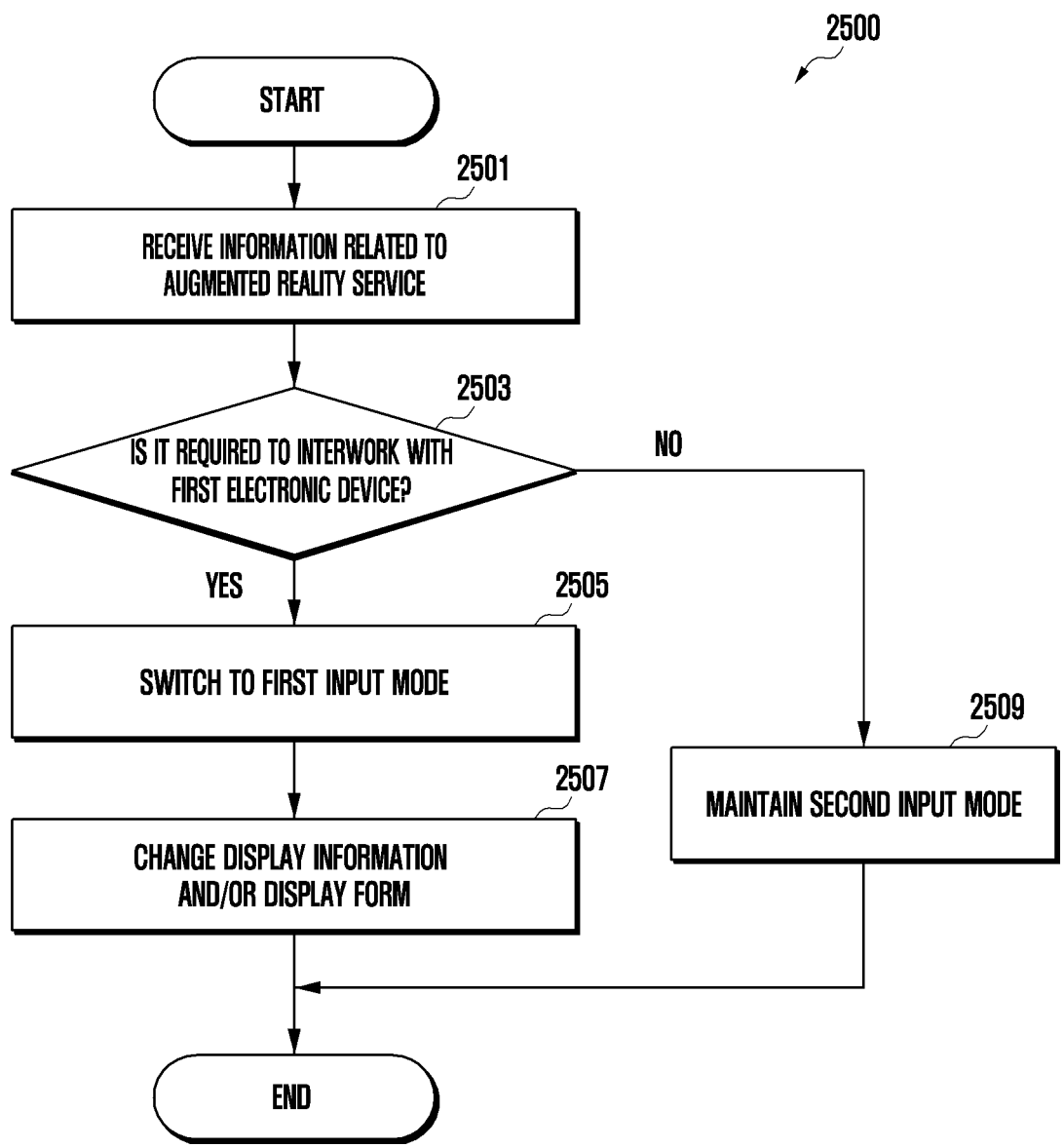
FIG. 25 is a flowchart in which a second electronic device determines to interwork with a first electronic device in according to an embodiment of the disclosure.

FIG. 25 is a flowchart for determining interworking with a first electronic device in a second electronic device according to an embodiment of the disclosure. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the second electronic device 210 shown in FIG. 4.

Referring to FIG. 25, according to various embodiments, in a method 2500, in operation 2501, the second electronic device (e.g., the processor 120 or the communication module 190 in FIG. 1, or the processor 400 or the communication circuit 410 in FIG. 4) may receive information related to an augmented reality service from the first electronic device (e.g., the first electronic device 200 in FIG. 2) connected through an established communication link (or the communication channel). According to an embodiment, the processor 400 may receive, from the first electronic device 200, information related to an augmented reality service provided from the first electronic device 200 through the communication circuit 410. As an example, the information related to an augmented reality service may include at least one piece of information on an object included in an area corresponding to a field of view of a user wearing the first electronic device 200, information on a gaze of a user wearing the first electronic device 200, or information on the position of the first electronic device 200.

According to various embodiments, in operation 2503, the second electronic device (e.g., the processor 120 or 400) may determine whether or not to interwork with the first electronic device (e.g., the first electronic device 200 in FIG. 2) for an augmented reality service, based on the information related to an augmented reality service. According to an embodiment, the processor 400 may determine whether or not to interwork with the first electronic device 200, based on at least one of a retention time of the user's gaze corresponding to the object included in the area corresponding to the field of view of the user wearing the first electronic device 200, whether or not an object related to the second electronic device 210 is included in the area corresponding to the field of view of the user wearing the first electronic device 200, or user gaze information corresponding to the object related to the second electronic device 210. According to an embodiment, the processor 400 may determine whether or not to interwork with the first electronic device 200 for an augmented reality service, based on the result of comparison of the position information between the first electronic device 200 and the second electronic device 210.

According to various embodiments, if the second electronic device (e.g., the processor 120 or 400) determines to interwork with the first electronic device (e.g., the first electronic device 200 in FIG. 2) for an augmented reality service (e.g., "YES" in operation 2503), the second electronic device may switch the input processing method of the second electronic device (e.g., the second electronic device 210 in FIG. 2) to a first method in operation 2505.

According to various embodiments, in operation 2507, the second electronic device (e.g., the processor 120 or 400) may change display information and/or a display method of the display device (e.g., the display device 440 in FIG. 4), based on the switching to the first method. According to an embodiment, if the input processing method of the second electronic device 210 switches to the first method, the processor 400 may control the display device 440 such that to switch to an inactive mode in order for the user to concentrate on the information related to the augmented reality service.

According to various embodiments, if the second electronic device (e.g., the processor 120 or 400) determines to not interwork with the first electronic device (e.g., the first electronic device 200 in FIG. 2) for an augmented reality service (e.g., "NO" in operation 2503), the second electronic device may maintain the second method of the second electronic device (e.g., the second electronic device 210 in FIG. 2) in operation 2509.

According to various embodiments, the second electronic device 210 may configure the input processing method of the second electronic device 210, based on information on a gaze of a user wearing the first electronic device 200, at the time at which input information is detected. According to an embodiment, if input information is detected, the second electronic device 210 may identify information on a gaze of the user wearing the first electronic device 200. If it is determined that the gaze of the user wearing the first electronic device 200 is directed toward an active object, the second electronic device 210 may configure the input processing method of the second electronic device 210 as a first method. As an example, the second electronic device 210 may identify the information on the gaze of the user wearing the first electronic device 200, based on information related to an augmented reality service, which is periodically received from the first electronic device 200. As an example, if input information is detected, the second electronic device 210 may transmit a request for user gaze information to the first electronic device 200, thereby identifying the gaze information on the user wearing the first electronic device 200.

Figure 26:
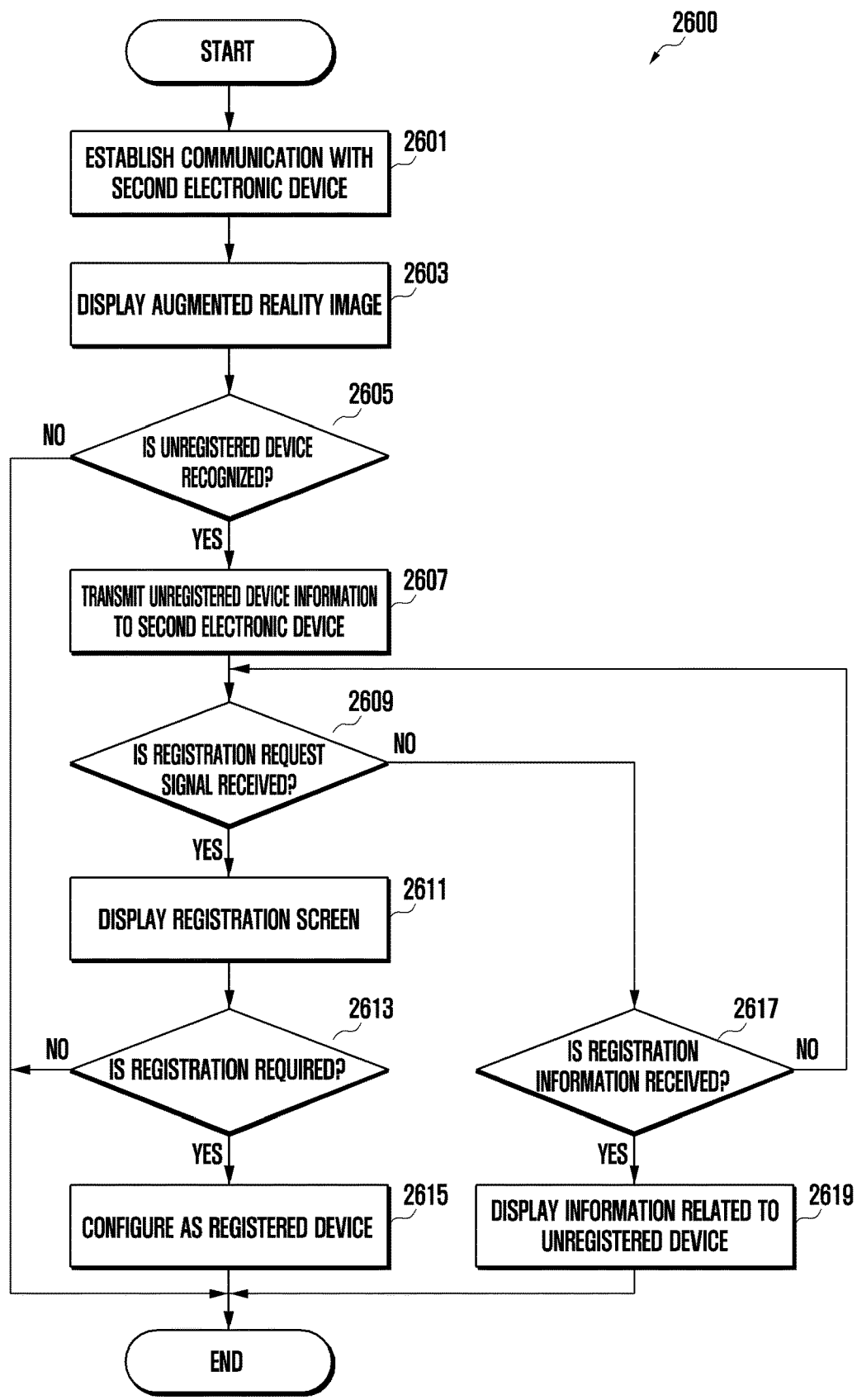
FIG. 26 is a flowchart for providing an IoT service in a first electronic device according to an embodiment of the disclosure.

FIG. 26 is a flowchart for providing an IoT service in a first electronic device according to an embodiment of the disclosure. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the first electronic device 200 shown in FIG. 3. As an example, the first electronic device may be the electronic device 101 shown in FIG. 1 or the first electronic device 200 shown in FIG. 3. As an example, at least some of the elements shown in FIG. 26 will be described with reference to FIGS. 27A and 27B.

Figure 27A:
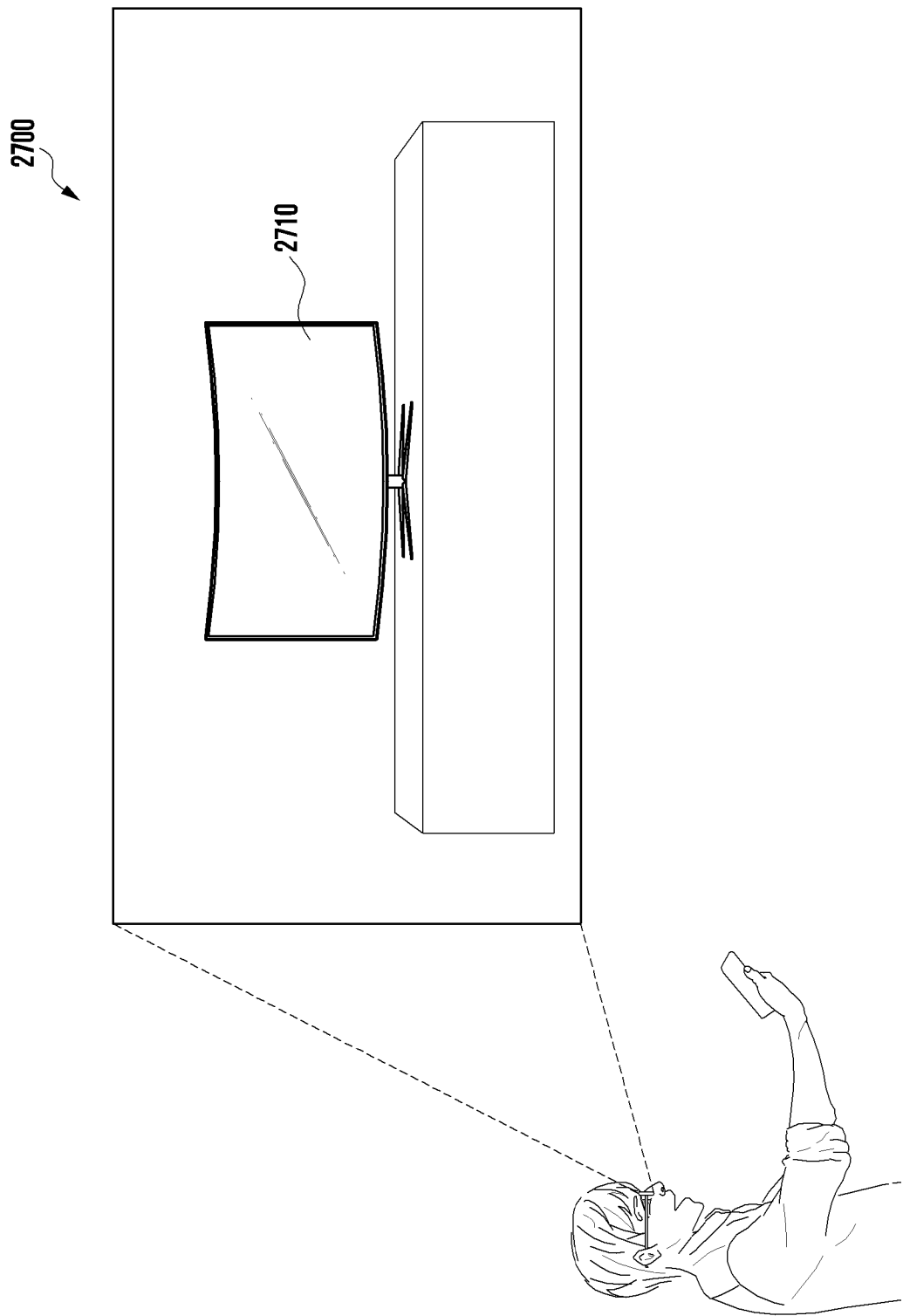
FIG. 27A illustrates a screen configuration of a first electronic device for registering an IoT device according to an embodiment of the disclosure.

FIG. 27A illustrates a screen configuration of a first electronic device for registering an IoT device according to an embodiment of the disclosure.

Figure 27B:
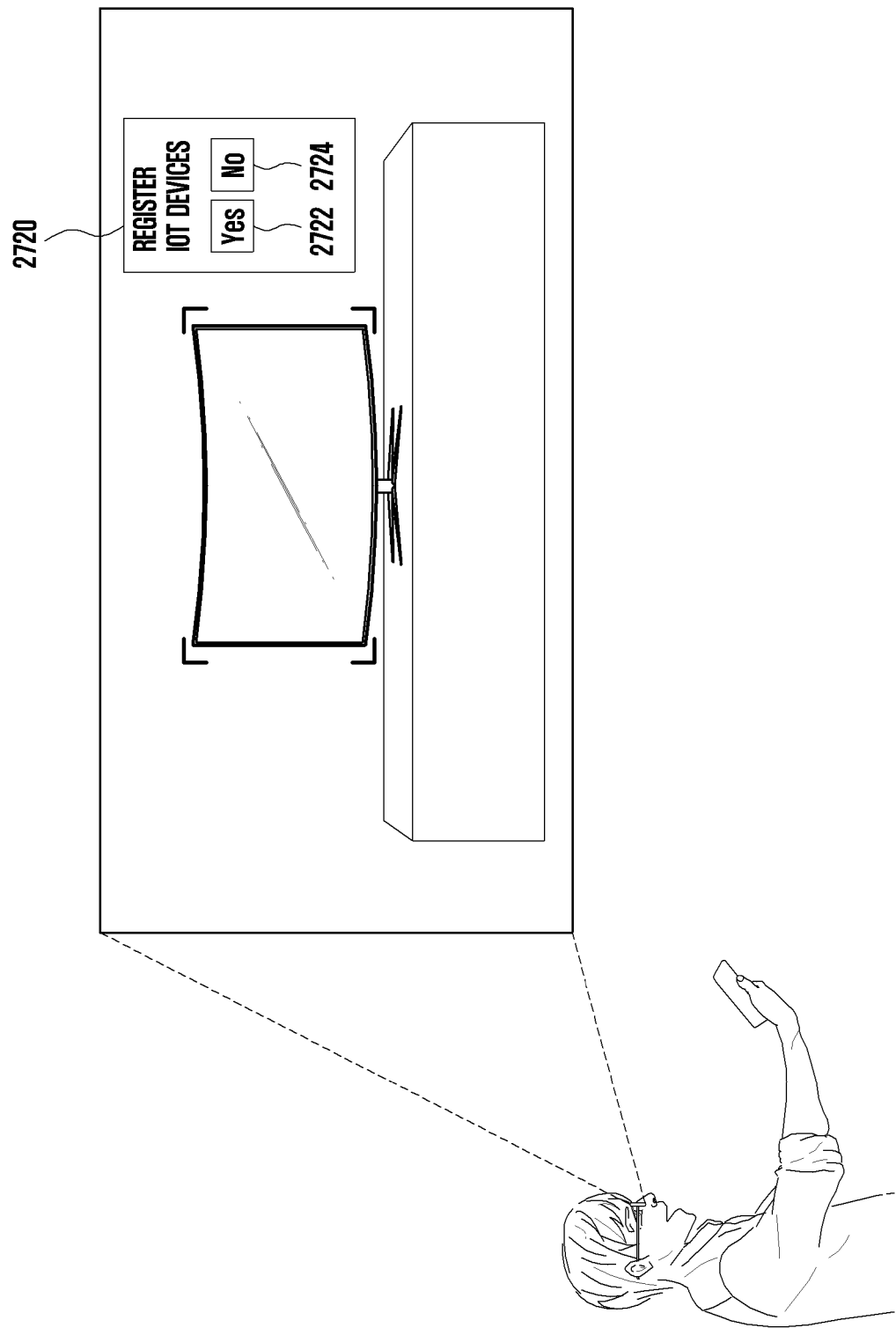
FIG. 27B illustrates a screen configuration of a first electronic device for registering an IoT device according to an embodiment of the disclosure.

FIG. 27B illustrates a screen configuration of a first electronic device for registering an IoT device according to an embodiment of the disclosure.

Referring to FIG. 26, according to various embodiments, in a method 2600, in operation 2601, the first electronic device (e.g., the processor 120 or the communication module 190 in FIG. 1, or the processor 300 or the communication circuit 330 in FIG. 3) may establish a communication link (or a communication channel) with the second electronic device (e.g., the second electronic device 210 in FIG. 2). As an example, the user identification information may be the same between the first electronic device 200 and the second electronic device 210. As an example, the first electronic device 200 and the second electronic device 210 may succeed in authentication of a user related to the establishment of the communication link.

According to various embodiments, in operation 2603, the first electronic device (e.g., the processor 120 or 300) may output information related to an augmented reality service. According to an embodiment, the processor 300 may control the display device 320 to display at least one virtual object in the area corresponding to a field of view of a user wearing the first electronic device 200.

Referring to FIG. 27A, the user wearing the first electronic device 200 may recognize an object such as an IoT device 2710 related to an augmented reality service through the area 2700 corresponding to the field of view of the user wearing the first electronic device 200.

According to various embodiments, in operation 2605, the first electronic device (e.g., the processor 120 or 300) may identify whether or not an unregistered device is recognized in the area corresponding to the field of view of the user wearing the first electronic device (e.g., the first electronic device 200 in FIG. 2). According to an embodiment, the processor 300 may identify whether or not an object related to an IoT device exists in the area corresponding to the field of view of the user wearing the first electronic device 200 through at least one of the camera module 310 or the sensor module 340 (e.g., the space sensor). If an object related to the IoT device 2710 is detected in the area corresponding to the field of view of the user wearing the first electronic device 200, the processor 300 may identify whether or not the IoT device 2710 is registered in the first electronic device 200. As an example, the processor 300 may identify whether or not registration information on the IoT device 2710 is stored in a memory (e.g., the memory 130 in FIG. 1).

According to various embodiments, if an unregistered device is not recognized (e.g., "NO" in operation 2605), the first electronic device (e.g., the processor 120 or 300) may provide an augmented reality service.

According to various embodiments, if an unregistered device is recognized (e.g., "YES" in operation 2605), the first electronic device (e.g., the processor 120 or 300) may transmit information related to the unregistered device to the second electronic device (e.g., the second electronic device 210 in FIG. 2) in operation 2607. As an example, the information related to the unregistered device may include the type of the device (e.g., a television set) obtained through image analysis and/or information on the position (e.g., living room) of the first electronic device 200.

According to various embodiments, in operation 2609, the first electronic device (e.g., the processor 120 or 300) may identify whether or not a registration request signal is received from the second electronic device (e.g., the second electronic device 210 in FIG. 2). According to an embodiment, the second electronic device 210 may identify the unregistered device recognized by the first electronic device 200, based on the information related to the unregistered device. The second electronic device 210 may identify whether or not the unregistered IoT device 2710 of the first electronic device 200 is registered in the second electronic device 210. If the unregistered device 2710 of the first electronic device 200 is not registered even in the second electronic device 210, the second electronic device 210 may transmit a registration request signal to the first electronic device 200. Accordingly, the processor 300 may identify whether or not a registration request signal is received from the second electronic device 210 through the communication circuit 410.

According to various embodiments, if the first electronic device (e.g., the processor 120 or 300) receives a registration request signal from the second electronic device (e.g., the second electronic device 210 in FIG. 2) (e.g., "YES" in operation 2609), the first electronic device may display a registration screen related to the unregistered device in operation 2611.

Referring to FIG. 27B, if a registration request signal is received from the second electronic device 210, the processor may control the display device 320 to display a registration screen 2720 corresponding to the object 2710 related to the IoT device.

According to various embodiments, in operation 2613, the first electronic device (e.g., the processor 120 or 300) may determine whether or not to register the unregistered device in the first electronic device (e.g., the first electronic device 200 in FIG. 2), based on an input corresponding to the registration screen related to the unregistered device.

According to various embodiments, if the first electronic device (e.g., the processor 120 or 300) determines to register the unregistered device in the first electronic device (e.g., the first electronic device 200 in FIG. 2) (e.g., "YES" in operation 2613), the first electronic device may register the information related to the unregistered device in the first electronic device (e.g., the first electronic device in FIG. 2) in operation 2615. According to an embodiment, if an input for selecting the menu "YES" 2722 in the registration screen 2720 is detected in FIG. 27B, the processor 300 may determine to register the IoT device 2710. In this case, the processor 300 may register information related to the IoT device 2710 in a memory (e.g., the memory 130 in FIG. 1) of the first electronic device 200. As an example, if the IoT device 2710 is detected through the camera module 310, the processor 300 may control the display device 320 to display a virtual object (e.g., a control menu or state information) related to the IoT device. According to an embodiment, if an input for selecting the menu "NO" 2724 in the registration screen 2720 is detected in FIG. 27B, the processor 300 does not register the advice.

According to various embodiments, if a registration request signal is not received from the second electronic device (e.g., the second electronic device 210 in FIG. 2) (e.g., "NO" in operation 2609), the first electronic device (e.g., the processor 120 or 300) may identify whether or not registration information related to the unregistered device is received in operation 2617. According to an embodiment, if the unregistered device 2710 of the first electronic device 200 is registered in the second electronic device 210, the second electronic device 210 may transmit registration information related to the unregistered device 2710 to the first electronic device 200. Accordingly, the processor 300 may determine whether or not registration information related to the unregistered device 2710 is received from the second electronic device 210 through the communication circuit 410.

According to various embodiments, if registration information related to the unregistered device is not received (e.g., "NO" in operation 2617), the first electronic device (e.g., the processor 120 or 300) may determine whether or not a registration request signal related to the unregistered device is received.

According to various embodiments, if registration information related to the unregistered device is received (e.g., "YES" in operation 2617), the first electronic device (e.g., the processor 120 or 300) may display information related to the unregistered device in operation 2619. According to an embodiment, if registration information related to the IoT device 2710 is received from the second electronic device 210, the processor 300 may register the IoT device 2710 at the position (e.g., living room) of the first electronic device 200. As an example, if the IoT device 2710 is detected through the camera module 310, the processor 300 may control the display device 320 to display a virtual object (e.g., a control menu or state information) related to the IoT device.

Figure 28:
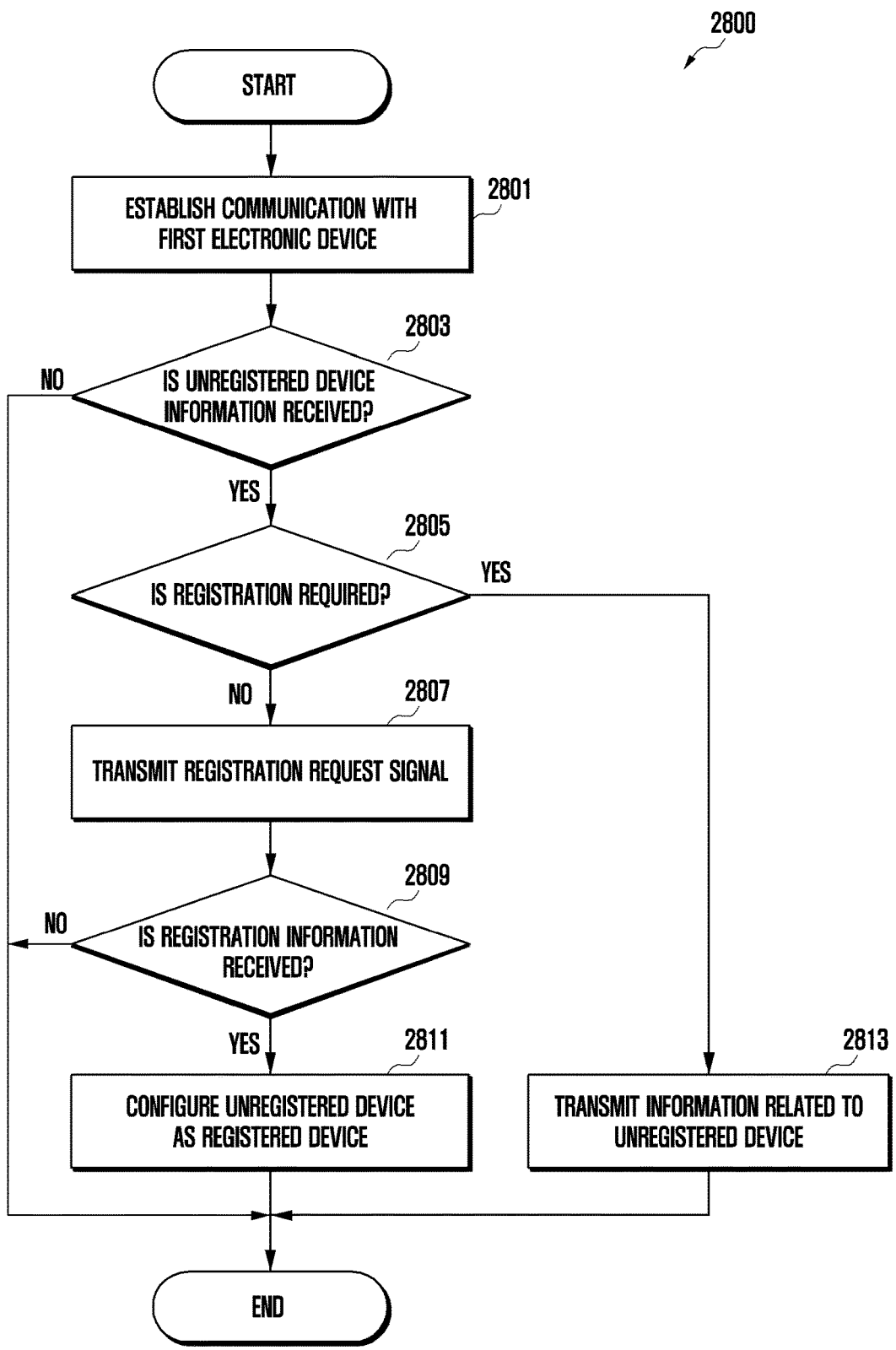
FIG. 28 is a flowchart in which a second electronic device provides an IoT service, based on a first electronic device, according to an embodiment of the disclosure.

FIG. 28 is a flowchart in which a second electronic device provides an IoT service, based on a first electronic device, according to an embodiment of the disclosure. In the following embodiment, respective operations may be sequentially performed, but is not necessarily performed sequentially. For example, the sequence of the respective operations may be changed, and at least two operations may be performed in parallel. As an example, the first electronic device may be the electronic device 101 shown in FIG. 1 or the second electronic device 210 shown in FIG. 4.

Referring to FIG. 28, according to various embodiments, in a method 2800, a second electronic device (e.g., the processor 120 or the communication module 190 in FIG. 1, or the processor 400 or the communication circuit 410 in FIG. 4) may establish a communication link (or a communication channel) with a first electronic device (e.g., the first electronic device 200 in FIG. 2) in operation 2801. According to an embodiment, the first electronic device 200 and the second electronic device 210 may establish a communication link (or a communication channel), based on short-range communication schemes such as Bluetooth, BLE, or wireless LAN (e.g., WiFi direct).

According to various embodiments, in operation 2803, the second electronic device (e.g., the processor 120 or 400) may identify whether or not information related to an unregistered device is received from the first electronic device (e.g., the first electronic device 200 in FIG. 2) connected through the established communication link (or the communication channel).

According to various embodiments, if the second electronic device (e.g., the processor 120 or 400) receives information related to an unregistered device from the first electronic device (e.g., the first electronic device 200 in FIG. 2) (e.g., "YES" in operation 2803), the second electronic device may determine whether or not the unregistered device is registered in the second electronic device (e.g., the second electronic device 210 in FIG. 2) in operation 2805. According to an embodiment, the processor 400 may identify the type of the unregistered device recognized by the first electronic device 200 and information on the position of the first electronic device 200, based on the information related to the unregistered device provided from the first electronic device 200. The processor 400 may identify whether or not the unregistered device of the first electronic device 200 is included in a list of devices registered at the position of the first electronic device 200.

According to various embodiments, if an unregistered device is not registered in the second electronic device (e.g., the second electronic device 210 in FIG. 2) (e.g., "NO" in operation 2805), the second electronic device (e.g., the processor 120 or 400) may transmit a registration request signal corresponding to the unregistered device to the first electronic device (e.g., the first electronic device 200 in FIG. 2) in operation 2807.

According to various embodiments, in operation 2809, the second electronic device (e.g., the processor 120 or 400) may identify whether or not registration information related to the unregistered device is received from the first electronic device (e.g., the first electronic device 200 in FIG. 2).

According to various embodiments, if the second electronic device (e.g., the processor 120 or 400) receives registration information related to the unregistered device from the first electronic device (e.g., the first electronic device 200 in FIG. 2) (e.g., "YES" in operation 2809), the second electronic device may register the unregistered device in the second electronic device (e.g., the second electronic device 210 in FIG. 2) in operation 2811. According to an embodiment, if a registration information related to an IoT device, which has not been registered, is received from the first electronic device 200, the processor 400 may register the IoT device (e.g., a television set) at the position (e.g., living room) of the first electronic device 200.

According to various embodiments, if the unregistered device is registered in the second electronic device (e.g., the second electronic device 210 in FIG. 2) (e.g., "YES" in operation 2805), the second electronic device (e.g., the processor 120 or 400) may transmit information related to the unregistered device to the first electronic device (e.g., the first electronic device 200 in FIG. 2) in operation 2813.

According to various embodiments, if the second electronic device 210 receives information related to the unregistered device, the second electronic device 210 may identify the information related to the unregistered device. According to an embodiment, if information related to the unregistered device is received from the first electronic device 200 through the communication circuit 410, the processor 400 may identify the information on the unregistered device through a memory (e.g., the memory 130 of FIG. 1) of the second electronic device 210 or through an external server (e.g., the server 108 in FIG. 1). The processor 400 may control the communication circuit 410 to transmit information on the unregistered device to the first electronic device 200. According to an embodiment, if information on the unregistered device is received from the second electronic device 210, the first electronic device 200 may control the display device 320 to display the information on the unregistered device.

According to various embodiments, a first electronic device (e.g., an electronic device providing an augmented reality service) may selectively interwork with a second electronic device (e.g., a mobile device), based on at least one piece of information on an object included in the area corresponding to a field of view of a user or information on the position of the first electronic device, thereby providing various control (or manipulation) methods corresponding to an augmented reality service.

According to various embodiments, a second electronic device (e.g., a mobile device) may selectively provide a first electronic device (e.g., an electronic device providing an augmented reality service) with input information obtained in a second electronic device, based on an input processing method corresponding to interworking or non-interworking with the first electronic device (e.g., an electronic device providing augmented reality service) for an augmented reality service, so that the user can easily control (or manipulate) the augmented reality service.

The embodiments disclosed in the specification and drawings merely show specific examples in order to easily describe subject matters according to the embodiments and help in understanding the embodiments, and are not intended to limit the scope of the embodiments. Therefore, the scope of various embodiments should be interpreted to encompass all changes or modifications derived based on the subject matters of the various embodiments, as well as the embodiments disclosed herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A first electronic device comprising:
a communication circuit;
a camera;
a sensor;
a display device; and a processor operably connected to the communication circuit, the display device, the sensor, and the camera,
wherein the processor is configured to:
establish communication with a second electronic device through the communication circuit,
obtain information on at least one object corresponding to a field of view of a user wearing the first electronic device through at least one of the camera or the sensor,
obtain information on a user's gaze,
based on the information on the user's gaze and the information on the at least one object, determine whether to use the second electronic device as an input device for an augmented reality service, and
when it is determined to use the second electronic device as the input device for an augmented reality service, transmit information related to the input device for the augmented reality service to the second electronic device through the communication circuit.

2. The first electronic device of claim 1, wherein the processor is further configured to obtain the information on the user's gaze, based on at least one of a head gaze or an eye gaze of the first electronic device.

3. The first electronic device of claim 1, wherein the processor is further configured to control the display device to display at least one virtual object on at least a portion of an area corresponding to the field of view of the user wearing the first electronic device.

4. The first electronic device of claim 3, wherein the processor is further configured to:
determine to use the second electronic device as the input device for the augmented reality service when the user's gaze corresponding to at least one object corresponding to the field of view of the user wearing the first electronic device or any one object of the at least one virtual object is consistently maintained for a reference time.

5. The first electronic device of claim 1, wherein the processor is further configured to:
when an object related to the second electronic device exists in an area corresponding to the field of view of the user wearing the first electronic device, identify whether the user's gaze is directed toward the object related to the second electronic device, and
when the user's gaze is directed toward an object other than the object related to the second electronic device, determine to use the second electronic device as the input device for the augmented reality service.

6. The first electronic device of claim 1, wherein the processor is further configured to:
when it is determined to use the second electronic device as the input device for the augmented reality service, identify whether input information is received from the second electronic device through the communication circuit, and
when the input information is received from the second electronic device, perform an operation corresponding to the input information.

7. The first electronic device of claim 6, wherein the input information received from the second electronic device comprises at least one of a touch input, a physical button input, or information on a motion of the second electronic device.

8. The first electronic device of claim 6, wherein the processor is further configured to:
when the input information is received from the second electronic device, identify an object corresponding to the user's gaze, and
control the display device to display a control menu related to the object corresponding to the user's gaze.

9. A second electronic device comprising:
a communication circuit;
an input device; and
a processor operably connected to the communication circuit and the input device,
wherein the processor is configured to:
establish communication with a first electronic device through the communication circuit,
when an input is detected through the input device, identify an input processing method of the second electronic device,
when the input processing method is a first method for sharing input, transmit information on the input to the first electronic device through the communication circuit, and
when the input processing method is a second method in which input sharing is restricted, perform an operation corresponding to the information on the input.

10. The second electronic device of claim 9, wherein the processor is further configured to:
configure the input processing method of the second electronic device as the first method when information related to an input device for an augmented reality service is received from the first electronic device through the communication circuit, and
configure the input processing method of the second electronic device as a second method when the information related to the input device for the augmented reality service is not received from the first electronic device through the communication circuit, or when non-interworking information is received therefrom.

11. The second electronic device of claim 9, further comprising:
a display device,
wherein the processor is further configured to, when information related to an input device for an augmented reality service is received from the first electronic device through the communication circuit, control the display device to one of change display information or change a display method of the display device.

12. The second electronic device of claim 9, wherein the input device comprises at least one of a touch circuit or physical buttons.

13. A second electronic device comprising:
a communication circuit;
a display device; and
a processor operably connected to the communication circuit and the display device,
wherein the processor is configured to:
receive, from a first electronic device, information on at least one object corresponding to a field of view of a user wearing the first electronic device through the communication circuit,
based on the information on the at least one object, identify an object corresponding to a gaze of the user wearing the first electronic device,
identify whether the object corresponding to the gaze of the user wearing the first electronic device is an object related to the second electronic device, and
when the object corresponding to the gaze of the user wearing the first electronic device is an object different from the object related to the second electronic device, determine to the second electronic device as an input device for an augmented reality service.

14. The second electronic device of claim 13, wherein the processor is further configured to obtain information on the user's gaze, based on at least one of a head gaze or an eye gaze of the first electronic device.

15. The second electronic device of claim 13, wherein the processor is further configured to control the first electronic device to display at least one virtual object on at least a portion of an area corresponding to the field of view of the user wearing the first electronic device.

16. The second electronic device of claim 13, wherein the processor is further configured to, when the object related to the second electronic device is not included in the at least one object corresponding to the field of view of the user wearing the first electronic device, determine to use the second electronic device as the input device for the augmented reality service.

17. The second electronic device of claim 13, wherein the processor is further configured to, when the user's gaze is directed toward the object related to the second electronic device, determine not to use the second electronic device as the input device for the augmented reality service.

18. The second electronic device of claim 13, wherein the processor is further configured to, when it is determined to use the second electronic device as the input device for the augmented reality service, transmit, to the first electronic device, information related to an operation corresponding to input information obtained by the second electronic device.

19. The second electronic device of claim 18, wherein the input information obtained by the second electronic device comprises at least one piece of touch input, physical button input, or information on a motion of the second electronic device.

20. The second electronic device of claim 18, wherein the processor is further configured to:
- when the input information is detected, identify an object corresponding to the user's gaze based on the information on the at least one object, and
- transmit a control menu related to the object corresponding to the user's gaze to the first electronic device.

* * * * *